United States Patent
Ikeda et al.

(10) Patent No.: US 7,520,928 B2
(45) Date of Patent: *Apr. 21, 2009

(54) BLACK INK COMPOSITION, INK SET CONTAINING THE SAME, AND INK JET RECORDING METHOD

(75) Inventors: Kenji Ikeda, Saitama (JP); Toshiharu Tanaka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 111 days.

This patent is subject to a terminal disclaimer.

(21) Appl. No.: 11/632,653

(22) PCT Filed: Jul. 12, 2005

(86) PCT No.: PCT/JP2005/013225

§ 371 (c)(1),
(2), (4) Date: Jan. 16, 2007

(87) PCT Pub. No.: WO2006/006726

PCT Pub. Date: Jan. 19, 2006

(65) Prior Publication Data

US 2008/0043079 A1 Feb. 21, 2008

(30) Foreign Application Priority Data

Jul. 13, 2004 (JP) ............ 2004-206329
Jul. 13, 2004 (JP) ............ 2004-206330
Jul. 13, 2004 (JP) ............ 2004-206331

(51) Int. Cl.
*C09D 11/00* (2006.01)
*C09D 11/02* (2006.01)
*B41J 2/01* (2006.01)

(52) U.S. Cl. ............ 106/31.52; 106/31.49; 106/31.58; 106/31.59; 347/100

(58) Field of Classification Search ............ 106/31.27, 106/31.52, 31.58, 31.49, 31.59; 347/100
See application file for complete search history.

(56) References Cited

U.S. PATENT DOCUMENTS

| | | | |
|---|---|---|---|
| 5,256,194 A | | 10/1993 | Nishiwaki et al. |
| 7,029,523 B2 * | | 4/2006 | Taguchi et al. ............ 106/31.52 |
| 7,037,365 B2 * | | 5/2006 | Taguchi et al. ............ 106/31.52 |
| 7,048,790 B2 * | | 5/2006 | Taguchi et al. ............ 106/31.52 |
| 7,211,133 B2 * | | 5/2007 | Taguchi ............ 106/31.52 |
| 7,267,715 B2 * | | 9/2007 | Taguchi et al. ............ 106/31.52 |
| 7,303,272 B2 * | | 12/2007 | Taguchi et al. ............ 347/100 |
| 2002/0121219 A1 | | 9/2002 | Stramel et al. |
| 2004/0154496 A1 * | | 8/2004 | Taguchi ............ 106/31.52 |
| 2004/0187232 A1 | | 9/2004 | Chino et al. |
| 2007/0101899 A1 * | | 5/2007 | Taguchi et al. ............ 106/31.52 |
| 2007/0139499 A1 * | | 6/2007 | Yabuki et al. ............ 106/31.52 |
| 2007/0240608 A1 * | | 10/2007 | Ogawa ............ 106/31.52 |
| 2007/0266890 A1 * | | 11/2007 | Taguchi et al. ............ 106/31.47 |
| 2008/0043078 A1 * | | 2/2008 | Wachi ............ 106/31.52 |

FOREIGN PATENT DOCUMENTS

| | | | |
|---|---|---|---|
| EP | 1403338 A1 | | 3/2004 |
| EP | 1403339 A1 | | 3/2004 |
| EP | 1420051 | * | 5/2004 |
| EP | 1420051 A1 | | 5/2005 |
| JP | 7-173422 A | | 7/1995 |
| JP | 2002-332426 A | | 11/2002 |
| JP | 2003-238863 A | | 8/2003 |
| WO | WO 97/16496 A1 | | 5/1997 |
| WO | WO 2004/029166 | * | 4/2004 |
| WO | 2005/044936 A1 | | 5/2005 |
| WO | WO 2005/040292 | * | 5/2005 |
| WO | WO 2005/042652 | * | 5/2005 |
| WO | 2005/121261 A1 | | 12/2005 |
| WO | WO 2005/121261 | * | 12/2005 |
| WO | WO 2006/006703 | * | 1/2006 |

OTHER PUBLICATIONS

Extended European Search Report dated Jul. 31, 2008.

* cited by examiner

*Primary Examiner*—Helene Klemanski
(74) *Attorney, Agent, or Firm*—Sughrue Mion, PLLC

(57) ABSTRACT

Black ink compositions are provided. First embodiment contains a water-soluble long-wavelength dye L and a water-soluble short-wavelength dye S, in which the water-soluble short-wavelength dye S has 3 or more azo groups per molecule and a naphthalene skeleton. Second embodiment contains a water-soluble short-wavelength dye S whose absorption spectrum in aqueous solvent has a maximum between 440 nm and 540 nm and a half-band width of 90 to 200 nm and a water-soluble long-wavelength dye L whose absorption spectrum in aqueous solvent has a maximum between 550 nm and 700 nm and a half-band width of 100 nm or more. Third embodiment contains water, a water-miscible organic solvent, and a coloring material, in which C. I. Direct Red 84 is contained as a water-soluble short-wavelength dye S.

22 Claims, No Drawings

BLACK INK COMPOSITION, INK SET CONTAINING THE SAME, AND INK JET RECORDING METHOD

TECHNICAL FIELD

The present invention relates to a black ink composition comprising an azo dye having a particular structure and property (preferably, an image forming black ink composition (preferably, an inkjet ink composition)), an ink set comprising the same, and an inkjet recording method employing the black ink composition or the ink set.

BACKGROUND ART

An inkjet recording method has been spreading rapidly and is still being improved because of inexpensive material cost, high-speed recording, less noise during recording, and easy implementation of color recording.

The inkjet recording method includes: a continuous method which causes a droplet to continuously travel by air; and an on-demand method which causes a droplet to travel by air, depending on an image information signal. The droplet is ejected by using a pressure using a piezo element; by generation of bubbles in ink by heating; by using ultrasonic wave; or by suctioning with electrostatic force.

Examples of inkjet recording inks include water inks, oil inks, and solid (fusible) inks.

A coloring agent for use in the inkjet recording ink needs to have good solubility and dispersibility with respect to a solvent; excellent color developing ability which allows high-density recording; good hue; excellent fastness to light, heat, and active gas in the environment ($NO_x$, acidic gas (ozone, etc.), $SO_x$, etc.); excellent fastness to water and chemicals; good fixing ability and bleeding resistance with respect to an image receiving material; excellent preservability as ink; no toxicity; high purity; and inexpensive availability. However, it is considerably difficult to find a coloring agent meeting these criteria to a high extent. Particularly, there is a strong desire for a coloring agent for black ink which has good black tonality, allows high-density printing, and has fastness to light, humidity and heat.

Disazo dyes and trisazo dyes have been used as black dyes. When only these dyes are used, blue to green light are insufficiently absorbed, so that it is often that satisfactory black tonality is not obtained. Therefore, a color correcting dye which absorbs blue to green light is generally used in combination with the above-described dyes. Such a color correcting dye has been proposed in, for example, Japanese Unexamined Patent Publication No. H09-255906 and Japanese Patent No. 3178200 so as to make an attempt to improve black tonality adjusting ability, color developing ability, fastness, ink preservation stability, water resistance, and prevention of nozzle clogging.

However, the color correcting dye proposed in the related art has problems with the color tonality adjusting ability. Specifically, for example, it absorbs a very short wavelength, so that a large amount thereof needs to be added. Further, another color correcting dye is required.

Dyes capable of absorbing blue to green light are generally known, however, most of them have poor fastness, so that their hue may be significantly altered by exposure to light, heat, or active gas in the environment; and insufficient fixing ability, so that yellow bleeding appears at a contour portion under high temperature and high humidity conditions, for example. Therefore, a further improvement is required.

In consideration of these drawbacks, Japanese Unexamined Patent Publication No. 2002-332426 describes a black ink composition in which a triazine dye which has a maximum absorption of visible spectra in aqueous solvent at 435 nm (color correcting dye) is blended with a black dye.

However, a general black dye has a maximum absorption between 570 nm and 620 nm. Therefore, even when the color correcting dye is used, it is clear that a preferable black tonality is not obtained, taking into account a complementary color relationship which is important for adjustment of black tonality ("Shikisai Kagaku Handobukku (Handbook of Color Science) (Second Edition)", University of Tokyo Press, 1998, pp. 560-562).

Japanese Unexamined Patent Publication No. H08-302255 describes CI Direct Red 84. However, the publication does not disclose a black ink composition in which CI Direct Red 84 is used as a short-wavelength dye in combination with a long-wavelength dye.

Japanese Unexamined Patent Publication No. 2000-265099 describes CI Direct Red 84, which is used to obtain magenta (column 8). Similarly, however, the publication does not disclose a black ink composition in which CI Direct Red 84 is used as a short-wavelength dye in combination with a long-wavelength dye.

DISCLOSURE OF THE INVENTION

An object of an illustrative, non-limiting embodiment of the present invention is provided to solve the above-described conventional problems. The following object is achieved by the present invention.

An object of an illustrative, non-limiting embodiment of the present invention is to provide a black ink composition containing a water-soluble short-wavelength dye S and a water-soluble long-wavelength dye L, which does not require a large amount to be added and other color correcting dyes, can achieve excellent black tonality and high-density printing, has excellent weather resistance, heat resistance, water resistance (no bleeding), hue, and solution stability; an ink set comprising the same; and an inkjet recording method using the same.

First Embodiment

A-1) A black ink composition containing: a water-soluble long-wavelength dye L; and a water-soluble short-wavelength dye S, wherein the water-soluble short-wavelength dye S has 3 or more azo groups per molecule and a naphthalene skeleton.

A-2) The black ink composition of A-1), in which the water-soluble short-wavelength dye S is used as a complementary color dye (or a color correcting dye) for the water-soluble long-wavelength dye L.

A-3) The black ink composition of A-1) or A-2), in which the water-soluble short-wavelength dye S is contained in an amount of 0.1 to 4% by weight.

A-4) The black ink composition of any of A-1) to A-3), in which the water-soluble long-wavelength dye L is an azo dye having a naphthalene skeleton.

A-5) The black ink composition of any of A-1) to A-4), in which the water-soluble short-wavelength dye S has a structure having 3 to 6 azo groups per molecule.

A-6) The black ink composition of any of A-1) to A-5), in which the water-soluble long-wavelength dye L has 2 to 4 azo groups per molecule and the azo groups are conjugated with each other.

A-7) The black ink composition of any of A-1) to A-6), in which the water-soluble long-wavelength dye L has a hydroxyl group at a conjugate position of an azo group.

A-8) The black ink composition of any of A-1) to A-7), in which the water-soluble long-wavelength dye L has one or less heterocycle in a chromophore.

A-9) The black ink composition of any of 1) to 8), in which the water-soluble long-wavelength dye L has an associating ability.

A-10) The black ink composition of any of A-1) to A-9), containing a water-miscible organic solvent.

A-11) The black ink composition of A-10), in which the water-miscible organic solvent has a vapor pressure of 2,000 Pa or less.

A-12) The black ink composition of A-10) or A-11), in which the water-miscible organic solvent is one or more selected from the group consisting of alcohol compounds, heterocycle-containing organic solvents, and alkyl ethers of polyhydric alcohols.

A-13) The black ink composition of any of A-10) to A-12), containing one or more water-miscible organic solvents selected from the group consisting of diethylene glycol, triethylene glycol, glycerin, triethylene glycol monobutyl ether, 1,5-pentanediol, 1,2-hexanediol, isopropanol, triethanolamine, and 2-pyrrolidone.

A-14) The black ink composition of any of A-1) to A-13), containing a surfactant.

A-15) The black ink composition of any of A-1) to A-14), containing a preservative.

A-16) The black ink composition of any of A-1) to A-15), having a viscosity of 1 to 20 mPa·sec.

A-17) The black ink composition of any of A-1) to A-16), having a surface tension of 20 to 50 mN/m.

A-18) The black ink composition of any of A-1) to A-17), having a pH of 7 to 9.

A-19) An ink set comprising the black ink composition of any of A-1) to A-18).

A-20) An inkjet recording method, in which the black ink composition of any of A-1) to A-18) or the ink set of A-19) is used to form an image on an image receiving material including a support and an ink receiving layer containing a white inorganic pigment particle.

Second Embodiment

B-1) A black ink composition containing a water-soluble short-wavelength dye S whose absorption spectrum in aqueous solvent has a maximum between 440 nm and 540 nm and a half-band width of 90 to 200 nm and a water-soluble long-wavelength dye L whose absorption spectrum in aqueous solvent has a maximum between 550 nm and 700 nm and a half-band width of 100 nm or more.

B-2) The black ink composition of B-1), in which the water-soluble short-wavelength dye S has 2 to 6 azo groups per molecule and does not have a phenolic hydroxyl group.

B-3) The black ink composition of B-1) or B-2), in which the water-soluble short-wavelength dye S is contained in an amount of 0.1 to 4% by weight.

B-4) The black ink composition of any of B-1) to B-3), in which the water-soluble long-wavelength dye L has 2 to 4 azo groups per molecule and the azo groups are conjugated with each other.

B-5) The black ink composition of any of B-1) to B-4), in which the water-soluble long-wavelength dye L has a hydroxyl group at a conjugate position of an azo group.

B-6) The black ink composition of any of B-1) to B-5), in which the water-soluble long-wavelength dye L has one or less heterocycle in a chromophore.

B-7) The black ink composition of any of B-1) to B-6), in which the water-soluble long-wavelength dye L has an associating ability.

B-8) The black ink composition of any of B-1) to B-7), containing a water-miscible organic solvent.

B-9) The black ink composition of B-8), in which the water-miscible organic solvent has a vapor pressure of 2,000 Pa or less.

B-10) The black ink composition of B-8) or B-9), in which the water-miscible organic solvent is one or more selected from the group consisting of alcohol compounds, heterocycle-containing organic solvents, and alkyl ethers of polyhydric alcohols.

B-11) The black ink composition of any of B-8) to B-10), containing one or more water-miscible organic solvents selected from the group consisting of diethylene glycol, triethylene glycol, glycerin, triethylene glycol monobutyl ether, 1,5-pentanediol, 1,2-hexanediol, isopropanol, triethanolamine, and 2-pyrrolidone.

B-12) The black ink composition of any of B-1) to B-11), containing a surfactant.

B-13) The black ink composition of any of B-1) to B-12), containing a preservative.

B-14) The black ink composition of any of B-1) to B-13), having a viscosity of 1 to 20 mPa·sec.

B-15) The black ink composition of any of B-1) to B-14), having a surface tension of 20 to 50 mN/m.

B-16) The black ink composition of any of B-1) to B-15), having a pH of 7 to 9.

B-17) An ink set comprising the black ink composition of any of B-1) to B-16).

B-18) An inkjet recording method, in which the black ink composition of any of B-1) to B-16) or the ink set of B-17) is used to form an image on an image receiving material including a support and an ink receiving layer containing a white inorganic pigment particle.

Third Embodiment

C-1) A black ink composition containing water, a water-miscible organic solvent, and a coloring material containing a water-soluble short-wavelength dye S, wherein C. I. Direct Red 84 is contained as the water-soluble short-wavelength dye S.

C-2) The black ink composition of C-1), in which the coloring material contains a water-soluble long-wavelength dye L.

C-3) The black ink composition of C-1) or C-2), in which the water-soluble short-wavelength dye S is used as a complementary color dye (or a color correcting dye) for the water-soluble long-wavelength dye L.

C-4) The black ink composition of any of C-1) to C-3), in which the water-soluble short-wavelength dye S is contained in an amount of 0.1 to 4% by weight.

C-5) The black ink composition of any of C-2) to C-4), in which the water-soluble long-wavelength dye L is an azo dye having a naphthalene skeleton.

C-6) The black ink composition of any of 2) to 5), in which the water-soluble long-wavelength dye L has 2 to 4 azo groups per molecule and the azo groups are conjugated with each other.

C-7) The black ink composition of any of C-2) to C-6), in which the water-soluble long-wavelength dye L has a hydroxyl group at a conjugate position of an azo group.

C-8) The black ink composition of any of C-2) to C-7), in which the water-soluble long-wavelength dye L has one or less heterocycle in a chromophore.

C-9) The black ink composition of any of C-2) to C-8), in which the water-soluble long-wavelength dye L has an associating ability.

C-10) The black ink composition of any of C-1) to C-9), in which the water-miscible organic solvent has a vapor pressure of 2,000 Pa or less.

C-11) The black ink composition of any of C-1) to C-10), in which the water-miscible organic solvent is one or more selected from the group consisting of alcohol compounds, heterocycle-containing organic solvents, and alkyl ethers of polyhydric alcohols.

C-12) The black ink composition of any of C-1) to C-11), containing one or more water-miscible organic solvents selected from the group consisting of diethylene glycol, triethylene glycol, glycerin, triethylene glycol monobutyl ether, 1,5-pentanediol, 1,2-hexanediol, isopropanol, triethanolamine, and 2-pyrrolidone.

C-13) The black ink composition of any of C-1) to C-12), containing a surfactant.

C-14) The black ink composition of any of C-1) to C-13), containing a preservative.

C-15) The black ink composition of any of C-1) to C-14), having a viscosity of 1 to 20 mPa·sec.

C-16) The black ink composition of any of C-1) to C-15), having a surface tension of 20 to 50 mN/m.

C-17) The black ink composition of any of C-1) to C-16), having a pH of 7 to 9.

C-18) An ink set comprising the black ink composition of any of C-1) to C-17).

C-19) An inkjet recording method, in which the black ink composition of any of C-1) to C-17) or the ink set of C-18) is used to form an image on an image receiving material including a support and an ink receiving layer containing a white inorganic pigment particle.

By using the black ink composition of the present invention in inkjet recording, it is possible to form an image which has good black tonality, high printing density, and high fastness to light and active gas in the environment. In addition, bleeding in an image during preservation under high temperature and high humidity can be significantly reduced.

DETAILED DESCRIPTION OF THE INVENTION

Hereinafter, exemplary embodiments of the present invention will be described in more detail.

(Dyes)

(Water-Soluble Short-Wavelength Dye S)

A water-soluble short-wavelength dye S (hereinafter also referred to a short-wavelength dye S) according to a first embodiment of the present invention has 3 or more azo groups per molecule and a naphthalene skeleton.

Due to this structure, the short-wavelength dye S has an enhanced level of color developing ability, and a broader coloring matter plane (a broader dye plane), thereby making it possible to provide an image having good fixing ability.

The number of azo groups is preferably 3 to 6 per molecule, more preferably 4 to 6 per molecule, in terms of color developing ability and fixing ability.

As used herein, the naphthalene skeleton means a structure including a naphthalene ring. The short-wavelength dye S preferably has 2 to 4 naphthalene rings per molecule.

It is also preferable that the short-wavelength dye S of the present invention does not have a dissociative phenolic hydroxyl group which is present in general coloring matters (or dyes). Due to this feature, the short-wavelength dye S has the following preferable performance: a small change in tonality depending on an image receiving material used; low reactivity to acidic gas (ozone in the air, etc.), i.e., excellent gas resistance; and the like.

As used herein, the dissociative phenolic hydroxyl group means a dissociative hydroxyl group substituted with an aryl group. This aryl group may be substituted with other substituents.

In the present invention, C. I. Direct Red 84 (its structure will be described below) may be used as the short-wavelength dye S, singly or in combination with other short-wavelength dyes S.

Note that C. I. Direct Red 84 has 4 azo groups per molecule and a naphthalene skeleton, and does not have a phenolic hydroxyl group.

It is also preferable that the short-wavelength dye S is a dye whose absorption spectrum in aqueous solvent has a maximum between 440 nm and 540 nm (absorption maximum: λmax) and a half-band width of 90 to 200 nm, i.e., achieves broad absorption. As used herein, the aqueous solvent means a solvent which contains water as a major ingredient and in which a dye which may contain an appropriate amount of a water-miscible organic solvent is dissolved or dispersed. The absorption spectrum means a spectrum which is measured using a spectrophotometer which employs a commonly used 1-cm cell. The same is true of a water-soluble long-wavelength dye L described below.

The absorption spectrum of the water-soluble short-wavelength dye S is one that is measured using a single compound. In other words, when the absorption spectrum in aqueous solvent of the short-wavelength dye S is measured, the properties, such as a desired absorption maximum and half-band width, are obtained from a single compound, but not from a combination of a plurality of compounds. Note that it is clear that, in the present invention, compounds having absorption spectra different from each other may be used in combination as long as the above-described features of the short-wavelength dye S are satisfied. Further, in the present invention, short-wavelength dyes having other structures may be used in combination with the short-wavelength dye S having the above-described molecular structure.

The short-wavelength dye S has the above-described absorption characteristics, thereby making it possible to absorb a wide range of light, from blue to green, which tends to be insufficiently absorbed by the water-soluble long-wavelength dye L (e.g., a disazo dye, a trisazo dye, etc.). Thus, the short-wavelength dye S has an absorption property which is preferable as a complementary color dye.

The absorption maximum of the short-wavelength dye S is preferably between 450 nm and 520 nm, particularly preferably between 460 nm and 500 nm.

The half-band width of the absorption maximum of the short-wavelength dye S is preferably between 100 nm and 180 nm, particularly preferably between 110 nm to 160 nm.

A water-soluble short-wavelength dye S according to a second embodiment of the present invention is the above-described dye whose absorption spectrum in aqueous solvent has a maximum between 440 nm and 540 nm (absorption maximum: λmax) and a half-band width of 90 to 200 nm, i.e., achieves broad absorption.

Further, the short-wavelength dye S of the second embodiment of the present invention preferably has 2 to 6 azo groups per molecule. Due to this structure, the short-wavelength dye S has an enhanced level of color developing ability, and a broader coloring matter plane, thereby making it possible to provide an image having good fixing ability.

The number of azo groups is preferably 4 to 6 per molecule in terms of color developing ability and fixing ability.

An example of the short-wavelength dye S of the present invention is a polyazo dye represented by a formula below. However, the short-wavelength dye S of the present invention is not particularly limited as long as it has the structure and/or physical properties defined herein to solve the above-described problems.

$$(D)_n\text{-}Y$$

In the above-described formula, D represents a coloring matter residue comprising 1 to 3 azo groups conjugated with each other and a chromophore containing 3 to 4 aromatic rings having a total of 20 or more π electrons; n represents 1 or 2; and Y represents a hydrogen atom when n is 1, or a divalent linking group when n is 2. Note that the aromatic ring contained in the chromophore may be either a heterocycle or a hydrocarbon ring, preferably a hydrocarbon ring. When the aromatic rings constituting the chromophore are condensed rings, the number of π electrons on the aromatic rings is assumed to be the number of π electrons on the entire condensed rings. For example, a naphthalene ring has 10 π electrons. Examples of the divalent linking group represented by Y include an alkylene group, an arylene group, a heterocyclic residue, —CO—, —SO$_n$— (n: 0, 1, 2), —NR— (R: a hydrogen atom, an alkyl group, an aryl group), —O—, and a divalent group composed of a combination thereof. These groups may have a substituent group, such as an alkyl group, an aryl group, an alkoxy group, an amino group, an acyl group, an acylamino group, a halogen atom, a hydroxyl group, a carboxyl group, a sulfamoyl group, a carbamoyl group, a sulfonamide group, or the like. Particularly preferable examples of the linking group include —NH—CO—NH—, —NH—CS—NH—, and a group represented by formula below.

As used herein, the alkyl group means a monovalent saturated hydrocarbon group which has a linear, branched or cyclic (either monocyclic or polyeyclic (either bridged or spiro polycyclic)) structure or a combination thereof. The alkyl group encompasses cycloalkyl groups, cycloalkylalkyl groups, and the like. When the alkyl group may be substituted with a substituent, substituted alkyl groups are encompassed by the alkyl group.

As used herein, an alkenyl group means a monovalent unsaturated hydrocarbon group which has a linear, branched or cyclic (monocyclic or polycyclic (either bridged or spiro polycyclic)) structure or a combination thereof and has one or more carbon-carbon double bonds, except for aromatic groups. When the alkenyl group may be substituted with a substituent, substituted alkenyl groups are encompassed by the alkenyl group.

As used herein, for example, the substituted alkyl group means an alkyl group whose hydrogen atom is substituted with other substituents. The alkyl group may be substituted at one or more positions with each of one or more substituents. The same is true of other substituted groups, such as substituted aryl groups and the like.

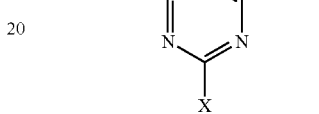

Formula

In the above-described formula, X represents a hydroxyl group, a sulfo group, an alkoxy group, an aryloxy group, an amino group (including an alkylamino group, an arylamino group), or an alkyl- or arylsulphenyl group. In addition, each group may have a substituent.

As the short-wavelength dye S, for example, C. I. Direct Red 84, C. I. Direct Brown 106, and C. I. Direct Brown 202, which are commercially available, are useful. Among these dyes, C. I. Direct Red 84 is particularly useful because it can be used to adjust the tonality of a number of black dyes and it has excellent color developing ability, fastness and fixing ability.

Examples of the short-wavelength dye S preferably used in the present invention will be illustrated below in the form of a free acid, though may be used in the form of any salt.

Examples of a preferable counter cation include alkali metals (e.g., lithium, sodium, potassium), ammonium, and organic cations (e.g., pyridinium, tetramethylammonium, guanidium).

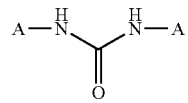

A

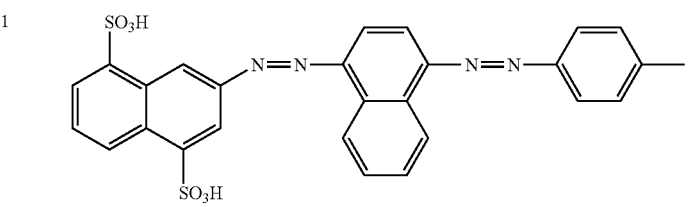

1

-continued
| | A |
|---|---|
| | 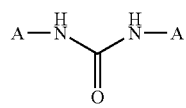 |
| 2 | 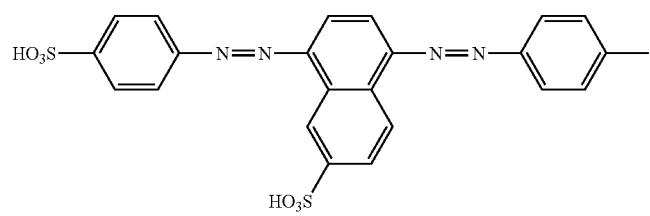 |
| 3 | 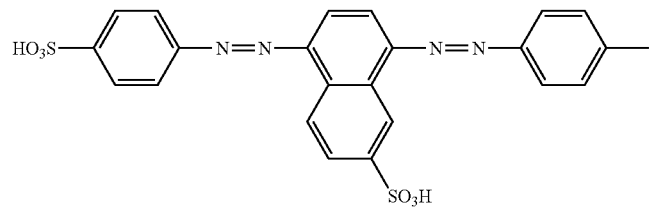 |
| 4 | 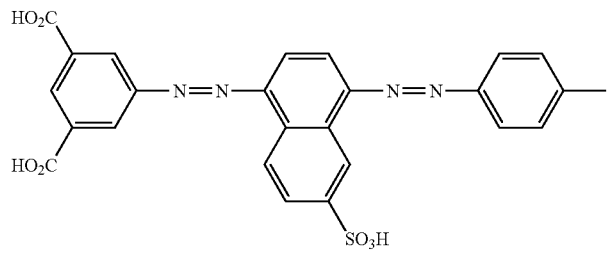 |
| 5 | 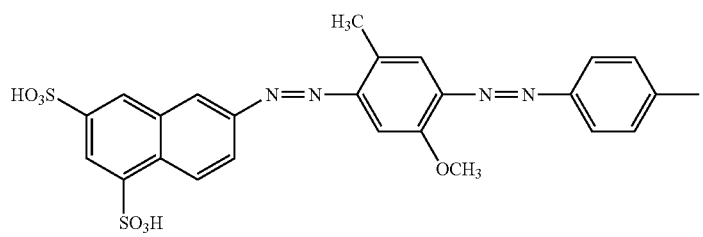 |
| 6 | 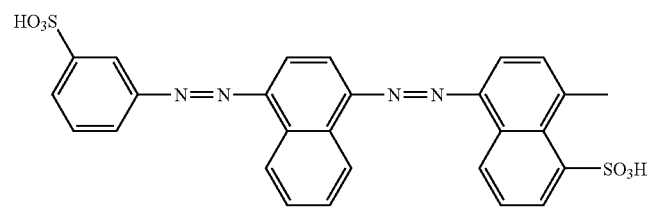 |

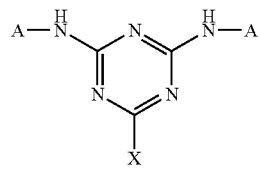
| | A | X |
|---|---|---|
| 7 |  | —NHC$_2$H$_4$OH |
| 8 | 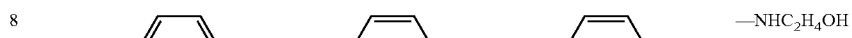 | —NHC$_2$H$_4$OH |
| 9 | 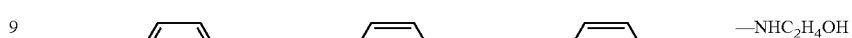 | —NHC$_2$H$_4$OH |
| 10 | 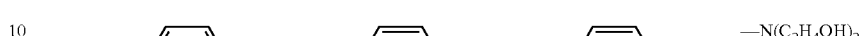 | —N(C$_2$H$_4$OH)$_2$ |
| 11 |  | —N(C$_2$H$_4$OH)$_2$ |
| 12 |  | —NHC$_2$H$_4$OH |

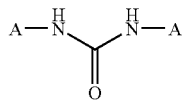

A

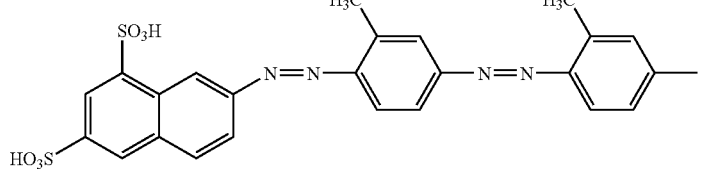

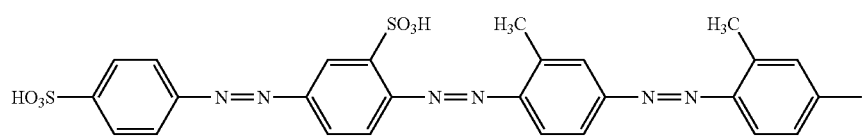

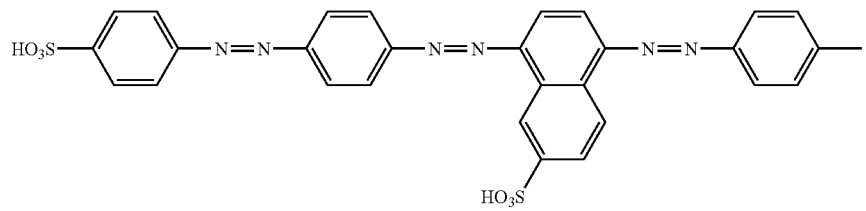

Among these dyes, C. I. Direct Red 84 (a Na salt of the above-described compound example 2) and C. I. Direct Brown 106 (a Na salt of the above-described compound example 14) are particularly useful because they are commercially available. Among them, C. I. Direct Red 84 is particularly useful because it can be used to adjust the tonality of a number of black dyes and they have excellent color developing ability, fastness and fixing ability.

Note that, the above-described short-wavelength dyes S other than commercially available dyes can be easily synthesized from commercially available starting materials in accordance with the synthesis route of C. I. Direct Red 84 or C. I. Direct Brown 106 described in "The Colour Index Fourth Edition" (published by The Society of Dyers and Colourists).

The black ink composition of the present invention contains the short-wavelength dye S in an amount of 0.1 to 4% by weight, preferably 0.5 to 3.0% by weight, and particularly preferably 1.0 to 2.5% by weight. The amount can be changed as appropriate and as required.

(Water-Soluble Long-Wavelength Dye L)

According to an embodiment of the black ink composition of the present invention, a water-soluble long-wavelength dye L (hereinafter also referred to as a long-wavelength dye L) preferably has a naphthalene skeleton. More preferably, the long-wavelength dye L has a structure represented by formulas 1 to 3 described below.

The long-wavelength dye L preferably has 2 to 4 azo groups per molecule which are conjugated with each other.

It is also preferable that the long-wavelength dye L has a hydroxyl group at a conjugate position of the azo group or one or less heterocycle in a chromophore, because of securing high color developing ability; absorption characteristics having a broad half-band width, which are appropriate for black tonality; and ink stability, though the reason is uncertain. As used herein, the conjugate position means a substitution position which has a conjugate relationship with the azo group. The hydroxyl group is preferably introduced at an ortho- or para-position into the azo group.

Generally, a dye having a hydroxyl group at a conjugate position of an azo group may have less fastness to light and active gas in the air, depending on the type of an image receiving material or preservation conditions for a printed material. Therefore, it is more preferable that the long-wavelength dye L has associating ability so that a reaction can be physically suppressed.

It can be determined whether or not a dye is in an associated state, as follows. A visible absorption spectrum is measured while changing the dye concentration, to examine an absorption maximum wavelength, a molar absorption constant and a change in waveform of the dye, thereby determining whether or not the dye has associating ability. These physical properties of the solution are compared with the absorption spectrum of the dye on an image receiving material, thereby easily determining whether or not a dye is in an associated state.

Specifically, a dye is preferable which has a relationship represented by:

$$\epsilon1/\epsilon2 > 1.2$$

where $\epsilon1$ is a molar absorption constant at a absorption maximum wavelength in a visible region when 0.1 mmol/l dye aqueous solution is measured using a cell having an optical path length of 1 cm, and $\epsilon2$ is a molar absorption constant when 0.2 mol/l aqueous solution is measured using a liquid crystal cell having an optical path length of 5 μm, as defined in Japanese Patent Application No. 2004-65569.

It is also preferable that the absorption spectrum in aqueous solvent of the long-wavelength dye L has a maximum (absorption maximum) between 550 nm and 700 nm and a half-band width of 100 nm or more (preferably, 120 to 500 nm, more preferably 120 to 350 nm).

The absorption spectrum of the long-wavelength dye L is one that is measured using a single compound. In other words, when the absorption spectrum in aqueous solvent of the long-wavelength dye L is measured, the properties, such as a desired absorption maximum and half-band width and the like, are obtained from a single compound, but not from a combination of a plurality of compounds. Note that it is clear that, in the present invention, compounds having absorption spectra different from each other may be used in combination as long as the above-described features of the long-wavelength dye L are satisfied. Further, in the present invention, other long-wavelength dyes may be used in combination with the long-wavelength dye L having the above-described molecular structure.

A black ink composition according to another embodiment of the present invention contains a water-soluble long-wavelength dye L whose absorption spectrum in aqueous solvent has a maximum (absorption maximum) between 550 nm and 700 nm and a half-band width of 100 nm or more (preferably, 120 to 500 nm, more preferably 120 to 350 nm). By using the water-soluble long-wavelength dye L in combination with the above-described short-wavelength dye S (particularly, the short-wavelength dye S of the second embodiment), good black tonality can be obtained.

Among the long-wavelength dyes L preferably used in the present invention, those represented by formulas below are particularly preferable.

In the formulae below, the dye is represented in the form of a free acid, though may be used for actual use in the form of any salt.

substituted at any position on a benzene ring or a naphthalene ring. $A_1$ and $A_2$ each represent a monovalent aromatic group or heterocyclic group. B represents a divalent aromatic group or heterocyclic group. $A_1$ and $A_2$ may be substituted with an azo group. $A_1$, $A_2$ and B may have a substituent. The number of heterocycles contained in a chromophore of the dye is preferably one or less. The dye may be in the form of a chelate dye in which a portion of the dye represented by the above-described formulas may be dissociated and a transition metal is coordinated to the dye.

Among the above-described formulas, dyes represented by formula (1) or (2) are preferable. Among them, the dyes represented by formula (1) are particularly preferable. Among the dyes represented by formula (1), dyes in which X is an amino group or a hydroxyl group are preferable. The dyes in which X is a hydroxyl group are particularly preferable. In terms of fastness, dyes which are substituted with an electron-withdrawing group or in which any of $A_1$, $A_2$ and B is a heterocycle are preferable.

Examples of a preferable electron-withdrawing group include a nitro group, a cyano group, a halogen group, a sulfamoyl group, a carbamoyl group, an ester group, and the like.

Examples of a preferable heterocycle include pyrazole, thiazole, isothiazole, oxazole, isoxazole and pyridine which may have a condensed ring.

Among those represented by formula (1), compounds represented by formula (4) below are particularly preferable.

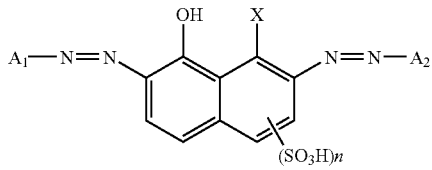

Formula (1)

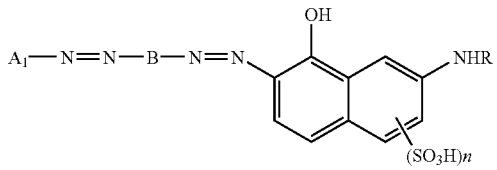

Formula (2)

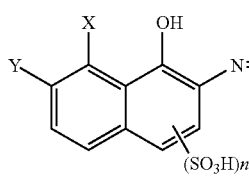

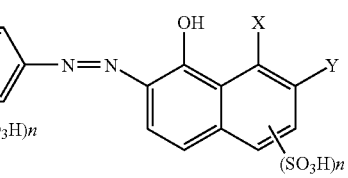

Formula (3)

In formulae (1) to (3), when there are a plurality of substituents which are represented by the same symbol in the same molecule, they may be either the same or different from each other. X represents an amino group, a hydroxyl group or a hydrogen atom. Y represents a hydrogen atom or an amino group. R represents a hydrogen atom, or an alkyl group, aralkyl group, an alkenyl group, an aryl group, a heterocyclic group, acyl group or a sulfonyl group which may have a substituent. Representative examples of the substituent which may be possessed by these groups include halogen atoms, ionic hydrophilic groups (a sulfo group, a carboxyl group, etc.), alkoxy groups, a hydroxy group, acylamino groups, acyl groups, a carbamoyl group, a sulfamoyl group, and the like. n represents an integer of 0 to 3. A sulfo group may be Formula (4)

In formula (4), $A_3$ and $A_4$ each independently represent a heterocyclic group or an aryl group represented by formula 5 below. n represents an integer of 0 to 3.

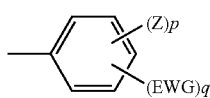

Formula (5)

In formula (5), EWG (Electron Withdrawing Group) represents an electron withdrawing group selected from the group consisting of a nitro group, a cyano group, an azo group, a sulfamoyl group, a carbamoyl group, and an ester group. Preferably, EWG represents a nitro group or an azo group. Z represents a substituent selected from an alkyl group, an alkoxy group, a sulfo group, a carboxyl group, an amino group, and an acylamino group. A substituent represented by EWG or Z may further have a substituent. p represents an integer of 0 to 4. q represents an integer of 0 to 3, preferably 1 or 2.

Hereinafter, examples of the long-wavelength dye L will be illustrated in the form of a free acid, though may be used in the form of any salt.

Examples of a preferable counter cation, include alkali metals (e.g., lithium, sodium, potassium), ammonium, and organic cations (e.g., pyridinium, tetramethylammonium, guanidium).

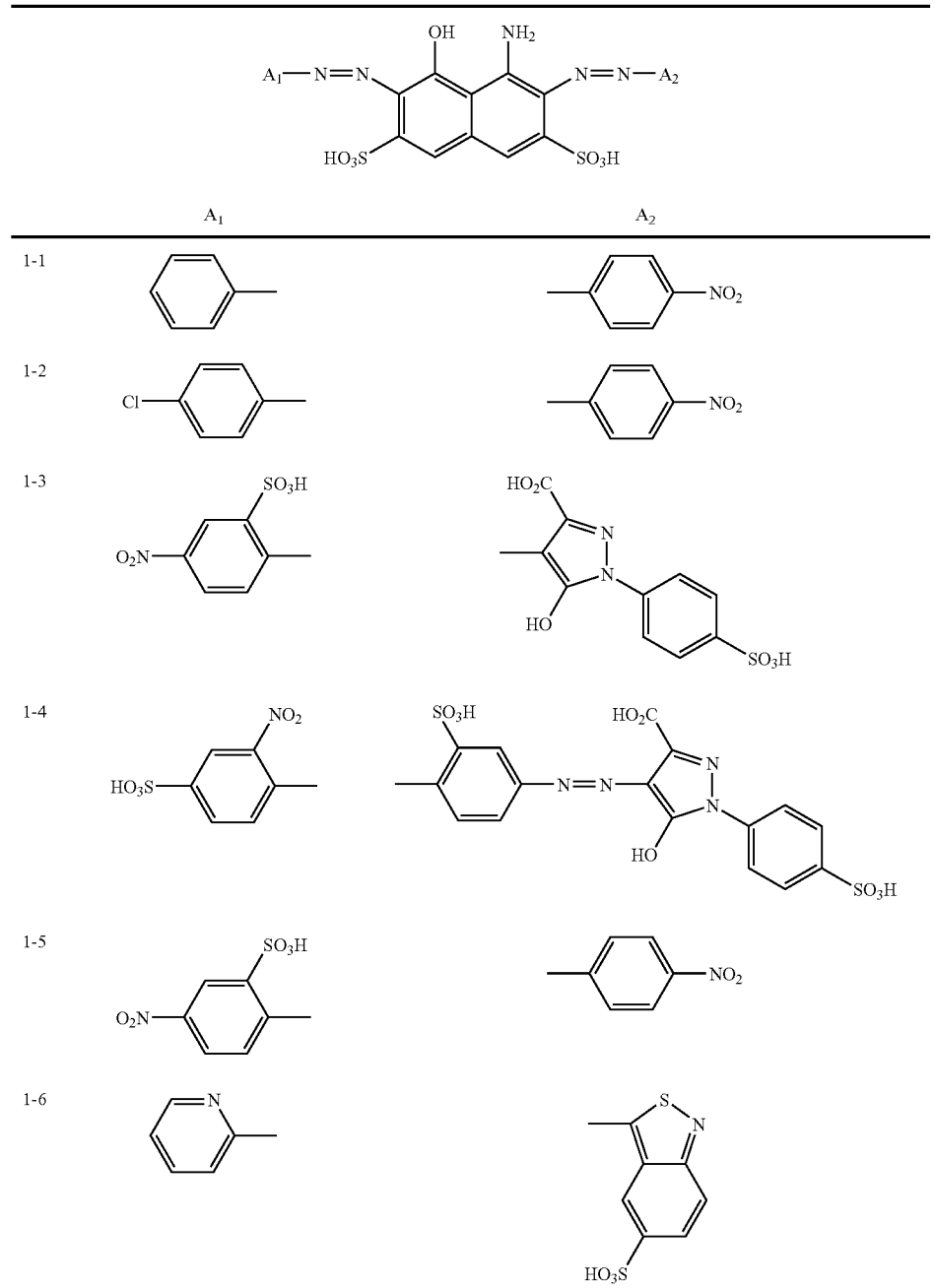

-continued
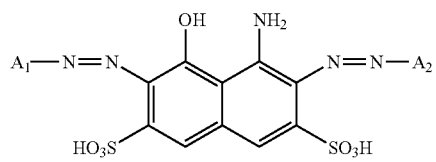
| | A₁ | A₂ |
|---|---|---|
| 1-7 | 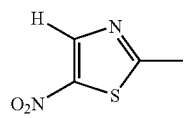 | 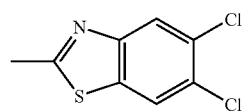 |
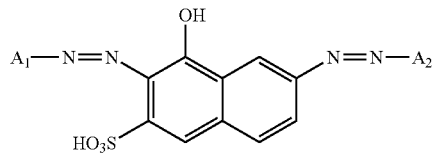
| | A₁ | A₂ |
|---|---|---|
| 1-8 | 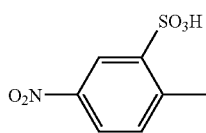 | 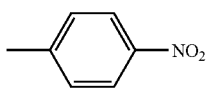 |
| 1-9 | 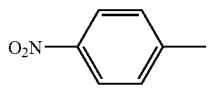 | 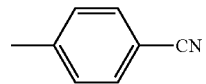 |
| 1-10 | 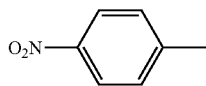 | 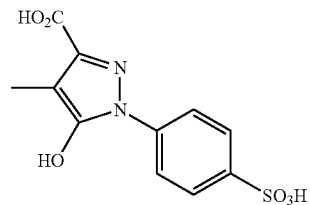 |
| 1-11 | 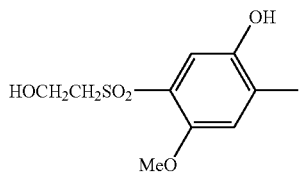 | 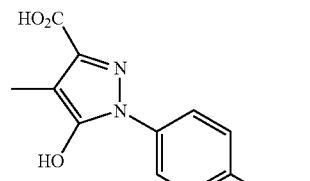 |
| 1-12 | 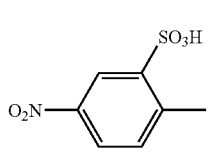 | 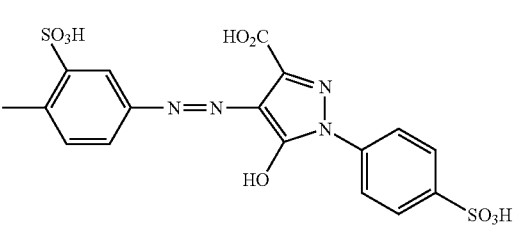 |

-continued
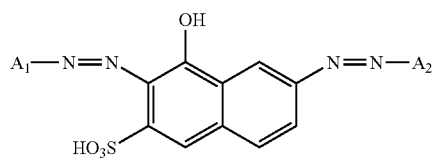
| | $A_1$ | $A_2$ |
|---|---|---|
| 1-13 | 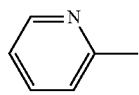 | 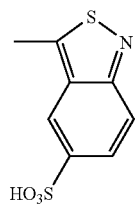 |
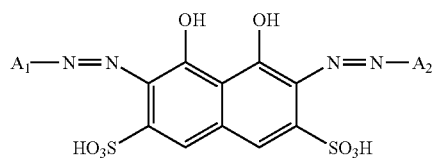
| | $A_1$ | $A_2$ |
|---|---|---|
| 1-14 | 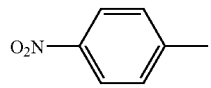 | 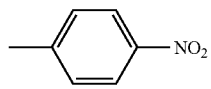 |
| 1-15 | 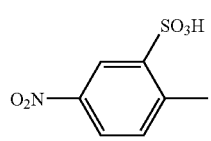 | 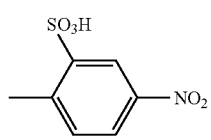 |
| 1-16 | 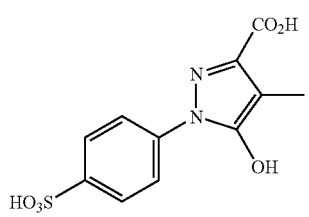 | 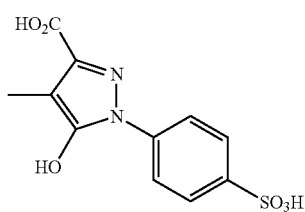 |
| 1-17 | 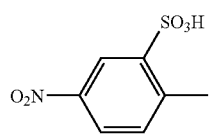 | 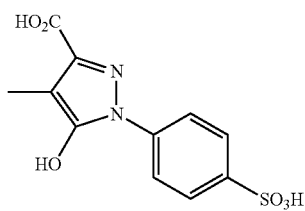 |

-continued
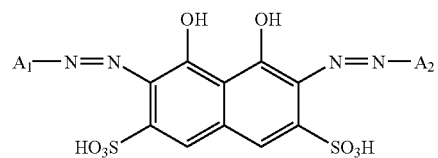
| | $A_1$ | $A_2$ |
|---|---|---|
| 1-18 | 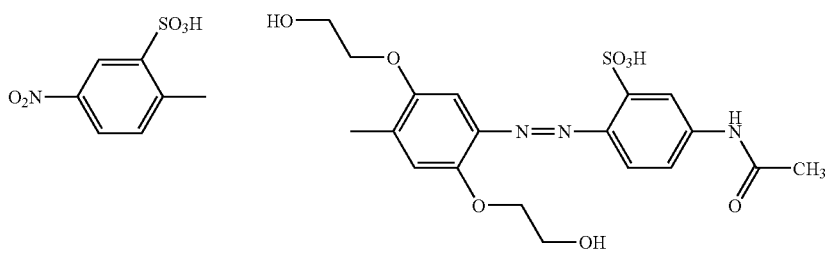 | |
| 1-19 | 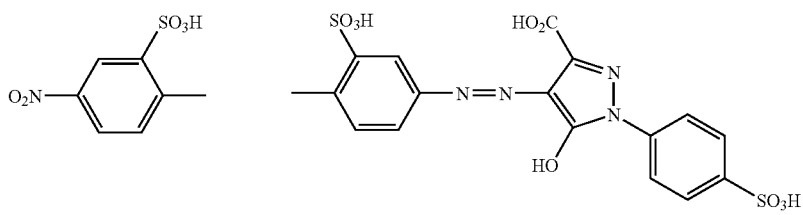 | |
| | A | B | R |
|---|---|---|---|
| | 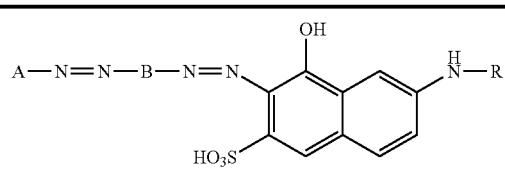 | | |
| 2-1 | 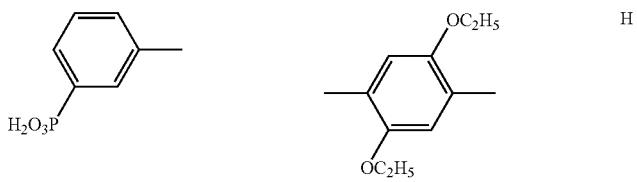 | | H |
| 2-2 | 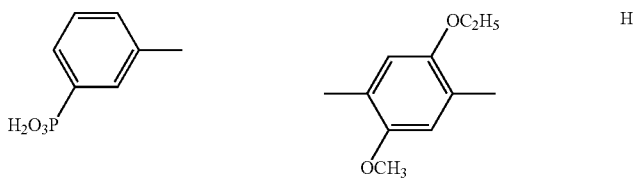 | | H |
| 2-3 | 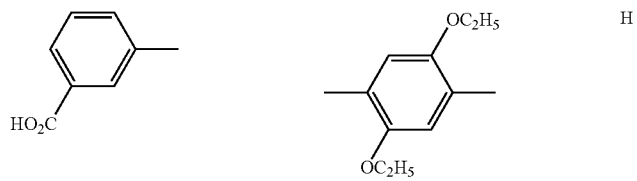 | | H |

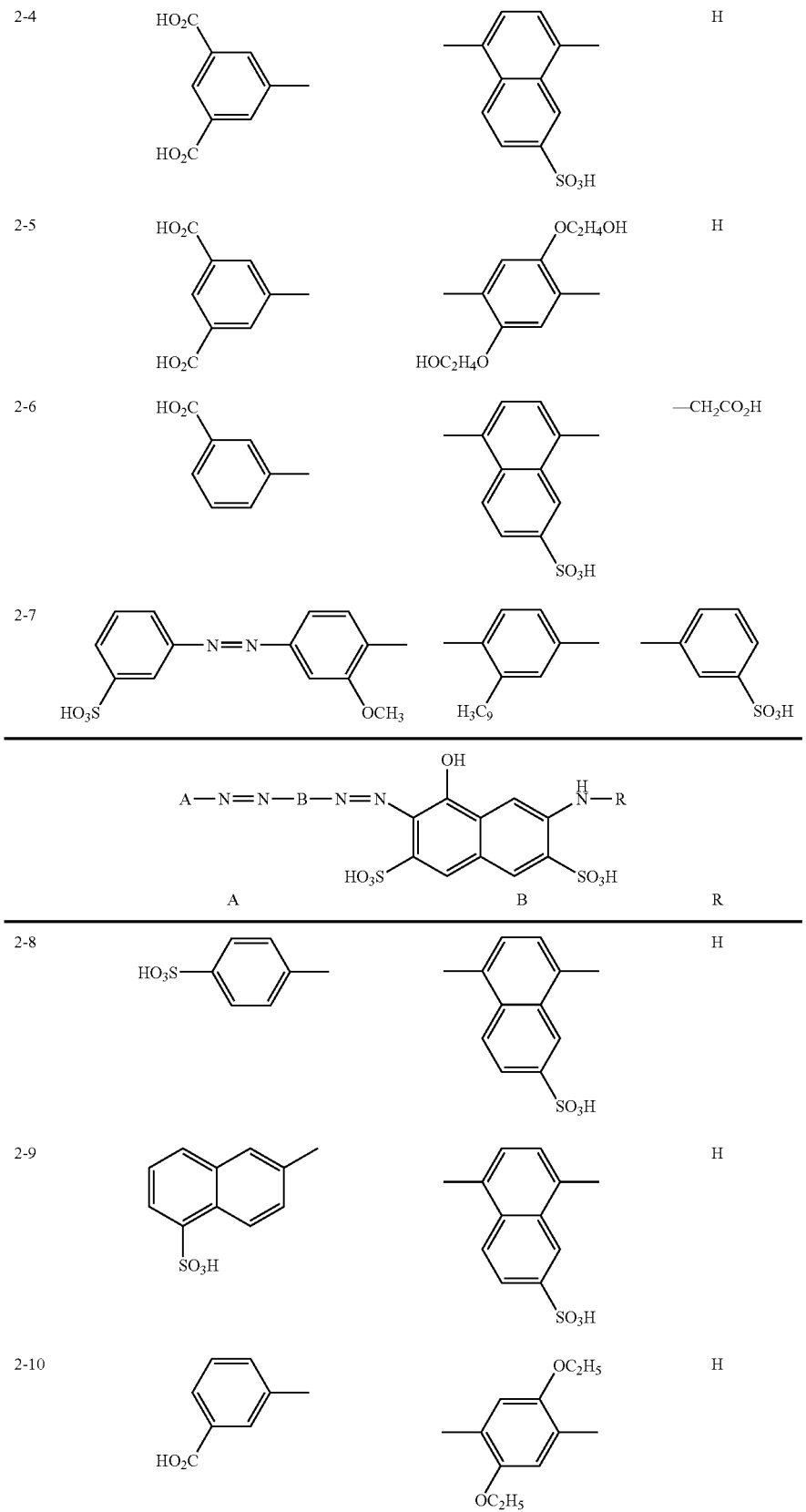

-continued
| | | | |
|---|---|---|---|
| 2-11 | 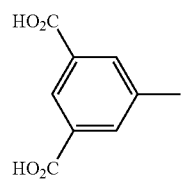 | 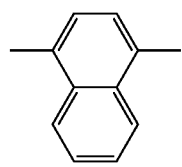 | H |
| 2-12 | 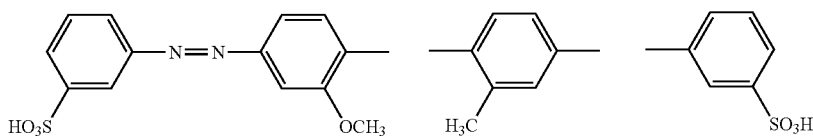 | | |
| 2-13 | 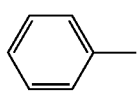 | 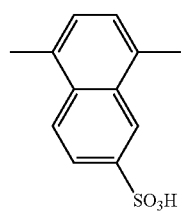 | —COCH₃ |
| | |
|---|---|
| 3-1 | 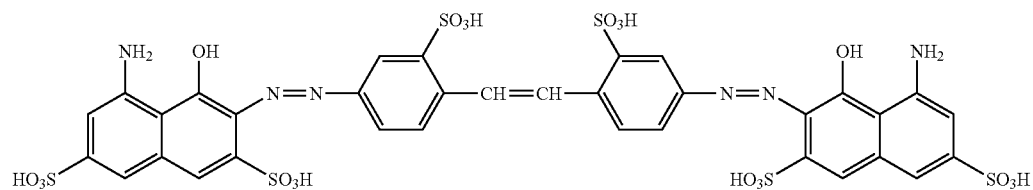 |
| 3-2 | 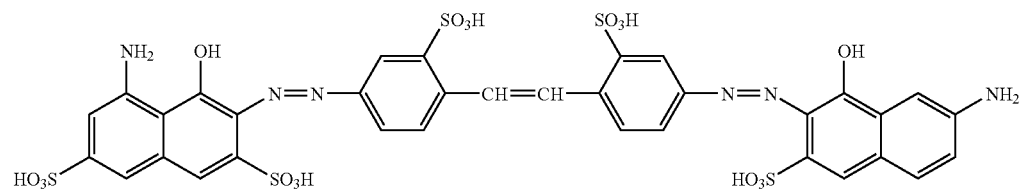 |
| 3-3 | 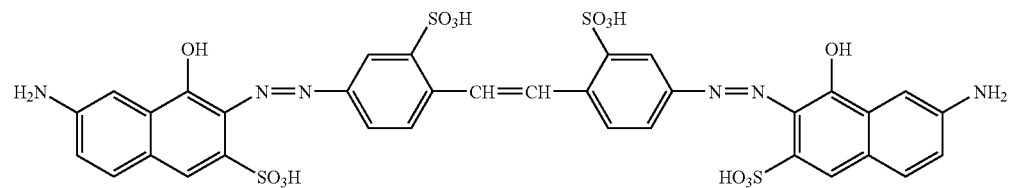 |
| 4-1 | 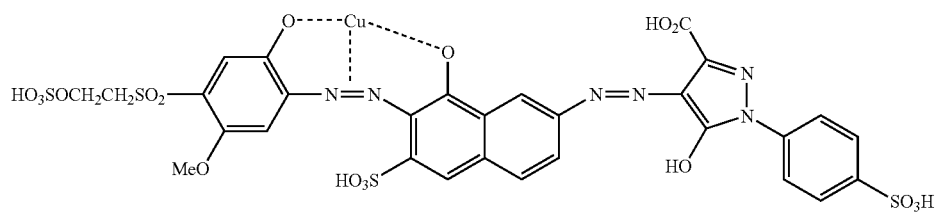 |

4-2 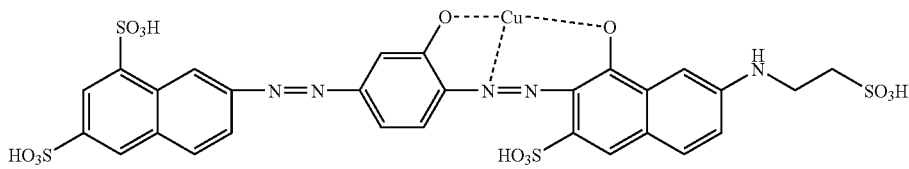

In addition to the dyes represented by the above-described formulas, a dye described in each of Japanese Unexamined Patent Publication Nos. H10-130557, H09-255906, H07-97541 and H06-234944, European Patent No. 982371 A1, Japanese Unexamined Patent Publication Nos. 2002-302619, 2002-327131 and 2002-265809, International Publication Nos. 2000-43450, 2000-43451, 2000-43452, 2000-43453, 2003-106572 and 2003-104332, and Japanese Unexamined Patent Publication Nos. 2003-238862 and 2004-83609, can be preferably used as the long-wavelength dye L.

The black ink composition of the present invention contains the above-described long-wavelength dye L in an amount of preferably 0.2 to 30% by weight, particularly preferably 0.5 to 15% by weight, and most preferably 1 to 10% by weight.

Regarding a ratio of the short-wavelength dye S to the long-wavelength dye L, the amount of the short-wavelength dye S is preferably 1 to 50% by weight with respect to the long-wavelength dye L, more preferably 5 to 40% by weight, and most preferably 10 to 30% by weight.

(Black Ink Composition)

The black ink composition of the present invention means an ink composition containing at least a short-wavelength dye S and a long-wavelength dye L. The black ink composition of the present invention can contain a medium. When a solvent is used as the medium, the black ink composition of the present invention is particularly preferable as an inkjet recording ink.

The black ink composition of the present invention can be produced by using an oil medium or a water medium as the medium and dissolving and/or dispersing the dye of the present invention into the medium. Preferably, a water medium is used. The water medium contains water as a major ingredient, and may also be blended with a water-miscible organic solvent as required. An example of the water-miscible organic solvent is disclosed in Japanese Unexamined Patent Publication No. 2003-306623. Note that two or more water-miscible organic solvents may be used in combination. The black ink composition of the present invention includes an ink composition which does not contain a medium, and may be an ink composition containing water, a water-miscible organic solvent and a short-wavelength dye S.

Hereinafter, ingredients of the black ink composition of the present invention will be described in detail. When an ink set comprises the black ink composition of the present invention and other color ink compositions, information about the black ink composition of the present invention can be applied to the other color ink compositions.

(Water)

Although water is not particularly limited, it is preferable that water contains less impurities. Ultrapure water having a resistance value of 18 MΩ or more is more preferable.

(Water-Miscible Organic Solvent)

The water-miscible organic solvent preferably has a vapor pressure of 2000 Pa or less. The vapor pressure is a value measured at 20° C. The water-miscible organic solvent having such a vapor pressure has a dry protecting function for preventing nozzle clogging due to dried ink and a penetration promoting function for causing ink to penetrate into paper better.

In the present invention, water-miscible organic solvents having a vapor pressure at 20° C. of 2,000 Pa or less may be used singly or in combination of two or more. When a plurality of water-miscible organic solvents are used, it is preferable that at least one of the water-miscible organic solvents has a vapor pressure at 20° C. of 2,000 Pa or less.

Specific examples of a water-miscible organic solvent having the dry protecting function include polyhydric alcohols (e.g., representatively, ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerin, trimethyrolpropane, etc.), lower alkyl ethers of polyhydric alcohols (e.g., ethylene glycol monomethyl (or monoethyl) ether, diethylene glycol monomethyl (or monoethyl) ether, triethylene glycol monomethyl (or monobutyl) ether, etc.), heterocycles (e.g., 2-pyrrolidone, N-methyl-2-pyrrolidone, 1,3-dimethyl-2-imidazolidinone, N-ethylmorpholine, etc.), sulfur-containing compounds (e.g., sulfolane, dimethyl sulfoxide, 3-sulfolene, etc.), polyfunctional compounds (e.g., diacetone alcohol, diethanol amine, etc.), and urea derivatives. Among them, polyhydric alcohols, such as glycerin, diethylene glycol, and the like, are more preferable.

Examples of a water-miscible organic solvent having the penetration promoting function include lower monoalkyl ethers of polyhydric alcohols (e.g., monomethyl ether, monoethyl ether, mono-n-butyl ether, mono-iso-butyl ether, mono-n-hexyl ether and the like of ethylene glycol, diethylene glycol, triethylene glycol, propylene glycol and diproplylene glycol), lower dialkyl ethers of polyhydric alcohols (e.g., dimethyl ether, diethyl ether and the like of ethylene glycol, diethylene glycol, triethylene glycol and propylene glycol), and the like.

In addition to the above-described functions, the water-miscible organic solvent for use in the present invention may also have other functions, such as a viscosity adjusting function and the like.

It is preferable that the water-miscible organic solvent contains at least one selected from the group consisting of alcohol compounds, heterocycle-containing organic solvents, and alkyl ethers of polyhydric alcohols.

Examples of the alcohol compound include monovalent alcohols having 1 to 4 carbon atoms, alkanediols, and the like.

As the monovalent alcohol having 1 to 4 carbon atoms, methanol, ethanol, 1-propanol, 2-propanol (isopropanol), 1-butanol, 2-methyl-1-propanol (isobutanol), tert-butanol, and the like are preferable.

Examples of the alkanediol include 1,2-alkanediol (e.g., 1,2-pentanediol, 1,2-hexanediol), terminal diols (e.g., 1,4-butanediol, 1,5-pentanediol, 1,6-hexanediol, etc.), branched diols (e.g., 2,2-dimethyl-1,3-propanediol, 2-methyl-1,4-butanediol, 2-methyl-2,4-pentanediol, 3-methyl-1,5-pentanediol, 3-methyl-1,3-butanediol, 2-methyl-1,3-propanediol, 2,5-dimethyl-2,5-hexanediol); and the like. These are used singly or in combination.

An example of the heterocycle-containing organic solvent is represented by formula (A) below.

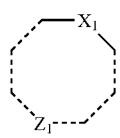

Formula (A)

In formula (A), $X_1$ represents a carbonyl group or a group containing a heteroatom, and $Z_1$ represents a group of atoms which can constitute a heterocycle.

Examples of $X_1$ include a carbonyl group, an oxycarbonyl group, a carbonate group, an amide group, an urethane group, an ureido group, an amino group, an imino group, an ether group, an thioether group, a phosphoric acid derivative group, a phosphonic acid derivative group, a sulfonyl group, a sulfonamide group, a sulfonyl urea group, and the like. Among them, the amide group is preferable.

$Z_1$ represents a group of atoms which can constitute a heterocycle. $Z_1$ may be a ring composed of only carbon atoms. Alternatively, $Z_1$ may contain a heteroatom in the carbon atom chain. The ring may or may not have an aromatic property. $Z_1$ may also be a compound in which a plurality of rings are condensed.

The compound represented by formula (A) can have various substituents in its structure. Examples of the substituent include aryl groups (e.g., preferably having 1 to 20 carbon atoms, more preferably 1 to 12 carbon atoms, and particularly preferably 1 to 8 carbon atoms (e.g., methyl, ethyl, iso-propyl, tert-butyl, n-octyl, n-decyl, n-hexadecyl, cyclopropyl, cyclopentyl, cyclohexyl, etc.)), alkenyl groups (e.g., preferably having 2 to 20 carbon atoms, more preferably 2 to 12 carbon atoms, and particularly preferably 2 to 8 carbon atoms (e.g., vinyl, allyl, 2-butenyl, 3-pentenyl, etc.)), alkynyl groups (e.g., preferably having 2 to 20 carbon atoms, more preferably 2 to 12 carbon atoms, and particularly preferably 2 to 8 carbon atoms (e.g., propargyl, 3-pentynyl, etc.)), aryl groups (e.g., preferably having 6 to 30 carbon atoms, more preferably 6 to 20 carbon atoms, and particularly preferably 6 to 12 carbon atoms (e.g., phenyl, p-methylphenyl, naphthyl, etc.)), amino groups (e.g., preferably having 0 to 20 carbon atoms, more preferably 0 to 12 carbon atoms, and particularly preferably 0 to 6 carbon atoms (e.g., amino, methylamino, dimetylamino, diethylamino, diphenylamino, dibenzylamino, etc.)), alkoxy groups (e.g., preferably having 1 to 20 carbon atoms, more preferably 1 to 12 carbon atoms, and particularly preferably 1 to 8 carbon atoms (e.g., methoxy, ethoxy, butoxy, etc.)), aryloxy groups (e.g., preferably having 6 to 20 carbon atoms, more preferably 6 to 16 carbon atoms, and particularly preferably 6 to 12 carbon atoms (e.g., phenyloxy, 2-naphthyloxy, etc.)), acyl groups (e.g., preferably having 1 to 20 carbon atoms, more preferably 1 to 16 carbon atoms, and particularly preferably 1 to 12 carbon atoms (e.g., acetyl, benzoyl, formyl, pivaloyl, etc.)), alkoxycarbonyl groups (e.g., preferably having 2 to 20 carbon atoms, more preferably 2 to 16 carbon atoms, and particularly preferably 2 to 12 carbon atoms (e.g., methoxycarbonyl, ethoxycarbonyl, etc.)), aryloxycarbonyl groups (e.g., preferably having 7 to 20 carbon atoms, more preferably 7 to 16 carbon atoms, and particularly preferably 7 to 10 carbon atoms (e.g., phenyloxycarbonyl, etc.)), acyloxy groups (e.g., preferably having 2 to 20 carbon atoms, more preferably 2 to 16 carbon atoms, and particularly preferably 2 to 10 carbon atoms (e.g., acetoxy, benzoyloxy, etc.)), acylamino groups (e.g., preferably having 2 to 20 carbon atoms, more preferably 2 to 16 carbon atoms, and particularly preferably 2 to 10 carbon atoms (e.g., acetylamino, benzoylamino, etc.)), alkoxycarbonylamino groups (e.g., preferably having 2 to 20 carbon atoms, more preferably 2 to 16 carbon atoms, and particularly preferably 2 to 12 carbon atoms (e.g., methoxycarbonylamino, etc.)), aryloxycarbonylamino groups (e.g., preferably having 7 to 20 carbon atoms, more preferably 7 to 16 carbon atoms, and particularly preferably 7 to 12 carbon atoms (e.g., phenyloxycarbonylamino, etc.)), sulfonylamino groups (e.g., preferably having 1 to 20 carbon atoms, more preferably 1 to 16 carbon atoms, and particularly preferably 1 to 12 carbon atoms (e.g., methylsulfonylamino, phenylsulfonylamino, etc.)), sulfamoyl groups (e.g., preferably having 0 to 20 carbon atoms, more preferably 0 to 16 carbon atoms, and particularly preferably 0 to 12 carbon atoms (e.g., sulfamoyl, methylsulfamoyl, dimethylsulfamoyl, phenylsulfamoyl, etc.)), carbamoyl groups (e.g., preferably having 1 to 20 carbon atoms, more preferably 1 to 16 carbon atoms, and particularly preferably 1 to 12 carbon atoms (e.g., carbamoyl, methylcarbamoyl, diethylcarbamoyl, phenylcarbamoyl, etc.)), alkylthio groups (e.g., preferably having 1 to 20 carbon atoms, more preferably 1 to 16 carbon atoms, and particularly preferably 1 to 12 carbon atoms (e.g., methylthio, ethylthio, etc.)), arylthio groups (e.g., preferably having 6 to 20 carbon atoms, more preferably 6 to 16 carbon atoms, and particularly preferably 6 to 12 carbon atoms (e.g., phenylthio, etc.)), sulfonyl groups (e.g., preferably having 1 to 20 carbon atoms, more preferably 1 to 16 carbon atoms, and particularly preferably 1 to 12 carbon atoms (e.g., mesyl, tosyl, etc.)), sulfinyl groups (e.g., preferably having 1 to 20 carbon atoms, more preferably 1 to 16 carbon atoms, and particularly preferably 1 to 12 carbon atoms (e.g., methlsulfinyl, phenylsulfinyl, etc.)), ureido groups (e.g., preferably having 1 to 20 carbon atoms, more preferably 1 to 16 carbon atoms, and particularly preferably 1 to 12 carbon atoms (e.g., ureide, methylureide, phenylureide, etc.)), phosphoric acid amide groups (e.g., preferably having 1 to 20 carbon atoms, more preferably 1 to 16 carbon atoms, and particularly preferably 1 to 12 carbon atoms (e.g., diethyl phosphoric acid amide, phenyl phosphoric acid amide, etc.)), a hydroxy group, a mercapto group, halogen atoms (e.g., a fluorine atom, a chlorine atom, a bromine atom, an iodine atom), a cyano group, a sulfo group, a carboxyl group, a nitro group, a hydroxamic acid group, a sulfino group, a hydrazino group, an imino group, heterocyclic groups (e.g., preferably having 1 to 30 carbon atoms, and more preferably 1 to 12 carbon atoms, and having a heteroatom, such as a nitrogen atom, an oxygen atom or a sulfur atom, (e.g., specifically, imidazolyl, pyridyl, quinolyl, furyl, thienyl, piperidyl, morpholino, benzoxazolyl, benzoimidazolyl, benzothiazolyl, carbazolyl, azepinyl, etc.)), silyl groups (e.g., preferably having 3 to 40 carbon atoms, more preferably 3 to 30 carbon atoms, and particularly preferably 3 to 24 carbon atoms (e.g., trimethylsilyl, triphenylsilyl, etc.)), and the like. These substituents may be further substituted. When there are two or more substituents, these substituents may be the same or different. If possible, the substituents may be linked to form a ring(s).

The compound represented by formula (A) is preferably a monocyclic compound and is preferably liquid under room temperature and atmospheric pressure. As the compound represented by formula (A), various compounds, such as those having an oil- or water-soluble structure or the like, can be used, preferably a water-soluble compound.

Examples of a compound which is preferably used as the compound represented by formula (A) include 2-pyrrolidone, ε-caprolactam, tetrahydrofuran, 1,4-dioxane, 1,3-dimethylimidazolidinone (e.g., 1,3-dimethylimidazolidinone-2-on), N-methylpyrrolidone, ethylene urea, sulfolane, pyridine, pyrazine, morpholine, 1-methyl-2-pyridone, 2-methyl-2-oxazoline, 2-ethyl-2-oxazoline, 2,4,4-trimethyl-2-oxazoline, and the like. These are used singly or in combination. The present invention is not limited by this.

Examples of alkyl ethers of polyhydric alcohols include lower monoalkyl ethers of polyhydric alcohols (e.g., monomethyl ether, monoethyl ether, mono-n-butyl ether, mono-isobutyl ether, mono-n-hexyl ether and the like of ethylene glycol, diethylene glycol, triethylene glycol, tetraethylene glycol, propylene glycol, diproplylene glycol, and tripropylene glycol), lower dialkyl ethers of polyhydric alcohols (e.g., dimethyl ether, diethyl ether, di-n-butyl ether, di-iso-butyl ether, di-n-hexyl ether and the like of ethylene glycol, diethylene glycol, triethylene glycol, propylene glycol, diproplylene glycol, and tripropylene glycol), and the like. These are used singly or in combination.

The black ink composition of the present invention preferably contains, as a water-miscible organic solvent, one or more selected, from diethylene glycol, triethylene glycol, glycerin, triethylene glycol monobutyl ether, 1,5-pentanediol, 1,2-hexanediol, isopropanol, triethanolamine, and 2-pyrrolidone.

In the black ink composition of the present invention, the water-miscible organic solvent is contained typically in an amount of 1 to 80% by weight, preferably 5 to 60% by weight, and more preferably 10 to 50% by weight.

In combination with the above-described water-miscible organic solvent, other water-miscible organic solvents which have a vapor pressure of more than 2,000 Pa at 20° C. may be used in an amount of 20% or less by weight in the ink. An example of the water-miscible organic solvent used in combination therewith is ethanol or the like.

(Surfactant)

The black ink composition of the present invention preferably contains a surfactant.

By causing the black ink composition of the present invention to contain a surfactant to adjust a liquid physical property (e.g., surface tension, etc.) of the ink, excellent effects can be obtained, such as an improvement in the ejection stability of the ink; an improvement in water resistance of an image; prevention of bleeding of the printed ink; and the like.

Examples of the surfactant include anionic surfactants. (e.g., fatty acid salts, alkyl sulfuric acid ester salts, alkylbenzene sulfates, alkylnaphthalene sulfonates, dialkylsulfo succinates, alkyl phosphoric acid ester salts, naphthalene sulfonic acid-formalin condensates, polyoxyethylene alkyl sulfuric acid ester salts, etc.), cationic surfactants (e.g., fatty amine salt, quaternary ammonium salt, alkylpyridinium salt, etc.), nonionic surfactants (e.g., polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkyl amine, glycerin fatty acid ester, oxyethylene-oxypropylene block copolymer, acetylene-based polyoxyethylene oxide, etc.), amphoteric surfactants of an amino acid type, a betaine type and the like, fluorine-based compounds, silicon-based compounds, and the like. These are used singly or in combination.

The nonionic surfactants are preferable in terms of the above-described effects and, in addition, the ejection stability of ink and the ability to penetrate into paper. Particularly, compounds represented by formula (I), (II) or (III) are more preferable.

Mono- or dialkyl ethers of polyhydric alcohols (e.g., triethylene glycol monobutyl ether, triethylene glycol monomethyl ether, diethylene glycol monobutyl ether, diethylene glycol monoethyl ether, diethylene glycol diethyl ether, diethylene glycol dimethyl ether, etc.) have a surfactant function. However, these substances are herein regarded as penetrants, but not as surfactants.

Firstly, compounds represented by formula (a) will be described.

Formula (I)

In formula (I), $R^{21}$ represents an alkyl group having 5 to 40 carbon atoms, preferably 8 to 18 carbon atoms, which may be linear or branched and may be substituted.

Examples of a group with which the alkyl group represented by $R^{21}$ can be substituted include aryl groups (e.g., phenyl, o-tolyl, p-tolyl, p-t-butylphenyl), alkoxy groups (e.g., methoxy, ethoxy, n-butoxy), halogen atoms (e.g., a chloride atom, a bromine atom), and the like.

Specific examples of the alkyl group represented by $R^{21}$ include n-pentyl, n-hexyl, n-octyl, n-decyl, n-dodecyl, n-pentadecyl, n-octadecyl, 2-ethylhexyl, 1-ethylpentyl, 1-n-butylpentyl, 1-n-pentylhexyl, 1-n-hexylpeptyl, 1-n-heptyloctyl, 1-n-octylnonyl, 6-methoxyhexyl, 2-phenylethyl, and the like.

$m_1$ represents the average number of moles of ethylene oxide attached, which is 2 to 40, preferably 3 to 30, and particularly preferably 3 to 20.

Among the compounds represented by formula (I), compounds represented by formula (I-1) below are particularly preferable.

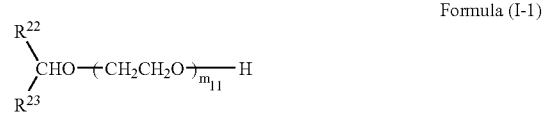

Formula (I-1)

In formula (I-1), $R^{22}$ and $R^{23}$ each represent a saturated hydrocarbon group having 4 to 10 carbon atoms. The total number of carbon atoms in $R^{22}$ and $R^{23}$ is 8 to 18. $m_{11}$ represents the average number of moles of ethylene oxide attached, which is 3 to 20. Examples of the saturated hydrocarbon group having 4 to 10 carbon atoms, which is represented by $R^{22}$, $R^{23}$, include n-butyl, i-butyl, n-pentyl, n-hexyl, n-heptyl, n-octyl, 2-ethylhexyl, n-nonyl, n-decyl, and the like. The total number of carbon atoms in $R^{22}$ and $R^{23}$ is 8 to 18, more preferably 8 to 16. $m_{11}$ is 3 to 20, more preferably 5 to 20, and even more preferably 6 to 18.

Hereinafter, specific examples of the compound represented by formula (I) will be illustrated. The present invention is not limited to these examples.

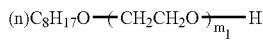

W1-1, 2

W1-1: $m_1 = 5$
W1-2: $m_1 = 10$

W1-3, 4

W1-3: $m_1 = 10$
W1-4: $m_1 = 15$

W1-5~7

W1-5: $m_1 = 10$
W1-6: $m_1 = 15$
W1-7: $m_1 = 20$

W1-8

W1-9

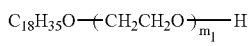

W1-10, 11

W1-10: $m_1 = 12$
W1-11: $m_1 = 25$

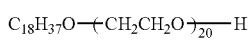

W1-12

Hereinafter, specific examples of the compound represented by formula (I-1) will be illustrated in Table 1. The present invention is not limited to these examples.

| No. | $R^{22}$ | $R^{23}$ | $m_{11}$ |
|---|---|---|---|
| W1-13 | (n)$C_4H_9$ | (n)$C_4H_9$ | 3 |
| W1-14 | (i)$C_4H_9$ | (i)$C_4H_9$ | 5 |
| W1-15 | (i)$C_4H_9$ | (i)$C_4H_9$ | 9.5 |
| W1-16 | (i)$C_4H_9$ | (i)$C_4H_9$ | 11.4 |
| W1-17 | (n)$C_5H_{11}$ | (n)$C_5H_{11}$ | 8 |
| W1-18 | (n)$C_5H_{11}$ | (n)$C_5H_{11}$ | 10 |
| W1-19 | (n)$C_5H_{11}$ | (n)$C_5H_{11}$ | 11.4 |
| W1-20 | (n)$C_5H_{11}$ | (n)$C_5H_{11}$ | 13.5 |
| W1-21 | (n)$C_5H_{11}$ | (n)$C_6H_{13}$ | 15 |
| W1-22 | (n)$C_6H_{13}$ | (n)$C_6H_{13}$ | 10 |
| W1-23 | (n)$C_6H_{13}$ | (n)$C_6H_{13}$ | 13.6 |
| W1-24 | (n)$C_6H_{13}$ | (n)$C_6H_{13}$ | 15.8 |
| W1-25 | (n)$C_6H_{13}$ | (n)$C_7H_{15}$ | 16 |
| W1-26 | (n)$C_7H_{15}$ | (n)$C_7H_{15}$ | 15 |
| W1-27 | (n)$C_7H_{15}$ | (n)$C_7H_{15}$ | 16.5 |
| W1-28 | (n)$C_8H_{17}$ | (n)$C_8H_{17}$ | 14 |
| W1-29 | (n)$C_8H_{17}$ | (n)$C_8H_{17}$ | 17.6 |
| W1-30 | (n)$C_8H_{17}$ | (n)$C_{10}H_{21}$ | 20 |

Next, compounds represented by formula (II) will be described.

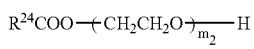

Formula (II)

In formula (II), $R^{24}$ represents an alkyl group having 5 to 40 carbon atoms, preferably 5 to 30 carbon atoms, which may be linear or branched and may be substituted.

Examples of a group with which the alkyl group represented by $R^{24}$ can be substituted include aryl groups (e.g., phenyl, o-tolyl, p-tolyl, p-t-butylphenyl), alkoxy groups (e.g., methoxy, ethoxy, n-butoxy, etc.), halogen atoms (e.g., a chloride atom, a bromine atom), and the like. Specific examples of the alkyl group represented by $R^{24}$ include n-pentyl, n-hexyl, n-octyl, n-decyl, n-dodecyl, n-pentadecyl, n-octadecyl, 2-ethylhexyl, 1-ethylpentyl, 1-n-butylheptyl, 1-n-hexynonyl, 1-n-heptyldecyl, 1-n-octyldodecyl, 1-n-decyltetradecyl, 6-methoxyhexyl, 2-phenylethyl, and the like.

$m_2$ represents the average number of moles of ethylene oxide attached, which is 2 to 40, preferably 3 to 30, and particularly preferably 4 to 20.

Among the compounds represented by formula (II), compounds represented by formula (II-1) below are particularly preferable.

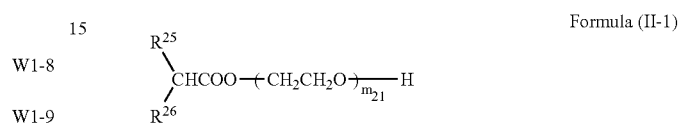

Formula (II-1)

In formula (II-1), $R^{25}$ and $R^{26}$ each represent a saturated hydrocarbon group having 2 to 20 carbon atoms, preferably 4 to 13. Examples of the saturated hydrocarbon group having 2 to 20 carbon atoms, which is represented by $R^{25}$, $R^{26}$, include n-butyl, i-butyl, n-pentyl, n-hexyl, n-heptyl, n-octyl, 2-ethylhexyl, n-nonyl, n-decyl, n-dodecyl, n-hexadecyl, n-octadecyl, and the like. $m_{21}$ represents the average number of moles of ethylene oxide attached, which is 2 to 40, preferably 3 to 30.

Hereinafter, specific examples of the compound represented by formula (II) will be illustrated. The present invention is not limited to these examples.

(n)$C_7H_{15}$COO—(CH$_2$CH$_2$O)$_{m_2}$—H

W2-1, 2

W2-1: $m_2 = 10$
W2-2: $m_2 = 15$ (n)$C_{11}H_{23}$COO—(CH$_2$CH$_2$O)$_{m_2}$—H

W2-3~5

W2-3: $m_2 = 10$
W2-4: $m_2 = 15$
W2-5: $m_2 = 20$ (n)$C_{13}H_{27}$COO—(CH$_2$CH$_2$O)$_{m_2}$—H

W2-6~7

W2-6: $m_2 = 10$
W2-7: $m_2 = 15$ (n)$C_{15}H_{31}$COO—(CH$_2$CH$_2$O)$_{m_2}$—H

W2-8, 9

W2-8: $m_2 = 10$
W2-9: $m_2 = 15$ $C_{17}H_{31}$COO—(CH$_2$CH$_2$O)$_{20}$—H

W2-10

$C_{17}H_{33}$COO—(CH$_2$CH$_2$O)$_{20}$—H

W2-11

$C_{17}H_{35}$COO—(CH$_2$CH$_2$O)$_{15}$—H

W2-12

Examples of the compound represented by formula (II-1) include polyethylene oxide of 2-butyloctanoic acid which is esterified at one terminal, a polyethylene oxide adduct of undecane-6-ol, and the like. Specific examples of the compound represented by formula (II-1) will be illustrated in Table 2 below. The present invention is not limited to these examples.

| No. | $R^{25}$ | $R^{26}$ | $m_{21}$ |
|---|---|---|---|
| W2-13 | $C_2H_5$ | $C_4H_9$ | 3 |
| W2-14 | $C_2H_5$ | $C_4H_9$ | 5 |
| W2-15 | $C_4H_9$ | $C_6H_{13}$ | 9.5 |
| W2-16 | $C_6H_{13}$ | $C_8H_{17}$ | 5 |
| W2-17 | $C_6H_{13}$ | $C_8H_{17}$ | 8 |
| W2-18 | $C_6H_{13}$ | $C_8H_{17}$ | 10 |
| W2-19 | $C_6H_{13}$ | $C_8H_{17}$ | 11.4 |
| W2-20 | $C_6H_{13}$ | $C_8H_{17}$ | 12.5 |
| W2-21 | $C_6H_{13}$ | $C_8H_{17}$ | 15 |
| W2-22 | $C_6H_{13}$ | $C_8H_{17}$ | 25 |
| W2-23 | $C_7H_{15}$ | $C_9H_{19}$ | 14 |
| W2-24 | $C_7H_{15}$ | $C_9H_{19}$ | 15 |
| W2-25 | $C_7H_{15}$ | $C_9H_{19}$ | 20 |
| W2-26 | $C_7H_{15}$ | $C_9H_{19}$ | 25 |
| W2-27 | $C_8H_{17}$ | $C_{10}H_{21}$ | 30 |
| W2-28 | $C_{10}H_{21}$ | $C_{12}H_{25}$ | 20 |
| W2-29 | $C_{10}H_{21}$ | $C_{12}H_{25}$ | 25 |
| W2-30 | $C_{10}H_{21}$ | $C_{13}H_{27}$ | 20 |
| W2-31 | $C_{10}H_{21}$ | $C_{13}H_{27}$ | 25 |
| W2-32 | $C_{10}H_{21}$ | $C_{13}H_{27}$ | 40 |

The compounds represented by formula (I) or (II) can be synthesized using a known method (e.g., a method described in Takehiko Fujimoto, entirely revised version, "Shin•Kaimenkasseizai Nyumon (New Introduction to Surfactants)", 1992, pp. 94-107.

Next, compounds represented by formula (III) will be described.

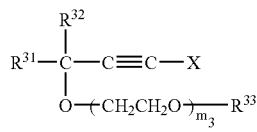

Formula (III)

In formula (III), $R^{31}$ and $R^{32}$ each independently represent an alkyl group having 1 to 18 carbon atoms.

More specifically, $R^{31}$ and $R^{32}$ each independently represent an alkyl group having 1 to 18 carbon atoms (e.g., methyl, ethyl, n-propyl, butyl, hexyl, octyl, decyl, dodecyl, etc.), and may be substituted. Examples of the substituent include alkyl groups (e.g., methyl, ethyl, isopropyl, etc.), alkoxy groups (e.g., methoxy, ethoxy, etc.), halogen atoms (e.g., a chloride atom, a bromine atom), and the like. Among them, as $R^{31}$ and $R^{32}$, non-substituted, linear or branched alkyl groups having 1 to 12 carbon atoms are preferable, specifically including methyl, ethyl, n-butyl, 2-methylbutyl, 2,4-dimethylpentyl, and the like.

$R^{32}$ represents a hydrogen atom, an alkyl group having 1 to 6 carbon atoms, or a phenyl group. The alkyl group or the phenyl group may be substituted.

Examples of a substituent for the alkyl group as $R^{33}$ include alkyl groups (e.g., methyl, ethyl, isopropyl, etc.), alkoxy groups (e.g., methoxy, ethoxy, etc.), and a phenyl group. Examples of a substituent for the phenyl group as $R^{33}$ include alkyl groups (e.g., methyl, ethyl, isopropyl, etc.), alkoxy groups (e.g., methoxy, ethoxy, etc.), halogen atoms (e.g., a fluorine atom, a chloride atom, a bromine atom, etc.), and the like. Preferably, $R^{33}$ is a hydrogen atom or an alkyl group having 1 to 4 carbon atoms. A hydrogen atom is particularly preferable.

X represents a hydrogen atom, or

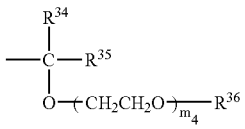

where $R^{34}$ and $R^{35}$ each independently represent an alkyl group having 1 to 18 carbon atoms. Preferable substituents and specific examples of $R^{34}$ and $R^{35}$ are selected from the same group as that of the above-described $R^{31}$ and $R^{32}$. $R^{36}$ represents a hydrogen atom, an alkyl group having 1 to 6 carbon atoms, and a phenyl group, and their preferable substituents and specific examples are selected from the same group as that of $R^{33}$.

$m_3$ and $m_4$ each represents the average number of moles of ethylene oxide attached. $m_3+m_4$ is 0 to 100, preferably 0 to 50, and particularly preferably 0 to 40.

Here, $R^{33}$ represents a hydrogen atom when $m_3=0$, and $R^{36}$ represents a hydrogen atom when $m_4=0$. When X represents a hydrogen atom, $m_3$ represents 1 to 100, preferably 1 to 50, and particularly preferably 1 to 40.

Among the compounds represented by formula (III), compounds represented by formula (III-1) below are particularly preferable.

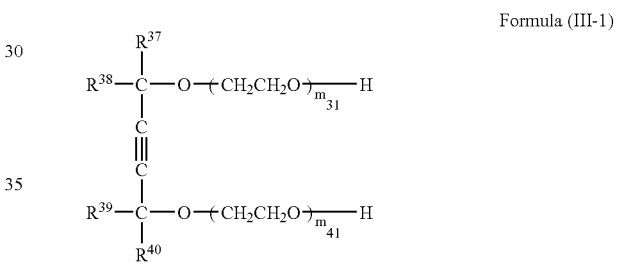

Formula (III-1)

In formula (III-1), $R^{37}$, $R^{38}$, $R^{39}$ and $R^{40}$ each independently represent an alkyl group having 1 to 6 carbon atoms, preferably 1 to 4 carbon atoms. $m_{31}$ and $m_{41}$ each represent the number of moles of ethylene oxide attached. The sum of $m_{31}$ and $m_{41}$ is a number of 0 to 40, preferably 2 to 20.

Hereinafter, specific examples of the compound represented by formula (III) or (III-1) will be illustrated. The present invention is not limited to these.

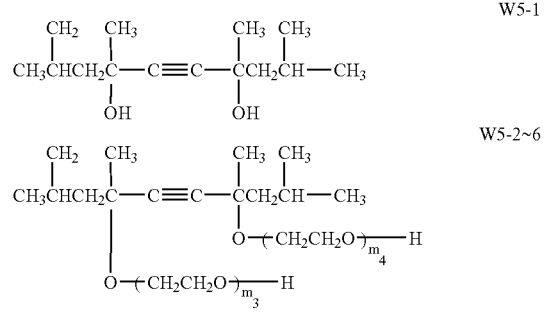

W5-2: $m_3 + m_4 = 1.3$
W5-3: $m_3 + m_4 = 3.5$
W5-4: $m_3 + m_4 = 10$
W5-5: $m_3 + m_4 = 20$
W5-6: $m_3 + m_4 = 30$

-continued

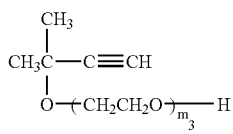
W5-7: m₃ = 5
W5-8: m₃ = 10

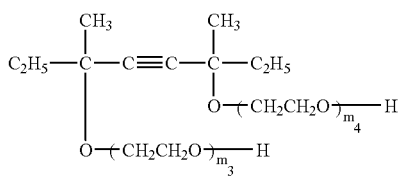
W5-9: m₃ + m₄ = 3
W5-10: m₃ + m₄ = 10

W5-11

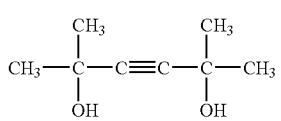

W5-12

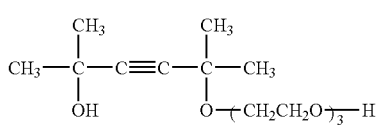

W5-13, 14

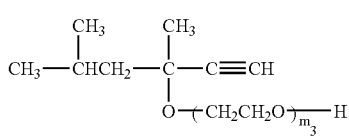
W5-13: m₃ = 5
W5-14: m₃ = 10

W5-15, 16

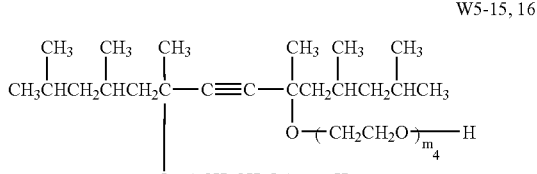
W5-15: m₃ + m₄ = 8
W5-16: m₃ + m₄ = 20

W5-17, 18

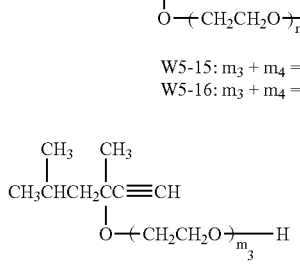
W5-17: m₃ = 5
W5-18: m₃ = 10

W5-19

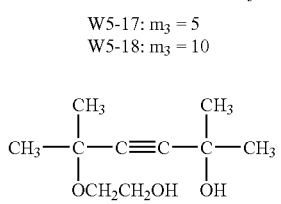

W5-7, 8

W5-20

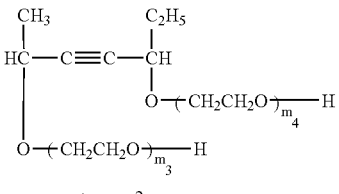
$m_3 + m_4 = 2$

The compounds represented by formula (III) or (III-1) can be synthesized using a known method (e.g., a method described in Takehiko Fujimoto, entirely revised version, "Shin•Kaimenkasseizai Nyumon (New Introduction to Surfactants)", 1992, pp. 94-107.

The compounds represented by formula (III) or (III-1) can also be easily obtained as commercially available products. Examples of specific trade names thereof include SURFYNOLs 61, 82, 104, 420, 440, 465, 485, 504, CT-111, CT121, CT-131, CT-136, CT-141, CT-151, CT-171, CT-324, DF-37, DF-58, DF-75, DF-110D, DF-210, GA, OP-340, PSA-204, PSA-216, PSA-336, SE and SE-F, and DYNOL 604. (Nissin Chemical Industry Co., Ltd. and Air Products & Chemicals, Inc.), OLFINEs A, B, AK-02, CT-151W, E1004, E1010, P, SPC, STG, Y and 32W (Nissin Chemical Industry Co., Ltd.), and the like.

Examples of the compound represented by formula (III-1) preferably include ethylene oxide adducts of acetylene series diols (SURFYNOL series (Air Products & Chemicals, Inc.), acetylene series diols (e.g., 2,4,7,9-tetramethyl-5-decyn-4,7-diol, 3,6-dimethyl-4-octin-3,6-diol, 2,5-dimethyl-3-hexin-2, 5-diol, and the like. Among them, compounds having a molecular weight of 200 or more and 1,000 or less are preferable, compounds having a molecular weight of 300 or more and 900 or less are more preferable, and compounds having a molecular weight of 400 or more and 900 or less are particularly preferable.

It is preferable that a surfactant contained in the black ink composition of the present invention resists precipitation and separation from the ink and has low foaming ability. In this regard, an anionic surfactant having two chains of hydrophobic sites or a branched hydrophobic site, an anionic or nonionic surfactant having a hydrophilic site in the vicinity of a middle of a hydrophobic site, and a nonionic surfactant having two chains of hydrophobic sites or a branched hydrophobic site, are preferable. Among them, the nonionic surfactant is preferable. In this regard, the compounds represented by formula (I-1) or (II-1) are preferable as the nonionic surfactants having two chains of hydrophobic sites or a branched hydrophobic site, and the compounds represented by formula (III-1) are preferable as the nonionic surfactants having a hydrophilic site in the vicinity of a middle of a hydrophobic site.

An example of a surfactant is an ethylene oxide adduct of polypropylene glycol. The example preferably includes compounds represented by formula (IV) below.

Formula (IV)

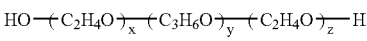

In formula (IV), x, y and z represent integers. It is preferable that y is an integer of 12 to 60, and x+z is an integer of 5 to 25.

Examples of the compound represented by formula (IV) include ADEKANOL L61, ADEKANOL L62, ADEKANOL L63, ADEKANOL L64, ADEKANOL L42, ADEKANOL L43, ADEKANOL L44, ADEKANOL L31, ADEKANOL L34, and the like. The present invention is not limited to these.

The surfactant is contained in the black ink composition of the present invention in an amount of 0.05 to 50 g/L, preferably 0.05 to 30 g/L, and more preferably 0.1 to 20 g/L. When the surfactant is contained in the black ink composition in an amount of less than 0.05 g/L, printing quality tends to be significantly reduced due to a reduction in ejection stability, occurrence of bleeding in mixing colors, occurrence of misting, or the like. When the surfactant is contained in the black ink composition in an amount of more than 50 g/L, printing may be impaired due to attachment of ink onto a surface of hardware, or the like.

(Preservative)

The present invention preferably contains a preservative.

As used herein, the preservative refers to one that has a function to prevent occurrence and growth of microorganisms, particularly bacteria and true fungi (molds).

Various preservatives can be used in the present invention.

Representatively, inorganic preservatives containing heavy metal ion (silver ion-containing substances) and salts are illustrated. Examples of organic preservatives include quaternary ammonium salts (e.g., tetrabutylammonium chloride, cetylpyridinium chloride, benzyltrimethylammonium chloride, etc.), phenol derivatives (e.g., phenol, cresol, butylphenol, xylenol, bisphenol, etc.), phenoxy ether derivatives (e.g., phenoxy ethanol, etc.), heterocyclic compounds (e.g., benzotriazol, 1,2-benzisothiazolin-3-on, etc.), acidic amides, carbamic acid, carbamates, amidines•guanidines, pyridines (e.g., sodium pyridinethione-1-oxide, etc.), diadines, triadines, pyrroles•imidazoles, oxazoles•oxazines, thiazoles•thiadiazins, thioureas, thiosemicarbazides, dithiocarbamates, sulfides, sulfoxides, sulfones, sulfamides, antibiotics (e.g., penicillin, tetracycline, etc.), sodium dehydroacetate, sodium benzoate, p-hydroxybenzoic acid ethyl ester, and salts thereof, and the like. These can be used singly or in combination. Also, as the preservative, those described in "Bokin Bobi Handobukku (Antibacteria and Antifungi Handbook)", Gihodo Shuppan, 1986; "Bokinbokabizai Jiten (Antibacterial and Antifungal Agent Dictionary)", Dictionary Editorial Board of the Society for Antibacterial and Antifingal Agents, Japan; and the like, may be used.

As these compounds, various compounds having an oil- or water-soluble structure or the like can be used, preferably a water-soluble compound.

Among other things, in the present invention, when two or more of these preservatives are used in combination, the ejection stability of ink over a long period of time is significantly improved and an effect of the present invention is obtained to a further extent. When two or more preservatives are combined, it is preferable that they have a skeleton having a different chemical structure. Also, when two or more preservatives are contained, it is preferable that at least one of them is a heterocyclic compound. For example, a combination of a heterocyclic compound and an antibiotic, a combination of a heterocyclic compound and a phenol derivative, and the like are preferable. The content ratio of a combination of two preservatives is preferably, but is not particularly limited to, in the range of 0.01 to 100 (weight ratio) (=preservative A/preservative B).

The amount (total amount) of a preservative(s) added can have a broad range, preferably 0.001 to 10% by weight, and more preferably 0.1 to 5% by weight, in the black ink composition.

The black ink composition of the present invention preferably contains, in addition to the above-described ingredients, one or more additives selected from the group consisting of antibleeding agents, antifoaming agents, bronze reducing agents, ozone-resistance improving agents, chelating agents, antidrying agents (wetting agents), penetration promoting agents, ultraviolet absorbing agents, antioxidants, viscosity adjusting agents, dispersants, rust preventives, and pH adjusting agents. In the black ink composition, these additives can be selected as appropriate and used in appropriate amounts. The above-described ingredients and these additives include single compounds having one or two or more functions. Therefore, when there are overlapping functions, the ratio of such additive ingredients blended is calculated by independently summing the compounds for each functional component.

(Antibleeding Agent)

An example of the antibleeding agent is a betaine type surfactant.

As used herein, the betaine type surfactant refers to a compound which has both a cationic site and an anionic site in the molecule and is surface-active. Examples of the cationic site include an amine nitrogen atom, a nitrogen atom of a heteroaromatic ring, a boron atom having four bonds to carbon atoms, a phosphor atom, and the like. Among them, an amine nitrogen atom and a nitrogen atom of a heteroaromatic ring are preferable. Among them, a quaternary nitrogen atom is particularly preferable. Examples of the anionic site include a hydroxyl group, a thio group, a sulfonamide group, a sulfo group, a carboxyl group, an imide group, a phosphate group, a phosphonate group, and the like. Among them, a carboxyl group and a sulfo group are particularly preferable. The whole surfactant molecule may be charged either positively (cation), negatively (anion), or neutrally, preferably neutrally.

Hereinafter, specific examples of the betaine type surfactant will be illustrated. The present invention is not limited to these.

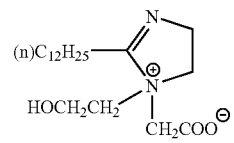

W-1

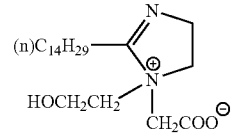

W-2

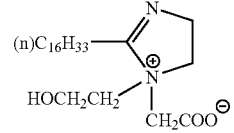

W-3

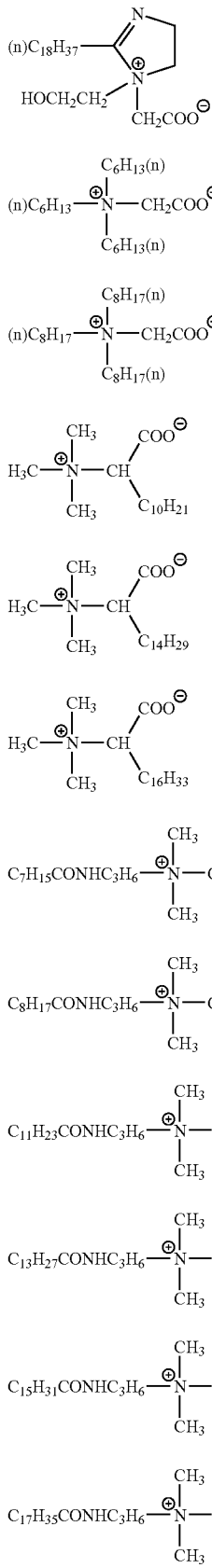
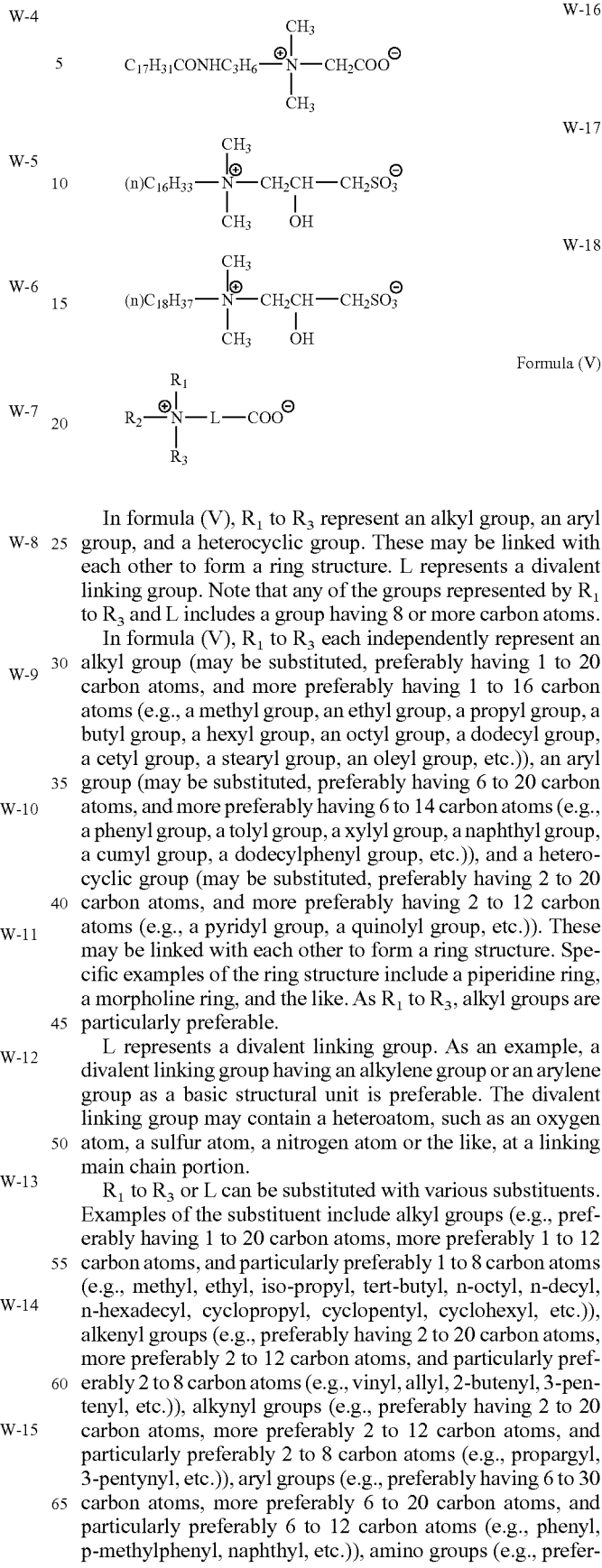

In formula (V), $R_1$ to $R_3$ represent an alkyl group, an aryl group, and a heterocyclic group. These may be linked with each other to form a ring structure. L represents a divalent linking group. Note that any of the groups represented by $R_1$ to $R_3$ and L includes a group having 8 or more carbon atoms.

In formula (V), $R_1$ to $R_3$ each independently represent an alkyl group (may be substituted, preferably having 1 to 20 carbon atoms, and more preferably having 1 to 16 carbon atoms (e.g., a methyl group, an ethyl group, a propyl group, a butyl group, a hexyl group, an octyl group, a dodecyl group, a cetyl group, a stearyl group, an oleyl group, etc.)), an aryl group (may be substituted, preferably having 6 to 20 carbon atoms, and more preferably having 6 to 14 carbon atoms (e.g., a phenyl group, a tolyl group, a xylyl group, a naphthyl group, a cumyl group, a dodecylphenyl group, etc.)), and a heterocyclic group (may be substituted, preferably having 2 to 20 carbon atoms, and more preferably having 2 to 12 carbon atoms (e.g., a pyridyl group, a quinolyl group, etc.)). These may be linked with each other to form a ring structure. Specific examples of the ring structure include a piperidine ring, a morpholine ring, and the like. As $R_1$ to $R_3$, alkyl groups are particularly preferable.

L represents a divalent linking group. As an example, a divalent linking group having an alkylene group or an arylene group as a basic structural unit is preferable. The divalent linking group may contain a heteroatom, such as an oxygen atom, a sulfur atom, a nitrogen atom or the like, at a linking main chain portion.

$R_1$ to $R_3$ or L can be substituted with various substituents. Examples of the substituent include alkyl groups (e.g., preferably having 1 to 20 carbon atoms, more preferably 1 to 12 carbon atoms, and particularly preferably 1 to 8 carbon atoms (e.g., methyl, ethyl, iso-propyl, tert-butyl, n-octyl, n-decyl, n-hexadecyl, cyclopropyl, cyclopentyl, cyclohexyl, etc.)), alkenyl groups (e.g., preferably having 2 to 20 carbon atoms, more preferably 2 to 12 carbon atoms, and particularly preferably 2 to 8 carbon atoms (e.g., vinyl, allyl, 2-butenyl, 3-pentenyl, etc.)), alkynyl groups (e.g., preferably having 2 to 20 carbon atoms, more preferably 2 to 12 carbon atoms, and particularly preferably 2 to 8 carbon atoms (e.g., propargyl, 3-pentynyl, etc.)), aryl groups (e.g., preferably having 6 to 30 carbon atoms, more preferably 6 to 20 carbon atoms, and particularly preferably 6 to 12 carbon atoms (e.g., phenyl, p-methylphenyl, naphthyl, etc.)), amino groups (e.g., preferably having 0 to 20 carbon atoms, more preferably 0 to 12 carbon atoms, and particularly preferably 0 to 6 carbon atoms (e.g., amino, methylamino, dimethylamino, diethylamino, diphenylamino, dibenzylamino, etc.)), alkoxy groups (e.g., preferably having 1 to 20 carbon atoms, more preferably 1 to 12 carbon atoms, and particularly preferably 1 to 8 carbon atoms (e.g., methoxy, ethoxy, butoxy, etc.)), aryloxy groups (e.g., preferably having 6 to 20 carbon atoms, more preferably 6 to 16 carbon atoms, and particularly preferably 6 to 12 carbon atoms (e.g., phenyloxy, 2-naphthyloxy, etc.)), acyl groups (e.g., preferably having 1 to 20 carbon atoms, more preferably 1 to 16 carbon atoms, and particularly preferably 1 to 12 carbon atoms (e.g., acetyl, benzoyl, formyl, pivaloyl, etc.)), alkoxycarbonyl groups (e.g., preferably having 2 to 20 carbon atoms, more preferably 2 to 16 carbon atoms, and particularly preferably 2 to 12 carbon atoms (e.g., methoxycarbonyl, ethoxycarbonyl, etc.)), aryloxycarbonyl groups (e.g., preferably having 7 to 20 carbon atoms, more preferably 7 to 16 carbon atoms, and particularly preferably 7 to 10 carbon atoms (e.g., phenyloxycarbonyl, etc.)), acyloxy groups (e.g., preferably having 2 to 20 carbon atoms, more preferably 2 to 16 carbon atoms, and particularly preferably 2 to 10 carbon atoms (e.g., acetoxy, benzoyloxy, etc.)), acylamino groups (e.g., preferably having 2 to 20 carbon atoms, more preferably 2 to 16 carbon atoms, and particularly preferably 2 to 10 carbon atoms (e.g., acetylamino, benzoylamino, etc.)), alkoxycarbonylamino groups (e.g., preferably having 2 to 20 carbon atoms, more preferably 2 to 16 carbon atoms, and particularly preferably 2 to 12 carbon atoms (e.g., methoxycarbonylamino, etc.)), aryloxycarbonylamino groups (e.g., preferably having 7 to 20 carbon atoms, more preferably 7 to 16 carbon atoms, and particularly preferably 7 to 12 carbon atoms (e.g., phenyloxycarbonylamino, etc.)), sulfonylamino groups (e.g., preferably having 1 to 20 carbon atoms, more preferably 1 to 16 carbon atoms, and particularly preferably 1 to 12 carbon atoms (e.g., methanesulfonylamino, benzenesulfonylamino, etc.)), sulfamoyl groups (e.g., preferably having 0 to 20 carbon atoms, more preferably 0 to 16 carbon atoms, and particularly preferably 0 to 12 carbon atoms (e.g., sulfamoyl, methylsulfamoyl, dimethylsulfamoyl, phenylsulfamoyl, etc.)), carbamoyl groups (e.g., preferably having 1 to 20 carbon atoms, more preferably 1 to 16 carbon atoms, and particularly preferably 1 to 12 carbon atoms (e.g., carbamoyl, methylcarbamoyl, diethylcarbamoyl, phenylcarbamoyl, etc.)), alkylthio groups (e.g., preferably having 1 to 20 carbon atoms, more preferably 1 to 16 carbon atoms, and particularly preferably 1 to 12 carbon atoms (e.g., methylthio, ethylthio, etc.)), arylthio groups (e.g., preferably having 6 to 20 carbon atoms, more preferably 6 to 16 carbon atoms, and particularly preferably 6 to 12 carbon atoms (e.g., phenylthio, etc.)), sulfonyl groups (e.g., preferably having 1 to 20 carbon atoms, more preferably 1 to 16 carbon atoms, and particularly preferably 1 to 12 carbon atoms (e.g., mesyl, tosyl, etc.)), sulfinyl groups (e.g., preferably having 1 to 20 carbon atoms, more preferably 1 to 16 carbon atoms, and particularly preferably 1 to 12 carbon atoms (e.g., methanesulfinyl, benzenesulfinyl, etc.)), ureido groups (e.g., preferably having 1 to 20 carbon atoms, more preferably 1 to 16 carbon atoms, and particularly preferably 1 to 12 carbon atoms (e.g., ureide, methylureide, phenylureide, etc.)), phosphoric acid amide groups (e.g., preferably having 1 to 20 carbon atoms, more preferably 1 to 16 carbon atoms, and particularly preferably 1 to 12 carbon atoms (e.g., diethyl phosphoric acid amide, phenyl phosphoric acid amide, etc.)), a hydroxy group, a mercapto group, halogen atoms (e.g., a fluorine atom, a chlorine atom, a bromine atom, an iodine atom), a cyano group, a sulfo group, a carboxyl group, a nitro group, a hydroxamic acid group, a sulfino group, a hydrazino group, an imino group, heterocyclic groups (e.g., preferably having 1 to 30 carbon atoms, and more preferably 1 to 12 carbon atoms, and having a heteroatom, such as a nitrogen atom, an oxygen atom or a sulfur atom, (e.g., specifically, imidazolyl, pyridyl, quinolyl, furyl, thienyl, piperidyl, morpholino, benzoxazolyl, benzoimidazolyl, benzothiazolyl, carbazolyl, azepinyl, etc.)), silyl groups (e.g., preferably having 3 to 40 carbon atoms, more preferably 3 to 30 carbon atoms, and particularly preferably 3 to 24 carbon atoms (e.g., trimethylsilyl, triphenylsilyl, etc.)), and the like. These substituents may be further substituted. When there are two or more substituents, these substituents may be the same or different. If possible, the substituents may be linked to form a ring(s). Also, a plurality of betaine structures may be contained via $R_1$ to $R_3$ or L.

In the compounds represented by formula (V), any of the groups represented by $R_1$ to $R_3$ and L includes a group having 8 or more carbon atoms. Among them, a compound in which a long-chain alkyl group having 8 or more carbon atoms is included in $R_1$ to $R_3$ is particularly preferable.

Hereinafter, specific examples of the compounds represented by formula (V) of the present invention will be illustrated. The present invention is not limited to these.

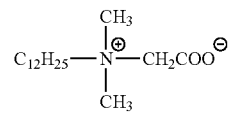

X-1

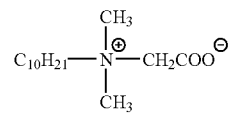

X-2

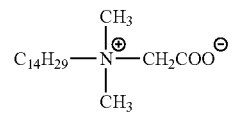

X-3

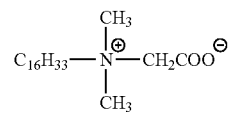

X-4

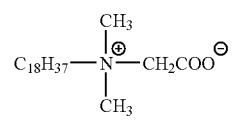

X-5

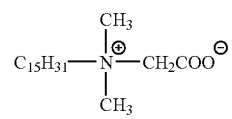

X-6

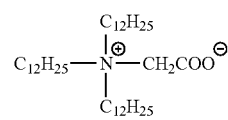

X-7

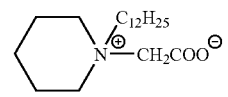

X-8

-continued

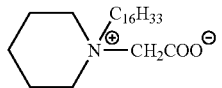
X-9

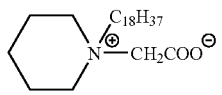
X-10

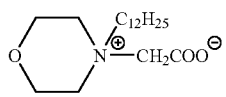
X-11

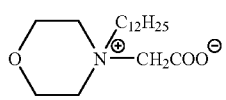
X-12

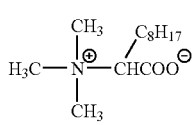
X-13

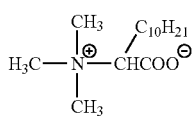
X-14

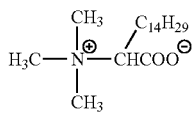
X-15

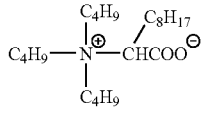
X-16

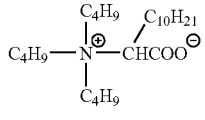
X-17

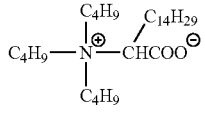
X-18

The amount of the betaine-type surfactant added has a broad range, preferably 0.001 to 50% by weight, and more preferably 0.1 to 20% by weight, in the black ink composition.

(Antifoaming Agent)

As used herein, the antifoaming agent refers to a compound which is itself present on a liquid surface in place of a substance which is responsible for foaming and is not itself capable of imparting repulsion force which resists thinning of a foam film. Specifically, examples of the antifoaming agent include alcohols, ethers, fatty acid esters, metallic soaps, phosphoric acid esters, silicones, nonionic surfactants, and the like.

Examples of the alcohols include methanol, ethanol, butanol, octanol, and the like.

Examples of the fatty acid esters include isoamyl stearate, succinic acid diester, diethylene glycol distearate, oxyethylenesorbitan monolauric acid ester, and the like, and as commercially available products, NOPCO KF (manufactured by Nopco Chem. Co.) and the like.

Examples of the ethers include di-t-amylphenoxy ethanol, 3-heptyl cellosolve, nonyl cellosolve, 3-heptyl carbitol, and the like, and as commercially available products, PIONIN K-17 (manufactured by Takemoto Fat & Oil Co., Ltd.), NOPCO DF122-NS (manufactured by San Nopco Ltd.) and the like.

Examples of the metallic soaps include aluminum stearate, potassium oleate, and the like, and as commercially available products, Nopco DF122-NS (manufactured by San Nopco Limited) and the like.

Examples of the silicones include silicone oil, silicone emulsion, organic modified silicone oil and the like, and as commercially available products, SN DEFOAMER 5016 (manufactured by San Nopco Limited), SURFYNOL DF-58 and SURFYNOL DF-695 (manufactured by Air Products & Chemicals, Inc.), SM-5513 (manufactured by Dow Corning Toray Silicone Co., Ltd.) and the like.

Examples of the nonionic surfactants include:
1) ethylene oxide adducts of alkylallyl ethers;
2) HO—$(C_2H_4O)_n$—$(C_3H_6O)_m$—$(C_2H_4O)_n$—OH having a molecular weight of 500 to 10000 and a $C_2H_4O$ content of 0 to 55%;
3) alkyl ester type: $R_1(R_2)CHCOO(C_2H_4O)_n$ wherein $R_1$, $R_2$ each independently represents a C1 to C10 alkyl group, and n: 1 to 8; and
4) acetylene diols and 0 to 8-mole ethylene oxide adducts thereof.

Among them, as the antifoaming agent for use in the present invention, silicones and nonionic surfactants are preferable. Among them, nonionic surfactants having an HLB value of about 1 to 4 are particularly preferable.

As the antifoaming agent, alkylene oxide block copolymers which are compounds represented by formula (VI) below are preferable.

$$HO-L_1-(B-O)_X-(A-O)_Y-(B'-O)_Z-L_2-H \quad \text{Formula (VI)}$$

In formula (VI), A represents an alkylene group having 2 or more carbon atoms. B, B' represent an alkylene group having 3 or more carbon atoms. X, Y, Z are each an integer of 1 or more. $L_1$, $L_2$ are each an alkylene oxide polymer block having a polymerization degree of 0 or more. The number of kinds of alkylene groups may be one or two or more. Note that the number of carbon atoms satisfies A<B, A<B'.

Examples of alkylene oxide which is a structural unit of the compound represented by formula (VI) include ethylene oxide, propylene oxide, butylene oxide, styrene oxide, cyclohexene oxide, epichlorohydrin, epibromohydrin, methylglycidyl ether, acrylglycidyl ether, phenylglycidyl ether, and the like. Two or more of them are used.

Among these alkylene oxides, ethylene oxide, propylene oxide, butylene oxide or styrene oxide is preferable.

The block copolymer represented by formula (VI) is further characterized by a structure in which alkylene oxide having a small molecular weight (number of carbons) is interposed between alkylene oxides having a large molecular weight. It was found that by using such a copolymer, the resultant ink has excellent ability to suppress foaming and excellent ability to eliminate foams, and the copolymer does not have adverse influence on physical properties and preservation stability of the ink, and also does not have adverse influence on quality and preservation of an image formed with the ink.

The alkylene oxide block copolymer represented by formula (VI) is obtained by using an active hydrogen-containing material below as a starting material and addition (ring opening)-polymerizing the starting material with alkylene oxide.

Examples of the active hydrogen-containing material include divalent alcohols, such as ethylene glycol, propylene glycol, 1,4-butanediol, and the like.

In a first step, these starting materials are caused to react with an alkylene oxide compound in the presence of a base or acid catalyst to form a first polymerization block. Next, in a second step, the product of the first step is caused to react with an alkylene oxide compound different from that of the first step in the presence of the same or different catalyst to add a second polymerization block. By adding an alkylene oxide polymerization block in a similar step, a compound represented by formula (VI) can be produced.

These reaction steps are typically carried out at high temperature. In each step, a different catalyst may be used, or alternatively, the same catalyst may be used. Examples of an appropriate base catalyst include sodium or potassium hydroxide, sodium methoxide, sodium ethoxide, and the like. Examples of an appropriate acid catalyst include boron trifluoride, ether boron trifluoride compounds (e.g., boron trifluoride adducts of diethyl ether, etc.), triethyloxonium, boron tetrafluoride, and the like.

Catalyst residues can be removed with an ion-exchange resin or by neutralization.

The alkylene oxide block copolymer preferably has a molecular weight of 10,000 or less, more preferably 8,000 or less. When the molecular weight exceeds 10,000, the solubility in ink is reduced and the preservation stability and the like of ink are adversely influenced.

It was found that, among the alkylene oxide block copolymers, a structure in which the ethylene oxide polymer portion $(E-O)_Y$ is interposed between the propylene oxide polymer portions $(P-O)_X$ and $(P-O)_Z$ as indicated in formula (VII) below provide more excellent ability to suppress foaming, ability to eliminate foams, and preservation stability.

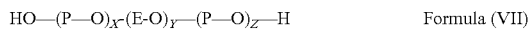     Formula (VII)

In formula (VII), P represents a propylene group (P—O represents propylene oxide). E represents an ethylene group (E-O represents ethylene oxide). X, Y, Z each represents an integer of 1 or more.

The block copolymer represented by formula (VI) or (VII) preferably has a molecular weight of 10,000 or less, more preferably 8,000 or less. When the molecular weight exceeds 10,000, the solubility in ink is reduced and the preservation stability and the like of ink are adversely influenced. The percentage of ethylene oxide content is preferably 10 to 80% by weight, more preferably 10 to 50% by weight. When the percentage of ethylene oxide content is excessively small, the solubility in the black ink composition is reduced, so that the preservation stability and the like of the ink are adversely influenced. When excessively large, the ability to suppress foaming and the ability to eliminate foams are poor.

Examples of a combination of alkylene oxides in the above-described block copolymer include:

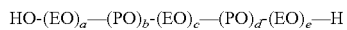

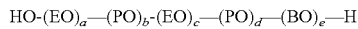

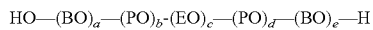

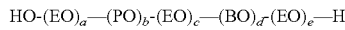

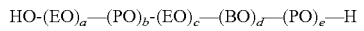

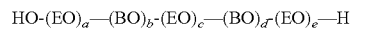

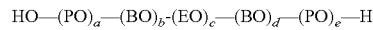

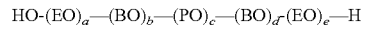

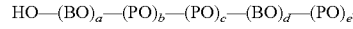

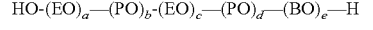

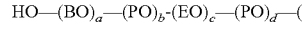

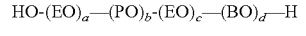

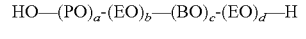

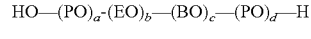

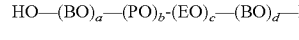

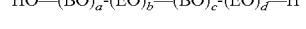

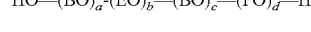

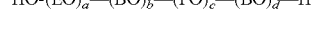

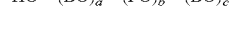

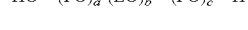

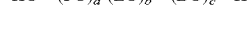

where EO represents ethylene oxide, PO represents propylene oxide, and BO represents butylenes oxide; a, b, c, d, e can be selected to be values which provide a preferable range of molecular weight. The value of a+b+c+d+e is in the range of 30 to 200, preferably 40 to 150, and the molecular weight is 10,000 or less.

Specific examples are illustrated below.

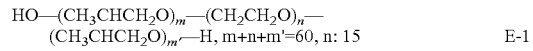     E-1

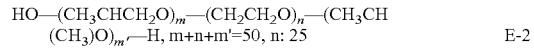     E-2

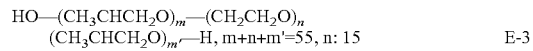     E-3

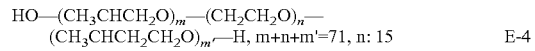     E-4

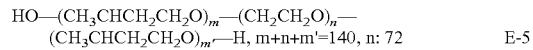     E-5

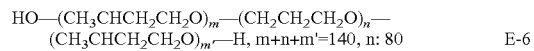     E-6

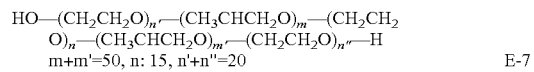     E-7

The values of the above-described n and the like actually have a distribution width and are averages of the respective distributions.

Specific examples of the ethylene oxide-propylene oxide block copolymer represented by formula (VII) include PLURONICs RPE 1720, RPE 1740, RPE 2035, RPE 2510, RPE 2520, RPE 2525, RPE 3110, 10R5, 10R8, 12R8, 17R1, 17R2, 17R4, 17R8, 22R4, 25R1, 25R2, 24R4, 25R5, 25R8, 31R1, 31R2, 31R4 (manufactured by BASF), and the like.

These antifoaming agents may be used singly or in combination. The total amount of antifoaming agent(s) added to the black ink composition is preferably 0.001 to 5% by weight, more preferably 0.005 to 3% by weight. When the added amount is excessively small, the ability to suppress foaming and the ability to eliminate foams are poor. When excessively large, the solubility in the black ink composition is reduced, so that the preservation stability and the like of the ink are adversely influenced.

(Bronze Reducing Agent)

A bronze reducing agent for use in the present invention has a function to reduce or eliminate a bronze phenomenon which is observed when solid printing is carried out using an ink set containing the black ink composition. Examples of the bronze reducing agent include an aromatic compound having a carboxyl group or a salt thereof.

The aromatic compound having a carboxyl group or a salt thereof, which are used in the present invention, may be any of aromatic compounds having at least one carboxyl group in its molecular structure or salts thereof, though an aromatic compound having a single carboxyl group is preferable and an aromatic compound having a naphthalene skeleton is preferable. An aromatic compound having a carboxyl group and a —OR group (R: a hydrogen atom or an alkyl group having 1 to 6 carbon atoms) on a naphthalene skeleton can be preferably used. It is preferable that the compound having a naphthalene skeleton or a salt thereof has a single carboxyl group and a single —OR group. Also, a compound having a carboxyl group at position 2 and a naphthalene skeleton, or a salt thereof, is more preferable. Even more preferable examples include alkali metal salts of the compound having a carboxyl group at position 2 and a naphthalene skeleton. Among the alkali metal salts of the compound having a carboxyl group at position 2 and a naphthalene skeleton, a lithium salt is particularly preferable in terms of improvement of bronze resistance, and is also preferable in terms of clogging resistance.

Specific examples of the aromatic compound having a carboxyl group or a salt thereof include 2-hydroxy-1-naphthoic acid, 1-hydroxy-2-naphthoic acid, 1-naphthoic acid, 2-naphthoic acid, 3-hydroxy-2-naphthoic acid, 6-hydroxy-2-naphthoic acid, 3-methoxy-2-naphthoic acid, 6-methoxy-2-naphthoic acid, 6-ethoxy-2-naphthoic acid, 6-propoxy-2-naphthoic acid, 4-hydroxybenzoic acid, 2,6-naphthalene dicarboxylic acid, and salts thereof (particularly, lithium salts). These can be used singly or in combination.

A salt of the aromatic compound having a carboxyl group can be added in the form of a salt to be contained in the black ink composition. Alternatively, the compound having a carboxyl group and a base can be separately added to be contained in the black ink composition.

The total amount of the compound having a carboxyl group and/or a salt thereof is determined based on the types of the compound having a carboxyl group and/or a salt thereof, the type of a dye, the type of a solvent ingredient, and the like.

Further, as another bronze reducing agent, a colorless water-soluble planar compound having more than 10 nonlocalized π electrons per molecule is preferable.

The water-soluble planar compound will be described. When the number of π electrons constituting a nonlocalized π electron system is increased to extend the π electron system, the water-soluble planar compound often come to have an absorption in a visible region. As used herein, the term "colorless" includes having a very slight color to an extent which does not influence an image. The water-soluble planar compound may be a fluorescent compound, though a nonfluorescent compound is preferable. More preferably, the water-soluble planar compound is a compound having a longest-wavelength absorption peak λmax of 350 nm or less, more preferably 320 nm or less, and a molar absorption constant of 10,000 or less.

The water-soluble planar compound has more than 10 nonlocalized π electrons per molecule. The upper limit of the number of π electrons is preferably, but is not particularly limited, 80 or less, more preferably 50 or less, and particularly preferably 30 or less. More than 10 π electrons may form a single large nonlocalized system, though two or more nonlocalized systems may be formed. Particularly, a compound having two or more aromatic rings per molecule is preferable. The aromatic ring may be an aromatic hydrocarbon ring or an aromatic heterocycle containing a heteroatom, or one which is obtained by ring condensation. Examples of the aromatic ring include benzene, naphthalene, anthracene, pyridine, pyrazine, triazine, and the like.

The water-soluble planar compound is preferably a compound which is dissolved in an amount of at least 1 g or more in 100 g of water at 20° C., more preferably a compound which is dissolved in an amount of 5 g or more, and most preferably a compound which is dissolved in an amount of 10 g or more.

When the water-soluble planar compound is a compound having two or more aromatic rings per molecule, it is particularly preferable that the compound has at least two solubilizing groups linked to the aromatic ring in the molecule. Examples of a useful solubilizing group include a sulfo group, a carboxyl group, a hydroxy group, a phosphono group, a carbonamide group, a sulfonamide group, a quaternary ammonium group, and other groups clearly known to those skilled in the art. The present invention is not limited to these. Among them, a sulfo group and a carboxyl group are preferable, and a sulfo group is most preferable.

The maximum number of solubilizing groups in the molecule is limited only by the number of positions of available substituents. For practical purposes, the presence of ten identical or different solubilizing groups is sufficient. There is no limitation on counter cations to these solubilizing groups. Examples of the counter cation include alkali metals, ammonium, and organic cations (tetramethylammonium, guanidium, pyridinium, etc.). Among them, alkali metals and ammonium are preferable. Particularly, lithium, sodium and ammonium are preferable. Lithium and ammonium are most preferable.

Specific examples of the compound are disclosed in Japanese Unexamined Patent Publication Nos. S63-55544, H03-146947, H03-149543, 2001-201831, 2002-139822, 2002-196460, 2002-244257, 2002-244259, 2002-296743, 2002-296744, and the specification of Japanese Patent Application No. 2002-17728.

Among them, compounds represented by formula (VIII) below are preferably used.

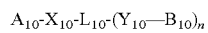
$$A_{10}\text{-}X_{10}\text{-}L_{10}\text{-}(Y_{10}\text{—}B_{10})_n \qquad \text{Formula (VIII)}$$

In formula (VIII), $A_{10}$, $L_{10}$, $B_{10}$ each independently represent an aromatic group (an aryl group and an aromatic heterocyclic group). $X_{10}$, $Y_{10}$ each independently represent a divalent linking group. n represents 0 or 1. The aromatic ring may be a monocycle or a condensed ring. Examples of the divalent linking group include alkylene groups, alkenylene groups, —CO—, —SO$_n$— (n: 0, 1, 2), —NR— (R: a hydrogen atom, an alkyl group, an aryl group, a heterocyclic group), —O—, and a combination thereof Note that the compound represented by formula (VIII) contains at least one ionic hydrophilic group selected from a sulfo group, a carboxyl group, a phenolic hydroxyl group, and a phosphono group. These ionic hydrophilic groups may be in the form of a base. There is no limitation on counter cations to these ionic hydrophilic groups. Examples of the counter cation include alkali metals, ammonium, and organic cations (tetramethylammonium, guanidium, pyridinium, etc.). Among them, alkali metals and ammonium are preferable. Particularly, lithium, sodium and ammonium are preferable. Lithium and ammonium are most preferable.

The compound represented by formula (VIII) may also have a substituent in addition to the ionic hydrophilic group. Specific examples of such a substituent include alkyl groups, aryl groups, aralkyl groups, heterocyclic groups, alkoxy groups, aryloxy groups, a hydroxyl group, amino groups (including an anilino group, heterocyclic amino groups), acyl groups, acylamino groups, an ureido group, halogen atom s, a sulfamoyl group, a carbamoyl group, a sulfonamide group, a sulfonyl group, a sulfenyl group, a sulfinyl group, and the like. These may further have a substituent. Among the compounds represented by formula (VIII), those having n=1 are preferable. Those having $A_{10}$, $L_{10}$ and $B_{10}$ at least one of which is an aromatic heterocycle are also preferable. Those having 2 to 4 ionic hydrophilic groups are also preferable.

The mechanism of action of the water-soluble planar compound which suppresses bronze has not been clarified. However, it is considered that the water-soluble planar compound acts as an aggregation breaking agent to break the aggregation (association) of a coloring matter (or a dye), which is formed due to π electron interaction between coloring matter molecules, by providing stronger π electron interaction, resulting in a reduction in the bronze phenomenon. The planarity and the largely extended π electron system of the aggregation breaking agent are important for it to penetrate between aggregated color matter molecules or express strong π electron interaction to a coloring matter molecule on a surface of a coloring matter association. It is also important that the aggregation breaking agent has sufficient solubility so as to prevent precipitation of a complex which is otherwise formed by the aggregation breaking agent itself, or the coloring matter and the aggregation breaking agent. The number of required π electrons varies, depending on a size of an inkjet coloring matter. However, coloring matters for use in inkjet have a largely extended planar structure so as to increase the fixing ability (representatively including a direct dye). Therefore, it is inferred that the aggregation breaking agent requires a colorless water-soluble planar compound having 10 or more extended, nonlocalized π electron systems per molecule.

Preferable examples of the compound for use in the present invention are disclosed in Japanese Unexamined Patent Publication Nos. 2002-139822, 2002-196460, 2002-244257, 2002-244259, 2002-296743, 2002-296744, and the specification of Japanese Patent Application No. 2002-17728 described above. Representative compounds (aggregation breaking agents) will be illustrated below.

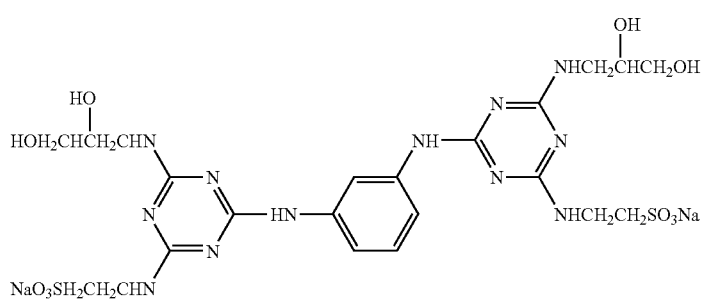

P-1

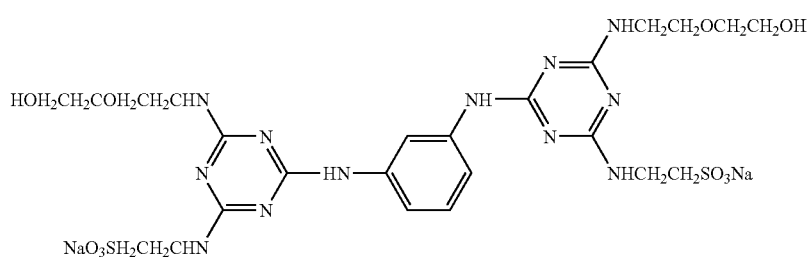

P-2

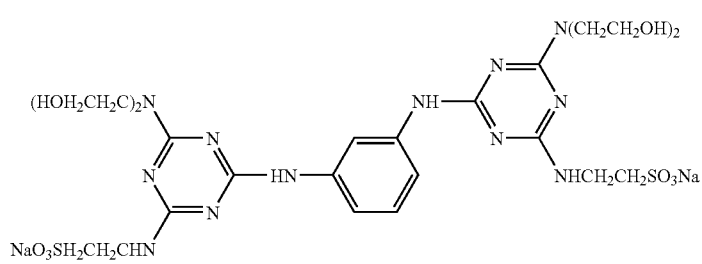

P-3

-continued
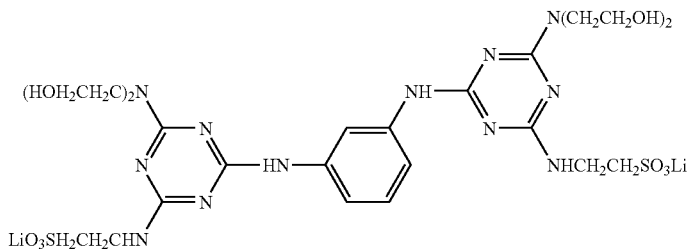
P-4
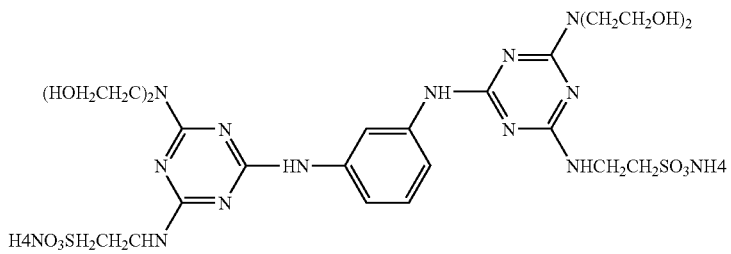
P-5
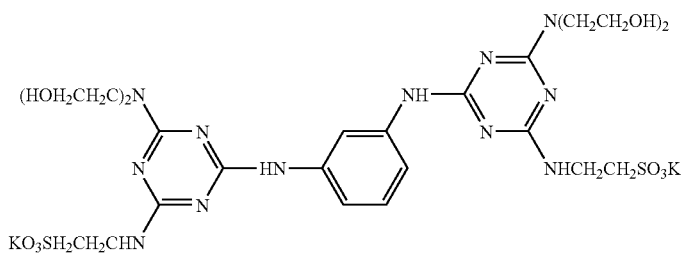
P-6
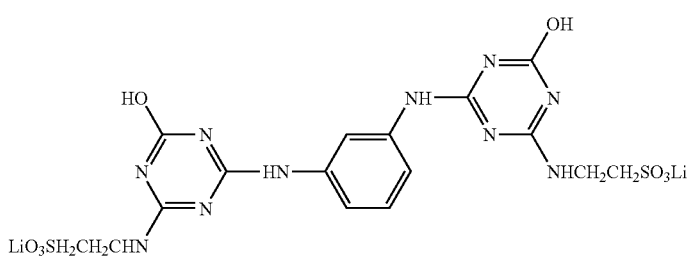
P-7
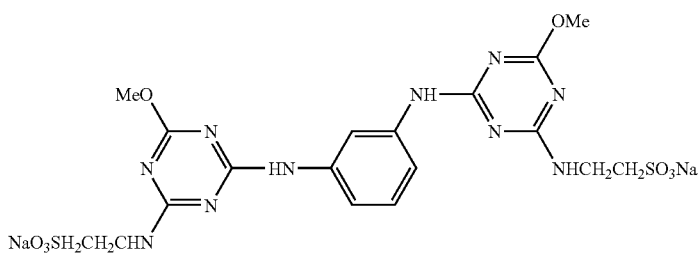
P-8
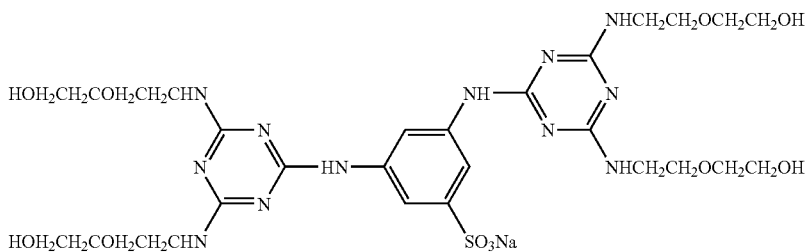
P-9

-continued
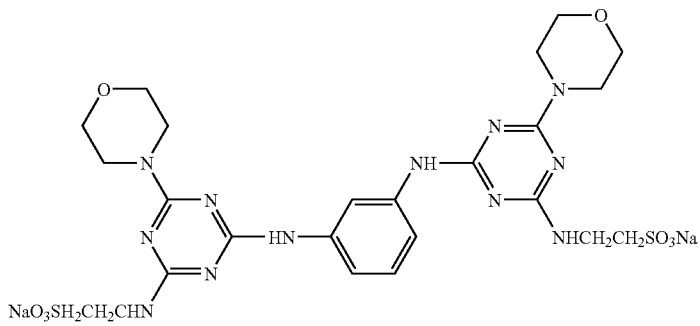
P-10
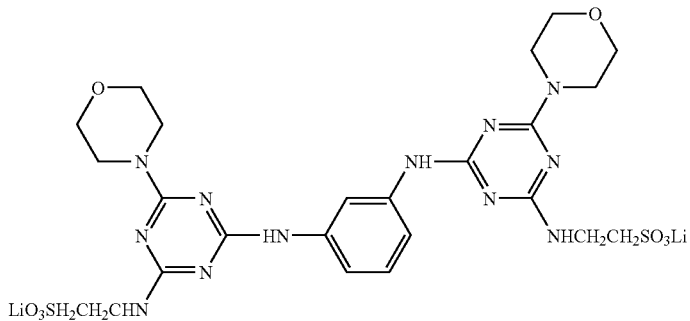
P-11
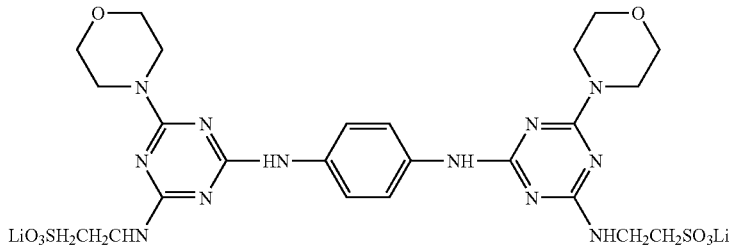
P-12
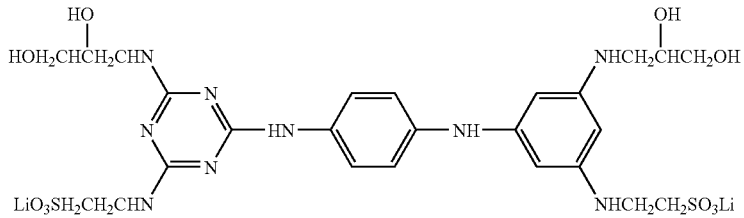
P-13
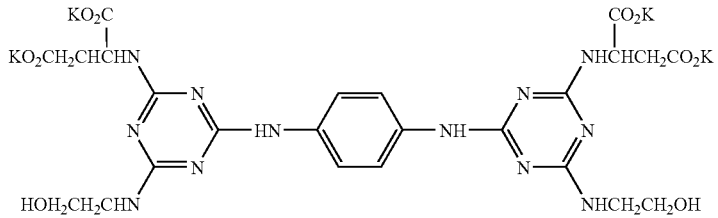
P-14
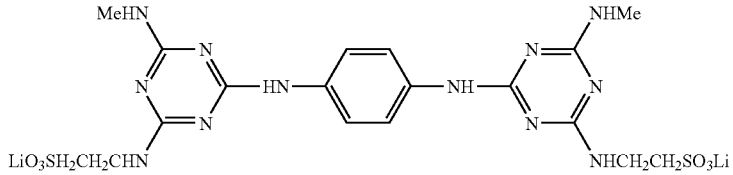
P-15

-continued
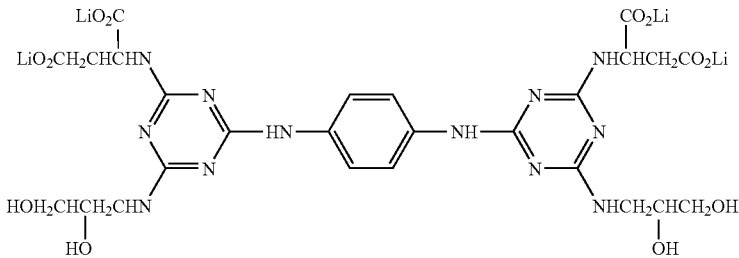
P-16
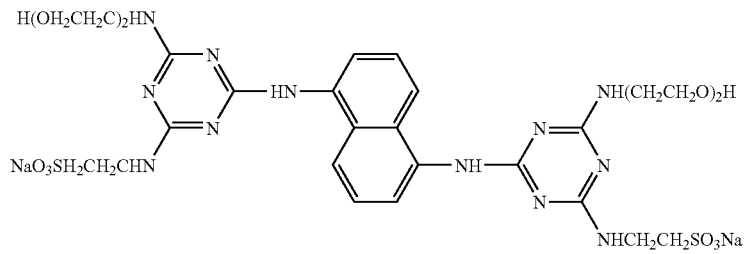
P-17
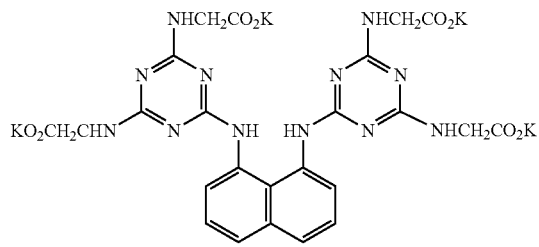
P-18
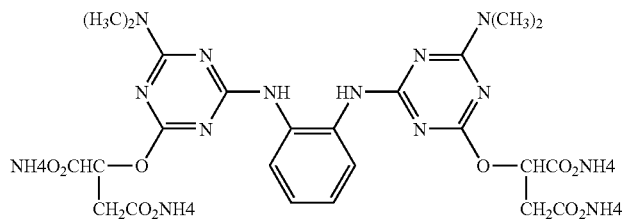
P-19
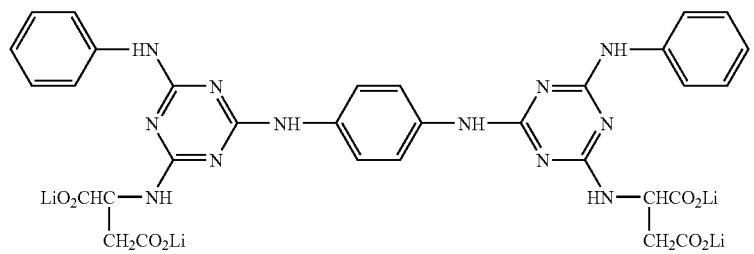
P-20
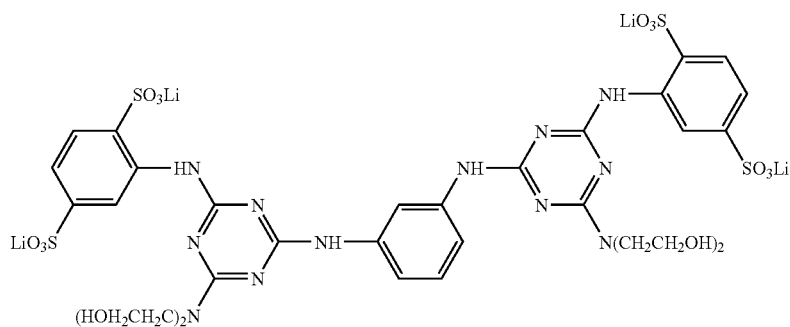
P-21

-continued
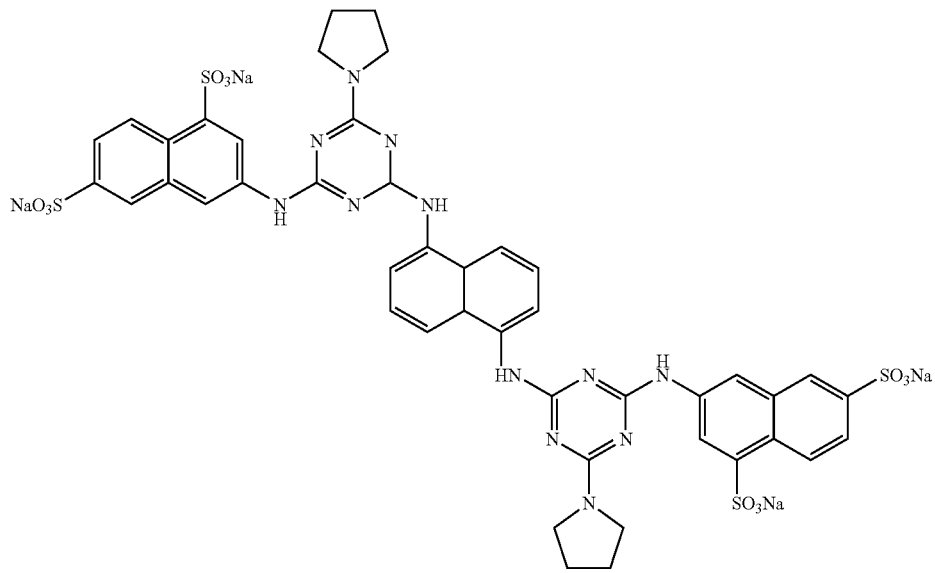
P-22
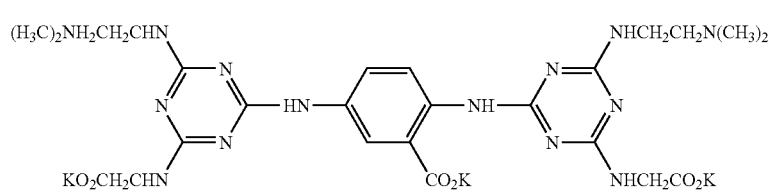
P-23
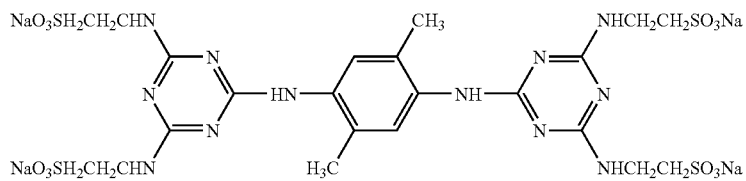
P-24
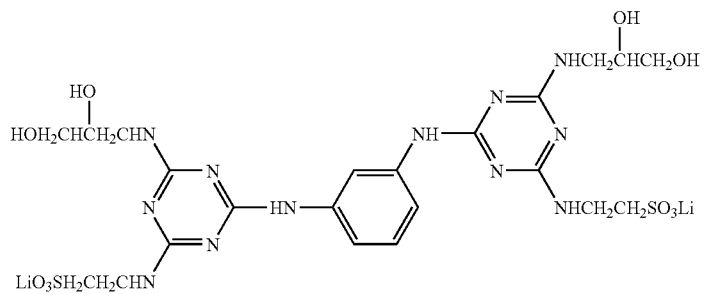
P-25
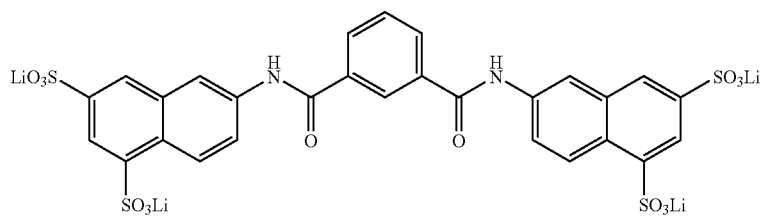
P-26

-continued

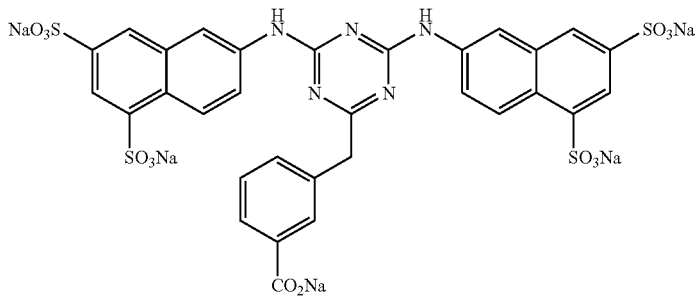
P-27

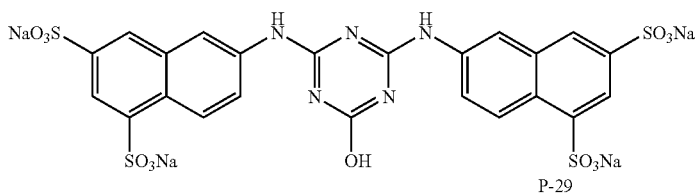
P-28

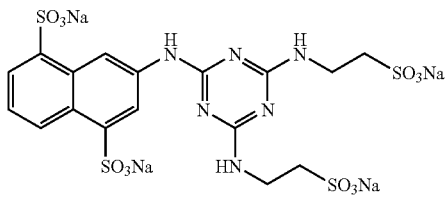
P-29

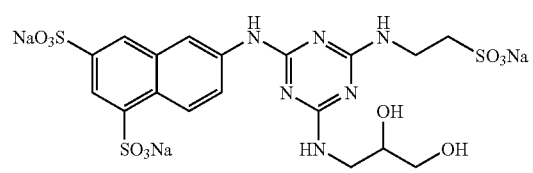
P-30

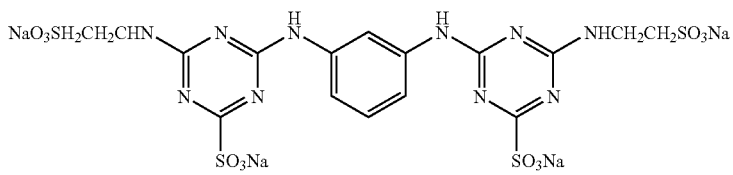
P-31

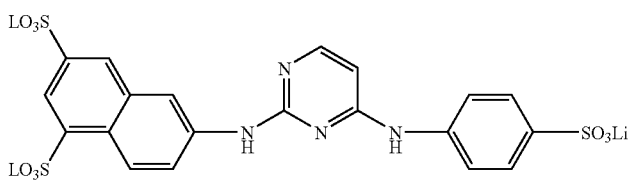
P-32

A preferable compound of the present invention can be easily synthesized with reference to Japanese Unexamined Patent Publication No. 2002-139822 described above or the like.

These bronze reducing agents are contained preferably in an amount of 0.1 to 10% by weight, more preferably 0.5 to 5% by weight, with respect to the total weight of the black ink composition.

(Ozone-Resistance Improving Agent)

The ozone-resistance improving agent is a compound which has a function to suppress oxidation of a dye. Examples of the ozone-resistance improving agent include thiol compounds, amidine compounds, carbazide compounds, hydrazide compounds, guanidine compounds, and the like.

(Thiol Compound)

The thiol compound for use in the present invention is a compound having a SH group. Aromatic thiols and aliphatic thiols are preferable. Compounds represented by formula (B) are preferable.

$$R_{10}-SH \qquad \text{Formula (B)}$$

where $R_{10}$ represents an alkyl group, an aryl group or a heterocyclic group.

The above-described $R_{10}$ will be described.

Examples of the alkyl group include those preferably having 1 to 12 carbon atoms, more preferably 1 to 6 carbon atoms.

Examples of the aryl group include those preferably having 6 to 18 carbon atoms, more preferably 6 to 10 carbon atoms.

Examples of the heterocyclic group include a furyl group, a pyridyl group, a pyrimidyl group, a pyrrolyl group, a pyrrolinyl group, a pyrrolidyl group, a dioxolyl group, a pyrazolyl group, a pyrazolinyl group, a pyrazolidyl group, an imidazolyl group, an oxazolyl group, a thiazolyl group, an oxadiazolyl group, a triazolyl group, a thiadiazolyl group, a pyryl group, a pyridyl group, a piperidyl group, a dioxanyl group, a morpholyl group, a pyridazyl group, a pyrazyl group, a piperazyl group, a triazyl group, a trithianyl group, and the like.

The substituent represented by Rio encompasses one whose hydrogen atom is substituted with other arbitrary substituents as described above. Examples of such a substituent include a carboxyl group, an oxo group, amino groups, amino residues (preferably having 2 to 8 carbon atoms), an ammonium group, a hydroxyl group, thiol groups, alkoxy groups (preferably having 1 to 12 carbon atoms), acylamino groups (preferably having 1 to 12 carbon atoms, may be substituted with a carboxyl group, an amino group or the like), a carbamoyl group, and the like. The same molecule may be substituted with two or more of these substituents.

The compound represented by formula (B) is synthesized, for example, as follows. A corresponding aryl Grignard reagent and simple sulfur are reacted with each other to obtain a thiol in which $R_{10}$ is an aryl group. Alternatively, a corresponding alkyl hallide and sodium hydrogensulfate or thiourea are reacted with each other to obtain a thiol in which $R_{10}$ is an alkyl group.

(Amidine Compound)

The amidine compound for use in the present invention means a compound having a structure in which a —C(=NH)—$NH_2$ group (amidino group) is linked to a carbon atom of a carbon-containing group. One or more hydrogen atoms of the —C(=NH)—$NH_2$ group may be substituted with a substituent.

As the amidine compounds, compounds represented by formula (C) are preferable.

Formula (C):

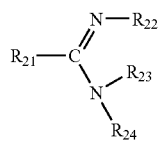

In formula (C), $R_{21}$, $R_{22}$, $R_{23}$ and $R_{24}$ each independently represent a hydrogen atom, an alkyl group, an aryl group, or a heterocyclic group, and when $R_{21}$ contains a nitrogen atom, the nitrogen atom is not linked to C in the formula.

Examples of the alkyl group include those preferably having 1 to 12 carbon atoms, more preferably 1 to 6 carbon atoms.

Examples of the aryl group include those preferably having 6 to 18 carbon atoms, more preferably 6 to 10 carbon atoms.

Examples of the heterocyclic group include a furyl group, a pyridyl group, a pyrimidyl group, a pyrrolyl group, a pyrrolinyl group, a pyrrolidyl group, a dioxolyl group, a pyrazolyl group, a pyrazolinyl group, a pyrazolidyl group, an imidazolyl group, an oxazolyl group, a thiazolyl group, an oxadiazolyl group, a triazolyl group, a thiadiazolyl group, a pyryl group, a pyridyl group, a piperidyl group, a dioxanyl group, a morpholyl group, a pyridazyl group, a pyrazyl group, a piperazyl group, a triazyl group, a trithianyl group, and the like.

The substituents represented by $R_{21}$ to $R_{24}$ encompass those whose hydrogen atom is substituted with other arbitrary substituents. Examples of such a substituent include halogen atoms (chlorine, etc.), a nitro group, amino groups, a carboxyl group, a carbamoyl group, an amidino group, aryloxy groups (the aryl moiety may be further substituted with substituents listed here), and the like. The same molecule may be substituted with two or more of these substituents. A hydrogen atom of the above-described amino group, carbamoyl group and amidino group may be substituted with the alkyl group, the aryl group or the heterocyclic group represented by $R_{21}$ to $R_{24}$.

The amidine compound may be in the form of a salt, such as a chloride.

The compound represented by formula (C) is synthesized by, for example, steps including at least a step of causing ammonia to act on a chloride of a corresponding iminoether.

(Carbazide Compound)

The carbazide compound for use in the present invention means carbazide and a derivative thereof, and is preferably a compound represented by formula (D): $R_{25}R_{26}NCONHNR_{27}R_{28}$ ($R_{25}$ to $R_{28}$ each independently represent a hydrogen atom or an organic group).

As the organic group, those listed above as $R_{21}$ to $R_{24}$ are preferable.

The substituents represented by $R_{25}$ to $R_{28}$ encompass those whose hydrogen atom is substituted with other arbitrary substituents. Preferable examples of such a substituent include those with which $R_{21}$ to $R_{24}$ may be substituted, and in addition, —$HNCONHNR_{29}R_{30}$ (where $R_{29}$, $R_{30}$ are organic groups, and preferable examples thereof are similar to those of $R_{21}$ to $R_{24}$). —$HNCONHNR_{29}R_{30}$ is herein called a carbazide structure. An example of the carbazide compound for use in the present invention is a compound preferably having two or more carbazide structures in the same molecule (more preferably 2 to 6 carbazide structures).

Specifically, the carbazide compound represented by formula (D) is obtained by a condensation reaction or the like of a corresponding isocyanate, diisocyanate, urea derivative or the like with a hydrazine compound represented by $NH_2NR_{27}R_{28}$ ($R_{27}$, $R_{28}$ are the same as defined above).

(Hydrazide Compound)

The hydrazide compound for use in the present invention means hydrazide and a derivative thereof, and is preferably a compound represented by formula (E): $R_{31}CONHNR_{32}R_{33}$ ($R_{31}$ to $R_{33}$ each independently represent a hydrogen atom, a hydrazino group, or an organic group; $R_{31}$ and $R_{32}$ or $R_{33}$ may be linked to form a ring).

As the organic group, those listed above as $R_{21}$ to $R_{24}$ are preferable.

The substituents represented by $R_{31}$ to $R_{33}$ encompass those whose hydrogen atom is substituted with other arbitrary substituents. Preferable examples of such a substituent include those with which $R_{21}$ to $R_{24}$ may be substituted, and in addition, acyl groups, a cyano group, alkoxy groups, aralkyloxy groups, a benzoyl group, —$CONHNR_{34}R_{35}$ (where $R_{34}$, $R_{35}$ are organic groups, and preferable examples thereof are similar to those of $R_{21}$ to $R_{24}$). —$CONHNR_{34}R_{35}$ is herein called a hydrazide structure. An example of the hydrazide compound for use in the present invention is a compound preferably having two or more hydrazide structures in the same molecule (more preferably 2 to 6 hydrazide structures).

Specifically, the hydrazide compound represented by formula (E) is obtained by a condensation reaction or the like of a corresponding carboxylic acid ester, acid derivative (acid halide, etc.), acid anhydride or the like with a hydrazine compound represented by $NH_2NR_{32}R_{33}$ ($R_{32}$, $R_{33}$ are the same as defined above).

Among the ozone-resistance improving agents, guanidine compounds are particularly preferable. Hereinafter, the guanidine compound will be described in detail.

(Guanidine Compound)

The guanidine compound for use in the present invention means a compound having an N—C(=N)—N structure.

As the guanidine compounds, compounds represented by formula (F) are preferable.

Formula (F):

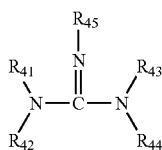

In the formula (F), $R_{41}$, $R_{42}$, $R_{43}$ and $R_{44}$ each independently represent a hydrogen atom, an alkyl group, an alkoxy group, an aryl group, a heterocyclic group, or an amino group. $R_{45}$ represents an alkyl group, an alkoxy group, an aryl group, or a heterocyclic group. These alkyl group, alkoxy group, aryl group, heterocyclic group, or amino group may or may not be substituted.

Examples of the alkyl group include those, preferably having 1 to 12 carbon atoms, particularly preferably 1 to 6 carbon atoms.

Examples of the alkoxy group include those preferably having 1 to 12 carbon atoms, particularly preferably 1 to 6 carbon atoms.

Examples of the aryl group include those preferably having 6 to 18 carbon atoms, particularly preferably 6 to 10 carbon atoms.

Examples of the heterocyclic group include a furyl group, a pyridyl group, a pyrimidyl group, a pyrrolyl group, a pyrrolinyl group, a pyrrolidyl group, a dioxolyl group, a pyrazolyl group, a pyrazolinyl group, a pyrazolidyl group, an imidazolyl group, an oxazolyl group, a thiazolyl group, an oxadiazolyl group, a triazolyl group, a thiadiazolyl group, a pyryl group, a pyridyl group, a piperidyl group, a dioxanyl group, a morpholyl group, a pyridazyl group, a pyrazyl group, a piperazyl group, a triazyl group, a trithianyl group, and the like.

The alkyl group, alkoxy group, aryl group or heterocyclic group represented by $R_{41}$ to $R_{44}$ encompasses one whose hydrogen atom is substituted with other arbitrary substituents. Examples of such a substituent include halogen atoms (chlorine, etc.), a nitro group, amino groups, a carboxyl group, a hydroxy group, a carbamoyl group, an amidino group, a guanidino group, aryloxy groups (the aryl moiety may be further substituted with substituents listed here), and the like. The same molecule may be substituted with two or more of these substituents. A hydrogen atom of the above-described amino group, carbamoyl group, amidino group and guanidino group may be substituted with the alkyl group, the alkoxy group, the aryl group or the heterocyclic group represented by $R_{41}$ to $R_{44}$.

The guanidine compound may be in the form of a salt or a metal complex. For example, chloride, nitrate, phosphate, sulfamate, carbonate, acetate, and the like are illustrated.

The compound represented by formula (F) is synthesized by, for example, steps including at least a step of causing ammonia to act on a corresponding iminoether chloride.

The guanidine compound may be a polymer having an N—C(=N)—N structure. Examples of such a polymer include compounds containing repeating units represented by formulas (F-a), (F-b) and (F-c) described below. The present invention is not limited to these. The compound containing the repeating unit may be an oligomer. The compound containing the repeating unit represented by formula (F-c) may be a monomer. In addition, these compounds are preferably acid salts.

Formula (F-a):

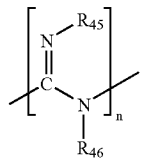

In formula (F-a), $R_{45}$ is the same as defined above; $R_{46}$ represents any of $R_{41}$, $R_{42}$, $R_{43}$ and $R_{44}$; and n $R_{45}$ and $R_{46}$ may be the same or different from each other. n is an integer of 2 or more, preferably 2 to 30, and more preferably 2 to 15. The compound containing the repeating unit represented by formula (F-a) may be a simple polymer or a copolymer with other repeating units, such as azetidinium or the like. The terminal structure may be selected as appropriate, and is preferably a hydrogen atom, an alkyl group, an alkoxy group, an aryl group, a heterocyclic group, or an amino group.

Formula (F-b):

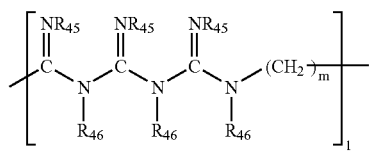

In formula (F-b), $R_{45}$ and $R_{46}$ are the same as defined above, and l $R_{45}$ and $R_{46}$ may be the same or different from each other, respectively. l is an integer of 2 or more, preferably 2 to 10, and more preferably 2 to 5. m is an integer of 1 or more, preferably 1 to 6, and more preferably 1 to 3. The compound containing the repeating unit represented by formula (F-b) may be a simple polymer or a copolymer with other repeating units, such as azetidinium or the like. The terminal structure may be selected as appropriate, and is preferably a hydrogen atom, an alkyl group, an alkoxy group, an aryl group, a heterocyclic group, or an amino group.

Formula (F-c):

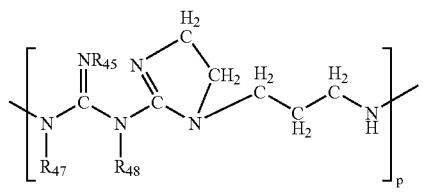

In formula (F-c), $R_{45}$ is the same as defined above; $R_{47}$ is the same as $R_{41}$ or $R_{42}$; $R_{48}$ is the same as $R_{43}$ or $R_{44}$; and p $R_{45}$, $R_{47}$ and $R_{48}$ may be the same or different from each other, respectively. p is an integer of 1 or more, preferably 1 to 10, and more preferably 1 to 5. The compound containing the repeating unit represented by formula (F-c) may be a simple polymer or a copolymer with other repeating units, such as azetidinium or the like. The terminal structure may be selected as appropriate, and is preferably a hydrogen atom, an alkyl group, an alkoxy group, an aryl group, a heterocyclic group, or an amino group.

As the ozone-resistance improving agent, the above-described various compounds can be used singly or in combination. The total amount of the compound(s) is preferably 0.1 to 10% by weight in the black ink composition.

(Chelating Agent)

A chelating agent refers to a compound which can form a metal ion complex having two or more donor atoms in a molecule linked with a metal ion. The chelating agent has a function to suppress damage on a head, particularly due to heavy metals under a high humidity condition, and can maintain good ejection ability of inkjet recording.

As such a chelating agent, various compounds are known.

Examples of the chelating agent include aliphatic or aromatic mono-, di-, tri- and poly-carboxylic acids, oxycarboxylic acid, ketocarboxylic acid, thiocarboxylic acid, aromatic aldehyde, amine compounds, diamine compounds, polyamine compounds, aminopolycarboxylic acid, nitrilotriacetic acid derivatives, ethylenediaminepolycarboxylic acid, amino acids, heterocyclic carboxylic acid, heterocycles, pyrimidines, nucleosides, purine salts, β-diketones, oxines, and the like. These are used singly or in combination. Among them, ethylenediaminepolycarboxylic acids or a chelating agent in which a lone pair of a nitrogen atom can act as a donor, are preferable.

Examples of the chelating agent include, but are not limited to, pyridine-2-carboxylic acid, pyridine-2,3-dicarboxylic acid, pyridine-2,4-dicarboxylic acid, pyridine-2,6-dicarboxylic acid, iminodiacetic acid <IDA>, iminodipropionic acid, N-methyliminodiacetic acid, N,N'-ethylenediaminediacetic acid <EDDA>, ethylenediaminetetraacetic acid <EDTA>, ethylenediamine-N,N'-diacetic acid-N,N'-dipropionic acid <EDPA>, ethylenediaminetetrapropionic acid <EDTP>, 1,2-propylenediaminetetraacetic acid <PDTA>, trimethylenediaminetetraacetic acid <THTA>, tetramethylenediaminetetraacetic acid, pentamethylenediaminetetraacetic acid, hexamethylenediaminetetraacetic acid, octamethylenediaminetetraacetic acid, 1,2-cyclopentanediaminetetraacetic acid, trans-cyclohexane-1,2-diaminetetraacetic acid <CDTA>, 1,3,5-triaminocyclohexanehexaacetic acid <CTHA>, ethyletherdiaminetetraacetic acid(2,2-oxybis(ethyliminodiacetic acid)) <E-EDTA>, diethylenetriaminepentaacetic acid <DTPA>, glycoletherdiaminetetraacetic acid <GEDTA>, trimethylenetetraaminehexaacetic acid <TTHA>, quinoline-2-carboxylic acid, quinoline-8-carboxylic acid, 8-hydroxyquinoline, 1,10-phenanthroline, 2-methyl-1,10-phenanthroline <70>, 5-methyl-1,10-phenanthroline, 2,9-dimethyl-1,10-phenanthroline, 4,7-dimethyl-1,10-phenanthroline, and the like.

The amount of the chelating agent added to the black ink composition of the present invention is preferably 0.01 to 100 times by mole the amount of the dye, more preferably 0.05 to 50 times by mole, and particularly preferably 0.1 to 10 times by mole.

(Drying Protecting Agent (Wetting Agent), Penetration Promoting Agent)

Those described in the above water-miscible organic solvent section are illustrated.

(Ultraviolet Absorbing Agent)

Examples of an ultraviolet absorbing agent which is used in the present invention to improve image preservability include benzotriazole compounds described in Japanese Unexamined Patent Publication Nos. S58-185677, S61-190537, H02-782, H05-197075, H09-34057, and the like; benzophenone compounds described in Japanese Unexamined Patent Publication Nos. S46-2784, H05-194483, U.S. Pat. No. 3,214,463, and the like; cinnamic acid compounds described in Japanese Patent Publication for Opposition Nos. S48-30492, S56-21141, Japanese Unexamined Patent Publication No. H10-88106, and the like; triazine compounds described in Japanese Unexamined Patent Publication Nos. H04-298503, H08-53427, H08-239368, H10-182621, Japanese National Phase PCT Laid-Open Publication No. 8-501291, and the like; a compound described in Research Disclosure No. 24239; and a compound (so-called fluorescent brightening agent) which absorbs ultraviolet light and emits fluorescence, representatively including stilbene compounds, benzoxazole compounds.

The ultraviolet absorbing agent can be used in an amount of 0.05 to 10% by weight with respect to the black ink composition.

(Antioxidant)

As an antioxidant which is used in the present invention to improve image preservability, various organic antifading agents and metal complex antifading agents can be used. Examples of the organic antifading agent include hydroquinones, alkoxyphenols, dialkoxyphenols, phenols, anilines, amines, indans, chromans, alkoxyanilines, heterocycles, and the like. Examples of the metal complex include nickel complex, zinc complex, and the like. More specifically, compounds described in patents cited in Research Disclosure Nos. 17643 (Sec. VII-I to J), 15162, 18716 (p. 650, left column), 36544 (p. 527), 307105 (p. 872), 15162, and compounds included in the formula and compound examples of representative compounds described in Japanese Unexamined Patent Publication No. S62-215272 (pp. 127 to 137), can be used.

The antioxidant can be used in an amount of 0.05 to 10% by weight with respect to the black ink composition.

(Viscosity Adjusting Agent)

The viscosity adjusting agent has a function to adjust viscosity, and an example thereof is the above-described water-miscible organic solvent. Examples of the viscosity adjusting agent include glycerin, diethyleneglycol, triethanolamine, 2-pyrrolidone, diethylene glycol monobutyl ether, triethylene glycol monobutyl ether, and the like.

In addition to the water-miscible organic solvents, for example, water-soluble polymers (celluloses, polyvinyl alcohol, etc.), nonionic surfactants, and the like are illustrated. More specific examples are described in "Nendo Chosei Gijyutsu (Viscosity Adjusting Techniques)" (Technical Information Institute Co., Ltd., 1999), Chapter 9; and "Inkujyetto Purintayo Kemikaruzu (98 Zoho)—Zairyo no Kaihatsudoko•Tenbochosa (Inkjet Printer Chemicals (98 supplemented)—Developmental Trends of Development and Survey of Prospects) (CMC, 1997), pp. 162-174.

In the present invention, a high molecular weight compound can be contained as a viscosity adjusting agent. As used herein, the high molecular weight compound refers to all macromolecule compounds having a number average molecular weight of 5000 or more which are contained in the black ink composition. Examples of the macromolecule compound include a water-soluble macromolecule compound which is substantially dissolved in a aqueous solvent, a water-dispersive macromolecule compound (polymer latex, polymer emulsion, etc.), an alcohol-soluble macromolecule compound which is used as an auxiliary solvent and is soluble in polyhydric alcohol, and the like. Any macromolecule compound which is substantially soluble or dispersive in ink solution can be used for the present invention.

Specific examples of the water-soluble macromolecule compound include water-soluble macromolecules polyvinyl alcohol, silanol-modified polyvinyl, carboxymethylcellulose, hydroxyethylcellulose, polyvinylpyrrolidone, polyalkylene oxides (polyethylene oxide, polypropylene oxide, etc.), a polyalkylene oxide derivative, etc.), naturally-occurring water-soluble macromolecules (polysaccharides, starch, cationic starch; casein, gelatin, etc.), water acrylic resin (polyacrylic acid, polyacrylamide, or a copolymer thereof, etc.), water alkyd resin, and a water-soluble macromolecule compound which has a —$SO_3^-$ group, a —$COO^-$ group in the molecule and is substantially soluble in a aqueous solvent.

Examples of polymer latex include styrene-butadiene latex, styrene-acrylic latex, polyurethane latex, and the like. Examples of polymer emulsion include acrylic emulsion and the like.

These water-soluble macromolecule compounds may be used singly or in combination of two or more.

The water-soluble macromolecule compound is used to adjust the viscosity of the black ink composition within a viscosity range which provides good ejection property. However, the added amount thereof is large, the viscosity of the black ink composition is high so that the ejection stability of the ink solution is reduced. In this case, nozzle clogging is likely to occur due to a precipitate of the black ink composition after a long time.

The added amount of the macromolecule compound as a viscosity adjusting agent is 0 to 5% by weight with respect to the total amount of the black ink composition, preferably 0 to 3% by weight, and more preferably 0 to 1% by weight, depending on the molecular weight of the added compound (the higher the molecular weight, the smaller the added amount).

(Dispersant)

Examples of the dispersant include cationic, anionic, non-ionic and betaine surfactants. Specifically, those described in the surfactant section above are illustrated.

(Rust Preventive)

Examples of the rust preventive include acid sulfite, sodium thiosulfate, ammonium thioglycolate, disopropylammonium nitrite, pentaerythritol tetranitrate, dicyclohexylammonium nitrite, benzotriazole, and the like. These are preferably used in an amount of 0.02 to 5.00% by weight in the black ink composition.

(pH Adjusting Agent)

The pH adjusting agent for use in the present invention may have a function, such as imparting dispersion stability or the like, in addition to pH adjustment.

Examples of the pH adjusting agent include basic materials (e.g., organic bases, inorganic alkalis, etc.), and acidic materials (e.g., organic acids, inorganic acids, etc.).

Examples of the basic material include inorganic compounds (sodium hydroxide, potassium hydroxide, sodium carbonate, potassium carbonate, sodium hydrogencarbonate, potassium hydrogencarbonate, sodium acetate, potassium acetate, sodium phosphate, sodium monohydrogen phosphate, etc.), and organic bases (ammonium water, methylamine, ethylamine, diethylamine, triethylamine, ethanolamine, diethanolamine, triethanolamine, ethylenediamine, piperidine, diazabicyclooctane, diazabicylcoundecen, pyridine, quinoline, picoline, lutidine, collidine, etc.).

Examples of the acidic compound include inorganic compounds (e.g., hydrochloric acid, sulfuric acid, phosphoric acid, boric acid, sodium hydrogensulfate, potassium hydrogensulfate, potassium dihydorgenphosphate, sodium dihydrogen phosphate, etc.), and organic compounds (e.g., acetic acid, tartaric acid, benzoic acid, trifluoroacetic acid, methanesulfonic acid, ethanesulfonic acid, benzenesulfonic acid, p-toluenesulfonic acid, saccharin acid, phthalic acid, picolinic acid, quinolic acid, etc.).

A non-volatile ingredient in the black ink composition of the present invention is preferably contained in an amount of 10 to 70% by weight with respect of the total amount of the black ink composition. Such an amount is preferable in terms of the ejection stability of ink, print quality, various fastness of an image, and a reduction in image bleeding after printing or sticky printed surface, more preferably 20 to 60% by weight in terms of the ejection stability of the black ink composition and the reduction of image bleeding after printing.

As used herein, the non-volatile ingredient means a liquid having a boiling point of 150° C. or more at one atmospheric pressure, a solid ingredient, and a high molecular weight ingredient. Examples of a non-volatile ingredient for use in an inkjet ink include a dye, a high boiling point solvent, a polymer latex added as required, a surfactant, a dye stabilizer, an antifungal agent, a buffering agent, and the like. Most of these non-volatile ingredients other than the dye stabilizer reduce the dispersion stability of the black ink composition and remain on image receiving paper after printing, and prevent stabilization of a dye on the image receiving paper which is caused by association of the dye, so that the various fastness of an image portion and the image bleeding under a high humidity condition are deteriorated.

The black ink composition of the present invention preferably has a viscosity of 1 to 20 mPa·s, more preferably 2 to 15 mPa·s, and particularly preferably 2 to 10 mPa·s. When the viscosity exceeds 20 mPa·s, the fixing, speed of a recorded image is slow, and ejection performance is also poor. When the viscosity is lower than 1 mPa·s, a recorded image bleeds so that the quality is reduced. The viscosity is measured at 25° C. The viscosity is adjusted using the above-described viscosity adjusting agent. The added amount of a water-miscible organic solvent is preferably in the range of 5 to 70% by weight with respect to the black ink composition for inkjet recording, more preferably in the range of 10 to 60% by weight. In addition, two or more water-miscible organic solvents may be used in combination.

A method for measuring the viscosity of liquid is described in detail in JIS Z8803. The viscosity can be easily measured using a commercially available viscometer. Examples of the viscometer include a B-type viscometer and an E-type viscometer (rotation-type, manufactured by Tokimec Inc.). The viscosity is herein measured using a vibration-type VM-100A-L (manufactured by Yamaichi Electronics Co., Ltd.) is used at 25° C. for measurement.

The black ink composition of the present invention preferably has a surface tension of 20 to 50 mN/m, more preferably 20 to 40 mN/m.

The surface tension means both dynamic surface tension and static surface tension. Either is measured at 25° C. When the surface tension exceeds 50 mN/m, printing quality tends to be significantly reduced due to a reduction in ejection stability, occurrence of bleeding in mixing colors, occurrence of misting, or the like. When the ink surface tension is 20 mN/m or less, defective printing occurs due to attachment of ink to hardware surface during ejection. The surface tension is adjusted using, for example, a surfactant or the like. Those described in the surfactant section above can be used.

As a method for measuring static surface tension, a capillary rise method, a drop method, a ring method and the like are known. The Wilhelmy plate method is herein used as a static surface tension measuring method.

When a glass or platinum thin plate is suspended vertically with a portion thereof being immersed in a liquid, a downward surface tension of the liquid occurs along a length of a contact between the liquid and the plate. The downward force is balanced with an upward force, thereby making it possible to measure the surface tension.

As a method for measuring dynamic surface tension, an oscillating jet method, a falling meniscus method, a maximum bubble pressure method, and the like are known as described in, for example, "Shin Jikken Kagaku Koza, Dai 18 kan, Kaimen to Koroido (New Course of Experimental Chemistry, Vol. 18, Interface and Colloid)", Maruzen, p. 69-90, 1977. Further, a liquid membrane destroying method is known as described in Japanese Unexamined Patent Publication No. H03-2064. A differential bubble pressure method is herein used as the dynamic surface tension measuring method. Hereinafter, the measurement principle and procedure thereof will be described.

In a solution which is made uniform by stirring, when bubbles are generated, a gas-liquid interface is newly formed. In this case, surfactant molecules in the solution gather at a surface of water with a constant rate. When a bubble rate (bubble generation rate) is changed to be slow, a more number of surfactant molecules gather a surface of a bubble. Therefore, a maximum bubble pressure immediately before the bubble is burst is reduced. As a result, a maximum bubble pressure (surface tension) with respect to the bubble rate can be detected. In a preferable dynamic surface tension measurement, for example, two large and small probes are used to form bubbles in a solution, and a differential pressure is measured between maximum bubble pressures at the two probes, thereby calculating a dynamic surface tension.

The black ink composition of the present invention preferably has a conductivity of 0.01 to 10 S/m, particularly preferably 0.05 to 5 S/m. The conductivity is measured at 25° C. By setting the conductivity in the above-described range, image preservability thereof is secured.

The conductivity can be measured with an electrode method employing commercially available saturated potassium chloride.

The conductivity can be controlled with an ion concentration in a water-based solution. When a salt concentration is high, desalination can be carried out using an ultrafiltration membrane. When the conductivity is adjusted by adding a salt or the like, adjustment can be carried out by adding organic or inorganic salts.

Examples of the inorganic salt include inorganic compounds (e.g., potassium halide, sodium halide, sodium sulfate, potassium sulfate, sodium hydrogensulfate, potassium hydrogensulfate, sodium nitrate, potassium nitrate, sodium hydrogencarbonate, potassium hydrogencarbonate, sodium phosphate, sodium monohydrogen phosphate, boric acid, potassium dihydrogen phosphate, sodium dihydrogen phosphate, etc.) and organic compounds (e.g., sodium acetate, potassium acetate, potassium tartrate, sodium tartrate, sodium benzoate, potassium benzoate, sodium p-toluenesulfonate, potassium saccharinate, potassium phthalate, sodium picolinate, etc.).

The conductivity can also be adjusted by selection of the above-described additives.

The black ink composition of the present invention preferably has a pH of 7 to 9, more preferably 7 to 8. When the pH is less than 7, the solubility of the dye is reduced, likely leading to nozzle clogging. When the pH exceeds 9, water resistance thereof tends to be degraded. The pH can be measured using commercially available test paper or an electrode method employing saturated potassium chloride.

The pH of the black ink composition is adjusted using the above-described pH adjusting agents.

The black ink composition of the present invention has high image durability, and therefore, can be used for various image recording. As a dye for imaging, the black ink composition of the present invention can be applied to a photographic photosensitive material, a thermal transfer material, a heat-sensitive * pressure-sensitive material, inkjet recording. Particularly, the black ink composition of the present invention is suitable for use in inkjet recording.

Methods for preparing the black ink composition are described in detail in Japanese Unexamined Patent Publication Nos. H05-295312, H07-97541, H07-82515 in addition to the above-described patent documents, and can be used to prepare the black ink composition of the present invention.

In combination with the short-wavelength dye S and the long-wavelength dye L of the present invention, the black ink composition of the present invention may contain other coloring materials (dyes, pigments). When other dyes are used, the sum of the dyes contained is preferably 0.1 or more parts by weight and 30 or less parts by weight with respect to 100 parts by weight of the total of dyes, more preferably 0.2 or more parts by weight and 20 or less parts by weight, and even more preferably 0.5 to 15 parts by weight.

The black ink composition of the present invention can be used to form not only a monocolor image but also a full-color image. To form a full-color image, a magenta color tone ink, a cyan color tone ink and a yellow color tone ink can be used in addition to the black ink composition of the present invention. For each color, two light and dark inks can be used. Moreover, an intermediate tone ink, such as blue or orange, can be used.

Any arbitrary dyes can be used in an ink set of the present invention. For example, dyes described in Japanese Unexamined Patent Publication No. 2003-306623 (paragraph numbers 0090 to 0092) can be used.

(Inkjet Recording Method)

According to an inkjet recording method of the present invention, energy is applied to the above-described inkjet recording ink to form an image on a known image receiving material, i.e., ordinary paper; resin coated paper; inkjet-only paper described in, for example, Japanese Unexamined Patent Publication Nos. H08-169172, H08-27693, H02-276670, H07-276789, H09-323475, S62-238783, H10-153989, H10-217473, H10-235995, H10-337947, H10-217597, H10-337947, and the like; film; paper for both inkjet recording and electronic photograph; cloth; glass; metal; pottery; and the like. An image receiving material which has an ink receiving layer containing a white inorganic pigment particle on a support is preferable. Note that a description of Japanese Unexamined Patent Publication No. 2003-306623 (paragraph numbers 0093 to 0105) can be applied as the inkjet recording method of the present invention.

When an image is generated, a polymer latex compound may be additionally used for the purpose of imparting gloss or water resistance or improving weather resistance. A timing of adding the latex compound to the image receiving material may be before or after or simultaneously with adding a coloring agent. Therefore, the latex compound may be added to either the image receiving paper or ink. Alternatively, the polymer latex may be used singly as a liquid material. Specifically, methods described in Japanese Unexamined Patent Publication Nos. 2002-166638, 2002-121440, 2002-154201, 2002-144696, 2002-080759, 2002-187342, and Japanese Patent Application No. 2002-172774 can be preferable used.

A polymer latex may be added to a layer (including a back coating layer) constituting inkjet recording paper or recording film. The polymer latex may be used for the purpose of improving physical properties of membrane, such as stabilization of dimensions, prevention of curling, prevention of adhesion, prevention of a cracking in membrane, or the like. The polymer latex is described in Japanese Unexamined Patent Publication Nos. S62-245258, S62-1316648, and S62-11066. When a polymer latex having a low glass transition temperature (40° C. or less) is added to a layer containing a mordant, the layer can be prevented from cracking and curling. Curling can also be prevented by adding a polymer latex having a high glass transition temperature to the back coating layer.

The black ink composition or ink set of the present invention is not limited to a particular inkjet recording method and is applied to known methods such as a charge control method of ejecting ink using electrostatic attraction force, a drop on-demand method (pressure pulse method) using an oscillating pressure of a piezo element, an acoustic inkjet method of converting an electric signal to an acoustic beam and irradiating ink with the acoustic beam so that the ink is ejected using the irradiation pressure, a thermal inkjet method of heating ink to form bubbles and utilizing a generated pressure, and the like.

The inkjet recording method includes a method of emitting a large number of small volumes of ink having a low concentration (the ink is called photo ink), a method of improving image quality using a plurality of inks having substantially the same hue and different densities, and a method of using a colorless transparent ink.

EXAMPLES

Hereinafter, the present invention will be described by way of examples. The present invention is not limited to these.

Example 1

Ultrapure water (resistance value: 18 MΩ or more) was added to ingredients described below to a volume of one liter. Thereafter, the mixture was stirred for one hour while heating at 30 to 40° C. Thereafter, the mixture was subjected to filtration under reduced pressure using a microfilter having an average pore of 0.25 μm. Thereby, an ink solution was prepared for each color. Note that concentrations of the ingredients below are those after preparation (the same is true of other prescriptions below).

| (Formula of light cyan ink solution) (Solid ingredients) | |
|---|---|
| cyan dye (C-1) | 20 g/l |
| urea (UR) | 15 g/l |
| benzotiazole (BTZ) | 0.08 g/l |
| PROXEL XL2 (PXL) (manufactured by Avecia) | 3.5 g/l |
| (Liquid ingredients) | |
| triethylene glycol (TEG) | 110 g/l |
| glycerin (GR) | 130 g/l |
| triethylene glycol monobutyl ether (TGB) | 110 g/l |
| 2-pyrrolidone (PRD) | 60 g/l |
| triethanolamine (TEA) | 7 g/l |
| SURFYNOL STG (SW) (manufactured by Air Products) | 10 g/l |

-continued

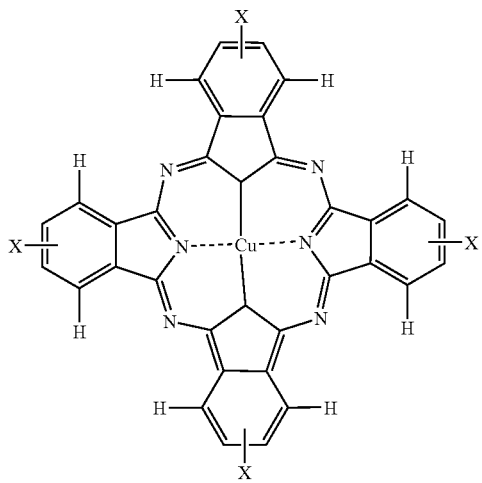

X = A or B
A: $SO_2(CH_2)_3SO_3Li$
B: $SO_2(CH_2)_3SO_2NHCH_2CH(CH_3)OH$
C-1: A/B = 75/25

| (Formula of cyan ink) (Solid ingredients) | |
|---|---|
| cyan dye (C-1) | 60 g/l |
| urea (UR) | 30 g/l |
| benzotiazole (BTZ) | 0.08 g/l |
| PROXEL XL2 (PXL) (manufactured by Avecia) | 3.5 g/l |
| (Liquid ingredients) | |
| triethylene glycol (TEG) | 110 g/l |
| glycerin (GR) | 130 g/l |
| triethylene glycol monobutyl ether (TGB) | 130 g/l |
| 2-pyrrolidone (PRD) | 60 g/l |
| triethanolamine (TEA) | 7 g/l |
| SURFYNOL STG (SW) (manufactured by Air Products) | 10 g/l |
| (Formula of light magenta ink) (Solid ingredients) | |
| magenta dye (M-1) | 7.5 g/l |
| urea (UR) | 10 g/l |
| PROXEL XL2 (PXL) (manufactured by Avecia) | 5 g/l |
| (Liquid ingredients) | |
| diethylene glycol (DEG) | 90 g/l |
| glycerin (GR) | 70 g/l |
| triethylene glycol monobutyl ether (TGB) | 70 g/l |
| triethanolamine (TEA) | 6.9 g/l |
| SURFYNOL STG (SW) (manufactured by Air Products) | 10 g/l |

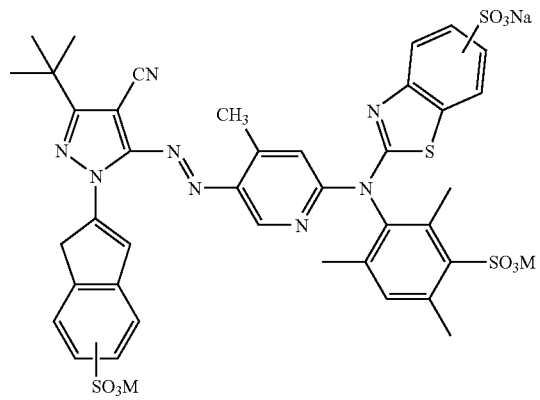

M-1

(Formula of magenta ink)
(Solid ingredients)

| | |
|---|---|
| magenta dye (M-1) | 23 g/l |
| urea (UR) | 15 g/l |
| PROXEL XL2 (PXL) (manufactured by Avecia) | 5 g/l |

(Liquid ingredients)

| | |
|---|---|
| diethylene glycol | 90 g/l |
| glycerin | 70 g/l |
| triethylene glycol monobutyl ether (TGB) | 70 g/l |
| triethanolamine | 6.9 g/l |
| SURFYNOL STG | 10 g/l |

(Formula of yellow ink)
(Solid ingredients)

| | |
|---|---|
| yellow dye (Y-1) | 35 g/l |
| PROXEL XL2 (PXL) (manufactured by Avecia) | 3.5 g/l |
| benzotiazole (BTZ) | 0.08 g/l |
| urea | 10 g/l |

(Liquid ingredients)

| | |
|---|---|
| triethylene glycol monobutyl ether (TGB) | 130 g/l |
| glycerin (GR) | 115 g/l |
| diethylene glycol (DEG) | 120 g/l |
| 2-pyrrolidone | 35 g/l |
| triethanolamine (TEA) | 8 g/l |
| SURFYNOL STG (SW) (manufactured by Air Products) | 10 g/l |

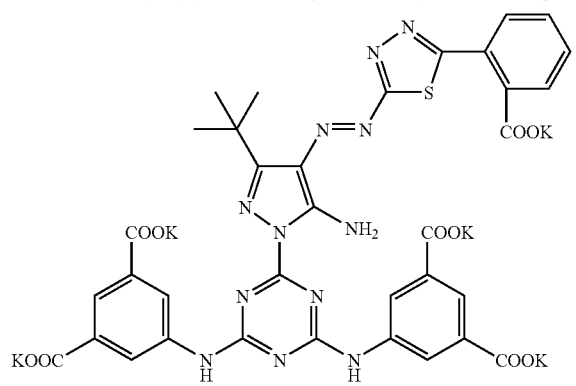

Y-1

(Formula of dark yellow ink)
(Solid ingredients)

| | |
|---|---|
| yellow dye (Y-1) | 35 g/l |
| magenta dye (M-1) | 2 g/l |
| cyan dye (C-1) | 2 g/l |
| PROXEL XL2 (PXL) (manufactured by Avecia) | 5 g/l |
| benzotiazole (BTZ) | 0.08 g/l |
| urea | 10 g/l |

(Liquid ingredients)

| | |
|---|---|
| triethylene glycol monobutyl ether (TGB) | 140 g/l |
| glycerin (GR) | 125 g/l |
| diethylene glycol (DEG) | 120 g/l |
| 2-pyrrolidone | 35 g/l |
| triethanolamine (TEA) | 8 g/l |
| SURFYNOL STG (SW) (manufactured by Air Products) | 10 g/l |

(Formula of black ink)
(Solid ingredients)

| | |
|---|---|
| long-wavelength dye L | 60 g/l |
| (Li salt of compound example 1-19 of long-wavelength dye L) | |
| short-wavelength dye S | 15 g/l |
| (Na salt of compound example 2 of short-wavelength dye S: C. I. Direct Red 84) | |
| PROXEL XL2 (PXL) (manufactured by Avecia) | 5 g/l |
| urea | 20 g/l |
| benzotiazole | 3 g/l |

(Liquid ingredients)

| | |
|---|---|
| diethylene glycol monobutyl ether (DGB) | 100 g/l |
| glycerin (GR) | 125 g/l |
| diethylene glycol (DEG) | 100 g/l |
| 2-pyrrolidone | 100 g/l |
| triethanolamine (TEA) | 30 g/l |
| SURFYNOL STG (manufactured by Air Products) (SW) | 10 g/l |

An ink set composed of these inks was designated as IS-101. Ink sets IS-102 to 110 having the same inks, except that the short-wavelength dye S of the black ink is changed to short-wavelength dyes S (all counter cations are Na salts) and comparative dyes, were prepared. Note that the viscosity and surface tension of each black ink are shown in Table 3.

TABLE 3

| | Long-wavelength dye L | | Short-wavelength dye S | | | | Black ink | |
|---|---|---|---|---|---|---|---|---|
| | Dye type | g/l | Dye type | g/l | Number of azo groups/molecule | Naphthalene skeleton | Viscosity (mPa·s) | Surface tension (mN/m) |
| IS-101 (Invention) | Li salt of 1-19 | 60 | 2 | 15 | 4 | Yes | 5.1 | 33.5 |
| IS-102 (Invention) | Li salt of 1-19 | 60 | 3 | 15 | 4 | Yes | 5.2 | 33.8 |
| IS-103 (Invention) | Li salt of 1-19 | 60 | 4 | 15 | 4 | Yes | 5.0 | 33.2 |
| IS-104 (Invention) | Li salt of 1-19 | 60 | 8 | 15 | 4 | Yes | 5.1 | 33.6 |
| IS-105 (Invention) | Li salt of 1-19 | 60 | 10 | 15 | 4 | Yes | 5.0 | 33.9 |
| IS-106 (Invention) | Li salt of 1-19 | 60 | 14 | 15 | 6 | Yes | 5.3 | 33.2 |
| IS-107 (Comp. Ex.) | Li salt of 1-19 | 60 | Comp. dye A | 15 | 1 | No | 5.0 | 33.6 |
| IS-108 (Comp. Ex.) | Li salt of 1-19 | 60 | Comp. dye B | 15 | 2 | No | 5.1 | 33.1 |
| IS-109 (Comp. Ex.) | Li salt of 1-19 | 60 | Comp. dye A | 10 | 1 | No | 5.2 | 33.5 |
| | | | Comp. dye B | 5 | 2 | No | | |
| IS-110 (Comp. Ex.) | Li salt of 1-19 | 60 | Comp. dye C | 15 | 4 | No | 5.3 | 33.8 |

Note)
Comp.: abbreviation of Comparative;
Ex.: abbreviation of Example

Absorption spectrum in water of compound example 2 (C. I; Direct Red 84) of the short-wavelength dye S which is used as a complement color dye for the long-wavelength dye L: λmax=472 nm, half-band width=130 nm The other short-wavelength dyes S also had λmax>460 nm, half-band width>110 nm or more, satisfying conditions for the present invention.

Absorption spectrum in water of the long-wavelength dye L (Li salt of compound example 1-19): λmax=578 nm, half-band width=130 nm Structure of short-wavelength dye S of comparative example Comparative dye A:

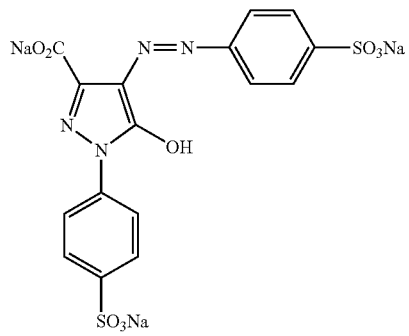

C. I. Acid Yellow 23, λmax=426 nm, half-band width=99 nm

Comparative dye B:

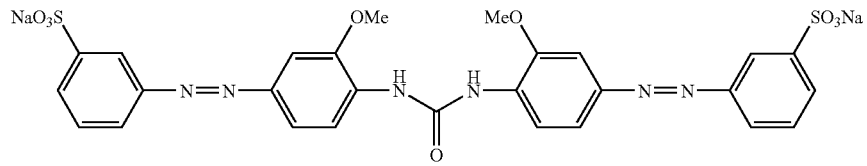

C. I. Direct Yellow 120, λmax=406 nm, half-band width=96 nm

Comparative Dye C
(Synthesis Example 1 of Japanese Unexamined Patent Publication No. 2002-332426):

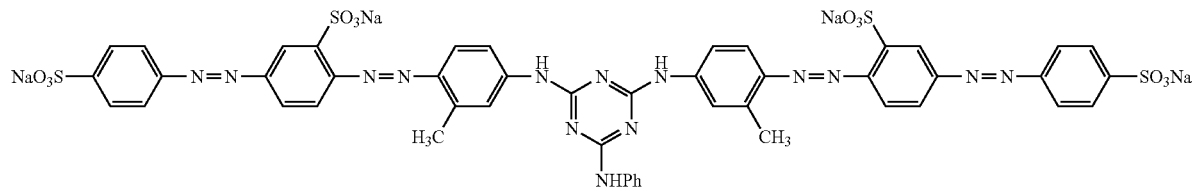

λmax=435 nm, half-band width=98 nm

The inks of the ink sets were loaded into an ink cartridge of an inkjet printer PM-980C (manufactured by Seiko Epson Corporation). An image pattern whose density varied in a stepwise manner was printed in a black and white mode to form a gray image.

An image receiving sheet used here was inkjet paper photo gloss paper "Kassai" (manufactured by Fuji Photo Film Co., Ltd.).

1) Hue was evaluated by visually determining a gray tone of each print density level of a gray scale pattern. An ink set which exhibited a preferable gray tone for all density levels is represented by A, an ink set for which some of the density levels lack gray balance is represented by B, and an ink set for which most of the density levels lack gray balance is represented by C.

2) The image preservability of the black dye was evaluated using gray print samples as follows. The preservability was evaluated by measuring a density of a stepwise pattern using a density measuring machine X-rite 310 with a status-A filter where a point in the vicinity of Dvis=1.0 is a reference point, and measuring a change in density.

2-1) Light fastness was evaluated by measuring the above-described densities ($D_B$, $D_G$, $D_R$) Ci immediately after printing, and thereafter, using a Weather-Ometer (manufactured by Atlas) to irradiate an image with xenon light (85,000 lux) for 10 days. Thereafter, a density Cf was measured again to obtain a dye residual rate Cf/Ci×100.

An ink set which had a dye residual rate of 80% or more for all $D_B$, $D_G$ and $D_R$ is represented by A, an ink set which had a dye residual rate of 70 to 80% for at least one of them is represented by B, and an ink set which had a dye residual rate of less than 70% for at least one of them is represented by C.

2-2) Ozone resistance ability was evaluated by allowing a sample to stand in a box having an ozone gas concentration of 10 ppm for 20 hours and measuring a density of a pattern S using X-rite 310 before and after exposure to ozone gas to obtain a dye residual rate.

An ozone gas concentration in the box was set using an ozone gas monitor (model: OZG-EM-01, manufactured by Applics Co., Ltd.).

An ink set which had a dye residual rate of 80% or more for all $D_B$, $D_G$ and $D_R$ is represented by A, an ink set which had a dye residual rate of 70 to 80% for at least one of them is represented by B, and an ink set which had a dye residual rate of less than 70% for at least one of them is represented by C.

3) Image bleeding of a black ink under high humidity was visually determined using a printed character sample after 72 hours of preservation at 25° C. and 90% RH.

Note that the viscosity and surface tension of the black ink are shown in Table 5.

The results of evaluation which was carried out in a manner similar to that of Example 1 are shown in Table 6.

TABLE 5

|  | Long-wavelength dye L | | Short-wavelength dye S | | | | Black ink | |
|---|---|---|---|---|---|---|---|---|
|  |  |  |  |  | Number of azo |  | Viscosity | Surface tension |
|  | Dye type | g/l | Dye type | g/l | groups/molecule | Naphthalene skeleton | (mPa · s) | (mN/m) |
| IS-201 (Invention) | Li salt of 1-19 | 60 | Na salt of 2 | 15 | 4 | Yes | 5.1 | 33.5 |
| IS-202 (Invention) | Li salt of 1-15 | 60 | Na salt of 2 | 15 | 4 | Yes | 5.0 | 33.2 |
| IS-203 (Invention) | Li salt of 1-16 | 60 | Na salt of 2 | 15 | 4 | Yes | 5.4 | 33.6 |
| IS-204 (Invention) | Li salt of 1-17 | 60 | Na salt of 2 | 15 | 4 | Yes | 5.2 | 33.2 |
| IS-205 (Invention) | Li salt of 1-18 | 60 | Na salt of 2 | 15 | 4 | Yes | 5.1 | 33.4 |
| IS-206 (Invention) | Na salt of 1-2 | 60 | Na salt of 2 | 15 | 4 | Yes | 5.3 | 33.0 |
| IS-207 (Invention) | Na salt of 4-2 | 60 | Na salt of 2 | 15 | 4 | Yes | 5.4 | 33.5 |
| IS-208 (Comp. Ex.) | Li salt of 1-18 | 60 | Comp. dye A | 15 | 1 | No | 5.0 | 33.3 |
| IS-209 (Comp. Ex.) | Li salt of 1-18 | 60 | Comp. dye B | 15 | 2 | No | 5.2 | 33.7 |
| IS-210 (Comp. Ex.) | Li salt of 1-18 | 60 | Comp. dye C | 15 | 4 | No | 5.1 | 33.2 |

Note)
Comp.: abbreviation of Comparative;
Ex.: abbreviation of Example

An ink set for which bleeding was not recognized is represented by A, an ink set for which the hue of a color correcting dye was slightly observed on a periphery of the character is represented by B, and an ink set for which a color correcting dye clearly bled out on a periphery of the character is represented by C.

The results are described below.

TABLE 4

|  | Hue | Light fastness | Ozone resistance | Image bleeding |
|---|---|---|---|---|
| IS-101 (Invention) | A | A | A | A |
| IS-102 (Invention) | A | A | A | A |
| IS-103 (Invention) | A | A | A | A |
| IS-104 (Invention) | A | A | A | A |
| IS-105 (Invention) | A | A | A | A |
| IS-106 (Invention) | A | A | A | A |
| IS-107 (Comp. Ex.) | C | C | C | C |
| IS-108 (Comp. Ex.) | C | C | B | B |
| IS-109 Comp. Ex.) | C | C | C | C |
| IS-110 (Comp.Ex.) | B | B | B | B |

Note)
Comp.: abbreviation of Comparative;
Ex.: abbreviation of Example

It will be clearly understood from the above-described result that the ink solution of the present invention is excellent in terms of hue, fastness and image bleeding.

Example 2

Ink sets IS-201 to 210 were prepared which contains a black ink similar to that of Example 1, except that the long-wavelength dye L and the short-wavelength dye S used in preparation of the black ink of Example 1 were changed to dyes shown in Table 5. In addition to a Na salt of 1-19, other long-wavelength dyes L of the present invention also satisfied the λmax and half-band width conditions of the present invention.

TABLE 6

|  | Hue | Light fastness | Ozone resistance | Image bleeding |
|---|---|---|---|---|
| IS-201 (Invention) | A | A | A | A |
| IS-202 (Invention) | A | A | A | B |
| IS-203 (Invention) | A | B | B | A |
| IS-204 (Invention) | A | B | A | A |
| IS-205 (Invention) | A | A | A | A |
| IS-206 (Invention) | A | A | A | B |
| IS-207 (Invention) | A | A | B | A |
| IS-208 (Comp. Ex.) | C | C | B | B |
| IS-209 (Comp. Ex.) | C | C | C | C |
| IS-210 (Comp. Ex.) | B | B | B | B |

Note)
Comp.: abbreviation of Comparative;
Ex.: abbreviation of Example

As can be seen from Table 6, it is shown that the ink solution of the present invention is excellent in terms of hue, fastness and image bleeding.

Example 3

Ultrapure water (resistance value: 18 MΩ or more) was added to ingredients described below to a volume of one liter. Thereafter, the mixture was stirred for one hour while heating at 30 to 40° C. Thereafter, the mixture was subjected to filtration under reduced pressure using a microfilter having an average pore of 0.25 μm. Thereby, an ink solution was prepared for each color.

(Formula of light cyan ink solution)
(Solid ingredients)

| cyan dye (C-1) | 10 g/l |
|---|---|
| urea (UR) | 15 g/l |
| benzotiazole (BTZ) | 0.08 g/l |
| PROXEL XL2 (PXL) (manufactured by Avecia Limited) | 3.5 g/l |

-continued (Liquid ingredients)

| | |
|---|---|
| triethylene glycol (TEG) | 50 g/l |
| glycerin (GR) | 100 g/l |
| triethylene glycol monobutyl ether (TGB) | 60 g/l |
| 1,5-pentanediol (PTD) | 40 g/l |
| isopropanol (IPA) | 20 g/l |
| triethanolamine (TEA) | 7 g/l |
| SURFYNOL STG (SW) (manufactured by Air Products) | 10 g/l |

(Formula of cyan ink)
(Solid ingredients)

| | |
|---|---|
| cyan dye (C-1) | 30 g/l |
| urea (UR) | 40 g/l |
| benzotiazole (BTZ) | 0.08 g/l |
| PROXEL XL2 (PXL) (manufactured by Avecia) | 3.5 g/l |

(Liquid ingredients)

| | |
|---|---|
| triethylene glycol (TEG) | 40 g/l |
| glycerin (GR) | 100 g/l |
| triethylene glycol monobutyl ether (TGB) | 70 g/l |
| 1,5-pentanediol (PTD) | 50 g/l |
| isopropanol (IPA) | 20 g/l |
| triethanolamine (TEA) | 7 g/l |
| SURFYNOL STG (SW) (manufactured by Air Products) | 10 g/l |

(Formula of light magenta ink)
(Solid ingredients)

| | |
|---|---|
| magenta dye (M-1) | 7.5 g/l |
| urea (UR) | 10 g/l |
| PROXEL XL2 (PXL) (manufactured by Avecia) | 5 g/l |

(Liquid ingredients)

| | |
|---|---|
| triethylene glycol (TEG) | 40 g/l |
| glycerin (GR) | 100 g/l |
| triethylene glycol monobutyl ether (TGB) | 60 g/l |
| 1,5-pentanediol (PTD) | 40 g/l |
| isopropanol (IPA) | 20 g/l |
| triethanolamine (TEA) | 6.9 g/l |
| SURFYNOL STG (SW) (manufactured by Air Products) | 10 g/l |

(Formula of magenta ink)
(Solid ingredients)

| | |
|---|---|
| magenta dye (M-1) | 23 g/l |
| urea (UR) | 15 g/l |
| PROXEL XL2 (PXL) (manufactured by Avecia) | 5 g/l |

(Liquid ingredients)

| | |
|---|---|
| triethylene glycol (TEG) | 50 g/l |
| glycerin (GR) | 100 g/l |
| triethylene glycol monobutyl ether (TGB) | 50 g/l |
| 1,5-pentanediol (PTD) | 40 g/l |
| isopropanol (IPA) | 20 g/l |
| triethanolamine | 6.9 g/l |
| SURFYNOL STG | 10 g/l |

(Formula of yellow ink)
(Solid ingredients)

| | |
|---|---|
| yellow dye (Y-1) | 35 g/l |
| PROXEL XL2 (PXL) (manufactured by Avecia) | 3.5 g/l |
| benzotiazole (BTZ) | 0.08 g/l |
| urea | 10 g/l |

(Liquid ingredients)

| | |
|---|---|
| triethylene glycol (TEG) | 40 g/l |
| glycerin (GR) | 100 g/l |
| triethylene glycol monobutyl ether (TGB) | 70 g/l |
| 1,5-pentanediol (PTD) | 60 g/l |
| isopropanol (IPA) | 20 g/l |
| triethanolamine (TEA) | 8 g/l |
| SURFYNOL STG (SW) (manufactured by Air Products) | 10 g/l |

(Formula of black ink solution)
(Solid ingredients)

| | |
|---|---|
| long-wavelength dye L (Li salt of 1-19) | 60 g/l |
| short-wavelength dye S | 15 g/l |
| (Na salt of compound example 2 of short-wavelength dye S: C. I. Direct Red 84) | |
| PROXEL XL2 (PXL) (manufactured by Avecia) | 5 g/l |
| urea | 20 g/l |
| benzotiazole | 3 g/l |

(Liquid ingredients)

| | |
|---|---|
| triethylene glycol (TEG) | 80 g/l |
| glycerin (GR) | 120 g/l |
| triethylene glycol monobutyl ether (TGB) | 70 g/l |
| 1,5-pentanediol (PTD) | 60 g/l |
| isopropanol (IPA) | 20 g/l |
| triethanolamine (TEA) | 8 g/l |
| SURFYNOL STG (SW) (manufactured by Air Products) | 10 g/l |

An ink set composed of these inks is represented by IS-301. Ink sets IS-302 to 310 having the same inks, except that the short-wavelength dye S of the black ink is changed to short-wavelength dyes S as shown a table below, were prepared. Note that the viscosity and surface tension of each black ink are shown in Table 7.

TABLE 7

| | Long-wavelength dye L | | Short-wavelength dye S | | | | Black ink | |
|---|---|---|---|---|---|---|---|---|
| | Dye type | g/l | Dye type | g/l | Number of azo groups/molecule | Naphthalene skeleton | Viscosity (mPa·s) | Surface tension (mN/m) |
| IS-301 (Invention) | Li salt of 1-19 | 60 | 2 | 15 | 4 | Yes | 5.2 | 33.3 |
| IS-302 (Invention) | Li salt of 1-19 | 60 | 3 | 15 | 4 | Yes | 5.3 | 33.6 |
| IS-303 (Invention) | Li salt of 1-19 | 60 | 4 | 15 | 4 | Yes | 5.1 | 33.0 |
| IS-304 (Invention) | Li salt of 1-19 | 60 | 8 | 15 | 4 | Yes | 5.2 | 33.4 |
| IS-305 (Invention) | Li salt of 1-19 | 60 | 10 | 15 | 4 | Yes | 5.1 | 33.7 |
| IS-306 (Invention) | Li salt of 1-19 | 60 | 14 | 15 | 6 | Yes | 5.4 | 33.0 |
| IS-307 (Comp. Ex.) | Li salt of 1-19 | 60 | Comp. dye A | 15 | 1 | No | 5.1 | 33.4 |
| IS-308 (Comp. Ex.) | Li salt of 1-19 | 60 | Comp. dye B | 15 | 2 | No | 5.2 | 33.0 |
| IS-309 (Comp. Ex.) | Li salt of 1-19 | 60 | Comp. dye A | 10 | 1 | No | 5.3 | 33.3 |
| | | | Comp. dye B | 5 | 2 | No | | |
| IS-310 (Comp. Ex.) | Li salt of 1-19 | 60 | Comp. dye C | 15 | 4 | No | 5.4 | 33.6 |

Note)
Comp.: abbreviation of Comparative;
Ex.: abbreviation of Example

The inks of the ink sets were loaded into an ink cartridge of an inkjet printer PIXUS 990i (manufactured by Canon Inc.). An image pattern whose density varied in a stepwise manner was printed in a black and white mode to form a gray image.

An image receiving sheet used here was inkjet paper photo gloss paper "Kassai" (manufactured by Fuji Photo Film Co., Ltd.).

Hue and image fastness were evaluated in a manner similar to that of Example 1.

The results are shown below.

TABLE 8

|  | Hue | Light fastness | Ozone resistance | Image bleeding |
|---|---|---|---|---|
| IS-301 (Invention) | A | A | A | A |
| IS-302 (Invention) | A | A | A | A |
| IS-303 (Invention) | A | A | A | A |
| IS-304 (Invention) | A | A | A | A |
| IS-305 (Invention) | A | A | A | A |
| IS-306 (Invention) | A | A | A | A |
| IS-307 (Comp. Ex.) | C | C | C | C |
| IS-308 (Comp. Ex.) | C | C | B | B |
| IS-309 (Comp. Ex.) | C | C | C | C |
| IS-310 (Comp. Ex.) | B | B | B | B |

Note)
Comp.: abbreviation of Comparative;
Ex.: abbreviation of Example

It will be clearly understood from the above-described result that the ink solution of the present invention is excellent in terms of hue, fastness and image bleeding.

The present invention has been explained in detail and by referring to specific embodiments, but it will be apparent for those skilled in the art that various modification and alterations can be added within the scope and spirit of the invention.

The entire disclosure of each and every foreign patent application from which the benefit of foreign priority has been claimed in the present application is incorporated herein by reference, as if fully set forth herein.

INDUSTRIAL APPLICABILITY

A black ink composition of the present invention is useful for an ink jet recording capable of achieving excellent in terms of hue, fastness and image bleeding.

The invention claimed is:

1. A black ink composition comprising: a water-soluble short-wavelength dye S whose absorption spectrum in aqueous solvent has a maximum between 440 nm and 540 nm and a half-band width of 90 to 200 nm; and a water-soluble long-wavelength dye L whose absorption spectrum in aqueous solvent has a maximum between 550 nm and 700 nm and a half-band width of 100 nm or more; wherein,
the water-soluble short-wavelength dye S has a structure having 3 to 6 azo groups per molecule; and
the water-soluble long-wavelength dye L has a hydroxyl group at a conjugate position of an azo group.

2. The black ink composition of claim 1, wherein the water-soluble short-wavelength dye S does not have a phenolic hydroxyl group.

3. A black ink composition comprising: a water-soluble long-wavelength dye L; and a water-soluble shod-wavelength dye S, wherein the water-soluble short-wavelength dye S has 3 or more azo groups per molecule and a naphthalene skeleton.

4. The black ink composition of claim 3, wherein the water-soluble short-wavelength dye S is a complementary color dye for the water-soluble long-wavelength dye L.

5. The black ink composition of claim 1, wherein the water-soluble short-wavelength dye S is contained in an amount of 0.1 to 4% by weight.

6. The black ink composition of claim 1, wherein the water-soluble long-wavelength dye L is an azo dye having a naphthalene skeleton.

7. The black ink composition of claim 1, wherein the water-soluble long-wavelength dye L has 2 to 4 azo groups per molecule and the azo groups are conjugated with each other.

8. The black ink composition of claim 1, wherein the water-soluble long-wavelength dye L has one or less heterocycle in a chromophore.

9. The black ink composition of claim 1, wherein the water-soluble long-wavelength dye L has an associating ability.

10. The black ink composition of claim 1, comprising a water-miscible organic solvent.

11. The black ink composition of claim 10, wherein the water-miscible organic solvent has a vapor pressure of 2,000 Pa or less.

12. The black ink composition of claim 10, wherein the water-miscible organic solvent is one or more selected from the group consisting of alcohol compounds, heterocycle-containing organic solvents, and alkyl ethers of polyhydric alcohols.

13. The black ink composition of claim 10, the water-miscible organic solvent is one or more selected from the group consisting of diethylene glycol, triethylene glycol, glycerin, triethylene glycol monobutyl ether, 1,5-pentanediol, 1,2-hexanediol, isopropanol, triethanolamine, and 2-pyrrolidone.

14. The black ink composition of claim 1, comprising a surfactant.

15. The black ink composition of claim 1, comprising a preservative.

16. The black ink composition of claim 1, having a viscosity of 1 to 20 mPa·sec.

17. The black ink composition of claim 1, having a surface tension of 20 to 50 mN/m.

18. The black ink composition of claim 1, having a pH of 7 to 9.

19. The black ink composition of claim 1, containing C. I. Direct Red 84 as the water-soluble shod-wavelength dye S.

20. A black ink composition comprising: water; a water-miscible organic solvent; and a coloring material containing a water-soluble short-wavelength dye S, wherein C. I. Direct Red 84 is contained as the water-soluble short-wavelength dye S.

21. An ink set comprising a black ink composition of claim 1.

22. An inkjet recording method, wherein a black ink composition of claim 1 is used to form an image on an image receiving material comprising: a support; and an ink receiving layer containing a white inorganic pigment particle.

* * * * *